(12) United States Patent
Katto

(10) Patent No.: US 6,584,125 B1
(45) Date of Patent: Jun. 24, 2003

(54) CODING/DECODING APPARATUS, CODING/DECODING SYSTEM AND MULTIPLEXED BIT STREAM

(75) Inventor: Jiro Katto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/218,141

(22) Filed: Dec. 22, 1998

(30) Foreign Application Priority Data

Dec. 22, 1997 (JP) .............................................. 9-364794

(51) Int. Cl.7 .............................. H04J 3/06; H04J 3/02

(52) U.S. Cl. ........................ 370/537; 370/498; 370/503; 370/529; 370/535; 370/536; 370/542; 348/512; 382/232

(58) Field of Search ................................. 370/465, 498, 370/503, 529, 535, 536, 537, 542; 348/500, 512; 382/232

(56) References Cited

U.S. PATENT DOCUMENTS

| | | | | |
|---|---|---|---|---|
| 5,373,310 A | * | 12/1994 | Ichimura et al. ............ | 365/197 |
| 5,521,927 A | | 5/1996 | Kim et al. | |
| 5,726,989 A | * | 3/1998 | Dokic ........................ | 370/509 |
| 5,798,804 A | * | 8/1998 | Okitsu ..................... | 348/845.3 |
| 5,949,792 A | * | 9/1999 | Yasuda et al. .............. | 370/474 |
| 6,044,397 A | * | 3/2000 | Eleftheriadis et al. ...... | 709/217 |
| 6,064,796 A | * | 5/2000 | Nakamura et al. .......... | 386/131 |
| 6,072,832 A | * | 6/2000 | Katto .......................... | 375/240 |
| 6,111,979 A | * | 8/2000 | Katto .......................... | 382/154 |
| 6,141,385 A | * | 10/2000 | Yamaji .................. | 375/240.27 |

FOREIGN PATENT DOCUMENTS

| | | |
|---|---|---|
| JP | 8-63890 | 3/1996 |
| JP | 8-168052 | 6/1996 |
| JP | 8-180585 | 7/1996 |
| JP | 8-186822 | 7/1996 |
| JP | 9-27871 | 1/1997 |
| JP | 9-284759 | 10/1997 |
| WO | WO 97/30551 | 8/1997 |

OTHER PUBLICATIONS

Avaro, O., et al., "The MPEG–4 Systems and Description Languages: A Way Ahead in Audio Visual Information Representation," Signal Processing: Image Communication, vol. 9, No. 4, pp. 385–431 (May 1997).

Doenges, P., et al., "MPEG–4: Audio/Video and Synthetic Graphics/Audio for Mixed Media," Signal Processing: Image Communication, vol. 9, No. 4, pp. 433–463 (May 1997).

Article "The Journal of the Institute of Image Information and Television Engineers", Dec. 20, 1997, vol. 51, No. 12, pp. 1966–1973.

(List continued on next page.)

*Primary Examiner*—Hassan Kizou
*Assistant Examiner*—Joe Logsdon
(74) *Attorney, Agent, or Firm*—Foley & Lardner

(57) ABSTRACT

A coding apparatus of the present invention comprises coding circuit 1 for audio signals, coding circuit 2 for video signals, interface circuit 3 on input of scene data, coding circuit 4 for scene data, composition circuit 5, multiplexing circuit 6, display circuit 7 and clock generating circuit 8. Each of coding circuits 1, 2 and 4 outputs time information representing a decoding timing, and composition circuit 5 outputs time information representing a composition timing. Multiplexing circuit 6 multiplexes time information together with the compressed data given from each of coding circuits 1, 2 and 4, thereby generating a bit stream.

18 Claims, 56 Drawing Sheets

OTHER PUBLICATIONS

Article "Determining the Outline of International Standard Rated MPEG4", Nikkei Electronics, Sep. 22, 1997, No. 699, pp. 147–168.

ISO/IEC 13818–1, "Information Technology Generic Coding of Moving Pictures and Associated Audio Systems", Apr. 25, 1995, pp. i–xviii, 1–135.

A. Eleftheriadis et al., ISO/IEC JTC1/SC29/WG11 N1825 "Working Draft 5.1 of ISO/IEC 14996–1" Sep. 8, 1997, pp. i–x, 1–222.

ISO/IEC DIS 14772–1, "The Virtual Reality Modeling Language", 1997.

ISO/IEC 11172 (MPEG–1); 1993, pp. iv–vi, 1–49.

* cited by examiner

FIG. 26
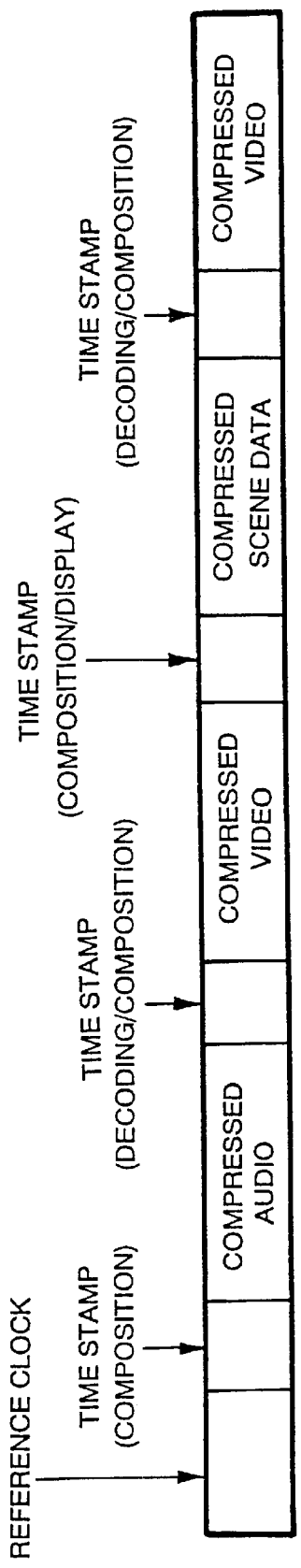
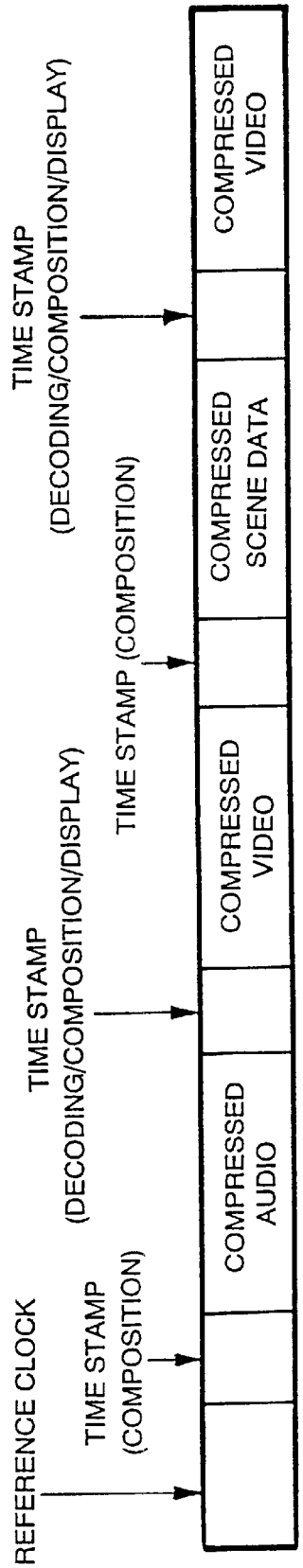

FIG. 27
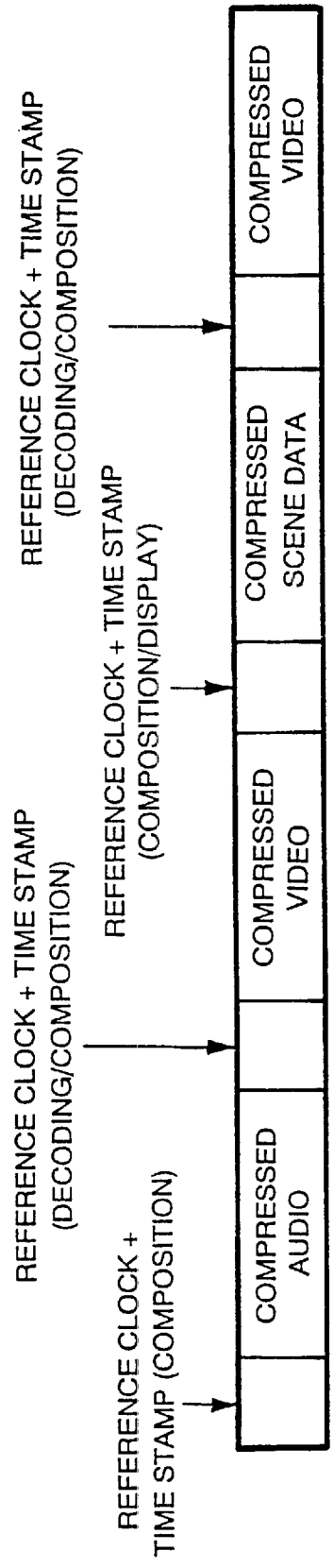
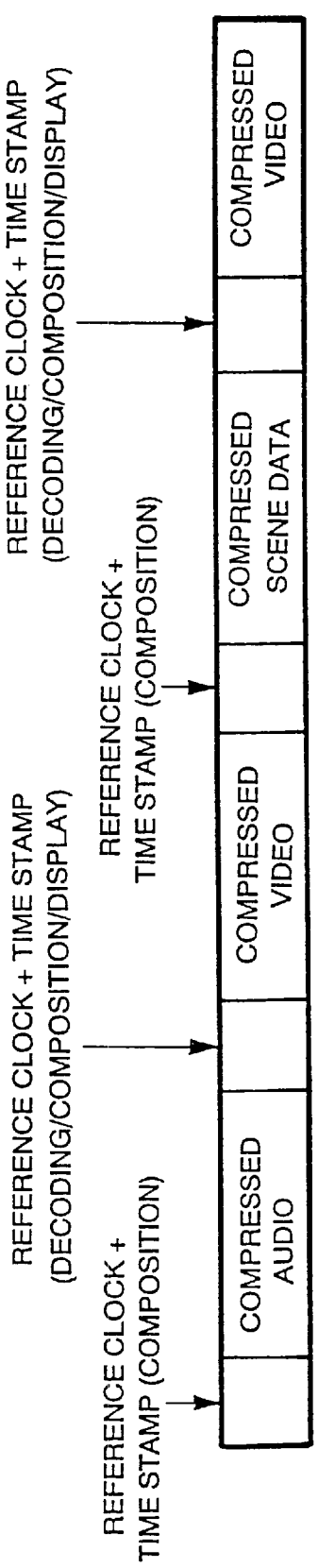

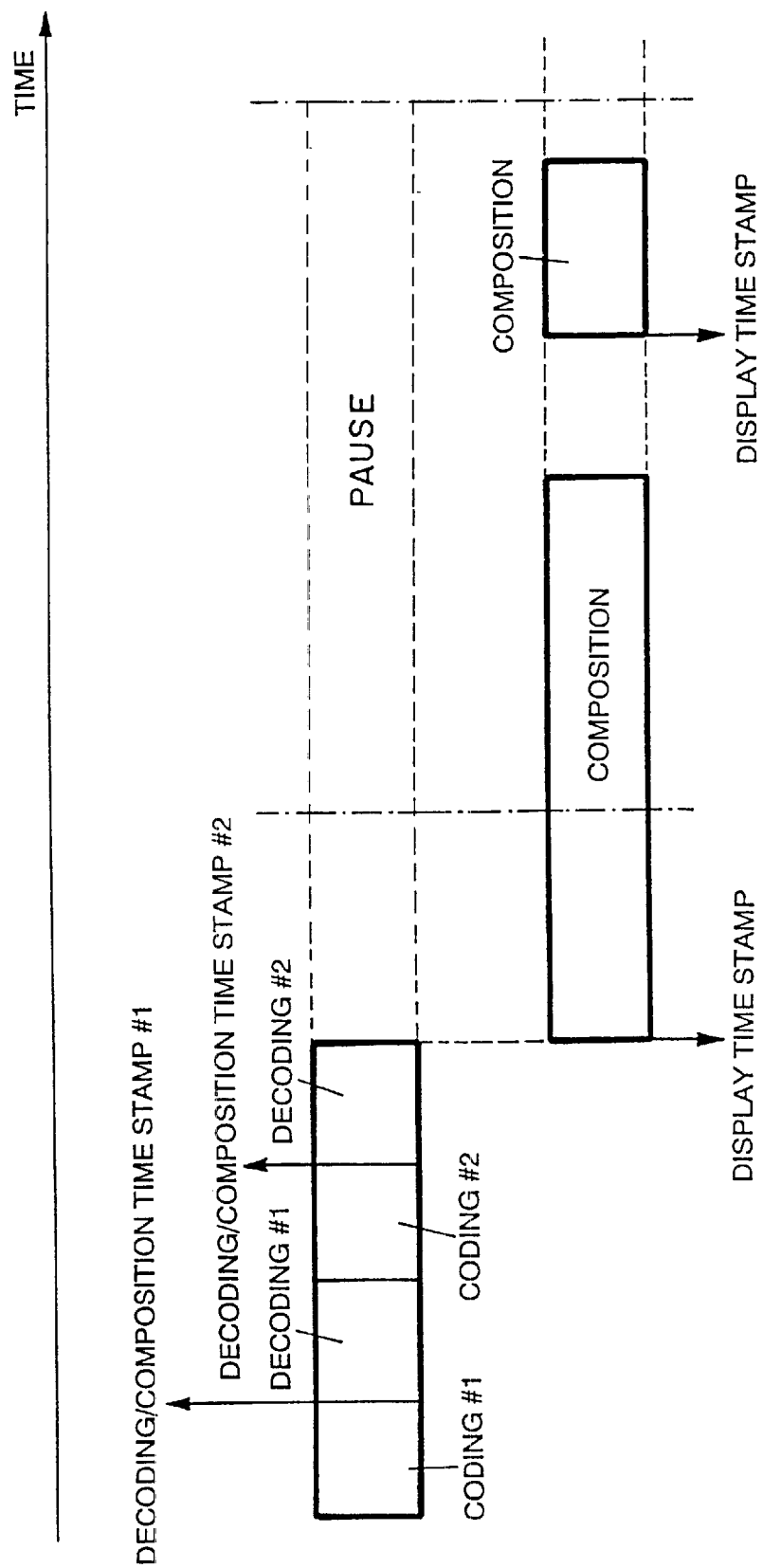
F I G. 35

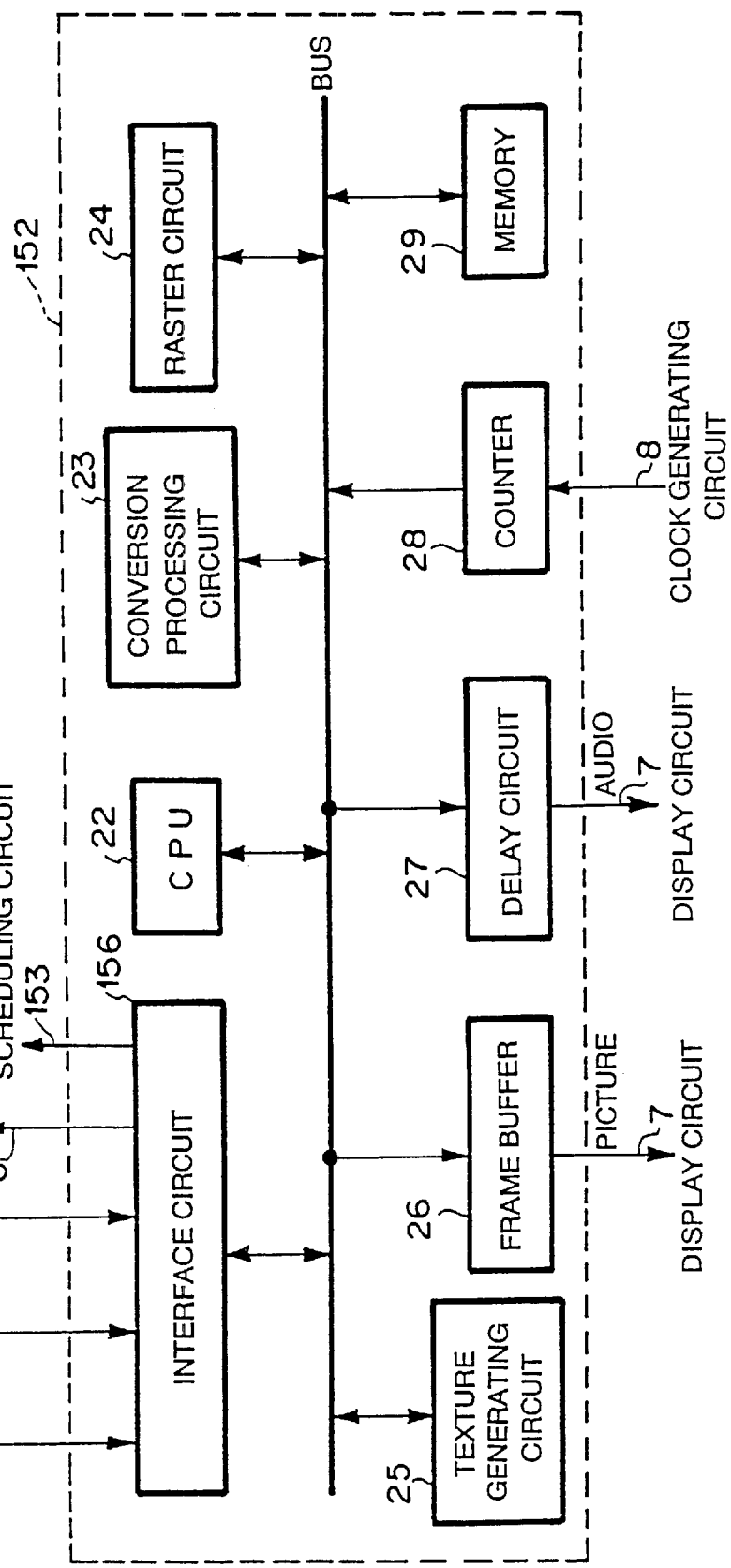
F I G. 46

CODING/DECODING APPARATUS, CODING/DECODING SYSTEM AND MULTIPLEXED BIT STREAM

BACKGROUND OF THE INVENTION

1. Field of the Invention

The present invention relates to a coding/decoding apparatus, a coding/decoding system and a multiplexed bit stream and particularly, to a system for synchronously combining and reproducing natural pictures, voices, and computer graphics.

2. Description of the Related Art

MPEG (Motion Picture Coding Expert Group) has been known as an international standard for coding standardization for compressing, multiplexing and transferring or storing audio signal (or voice signal), video signal, and artificial scene data such as computer graphic, and then separating and expanding the signals and data to obtain original signals. The MPEG is defined by the working group (WG) 11 within SC29 which are managed under JTC1 (Joint Technical Committee 1) for handling common items in data processing fields of ISO (International Organization for Standardization) and IEC (International Electrotechnical Commission). In the MPEG, a mechanism for synchronously reproducing each media from multiplexed data is described.

First, a mechanism for synchronously reproducing an audio signal and a video signal from multiplexed data is described in ISO/IEC 13818-1 "Information Technology Generic Coding of Moving Pictures and Associated Audio Systems" (popularly called MPEG-2 Systems). FIG. 53 of the accompanying drawings shows the construction of a fixed delay model used for the description. This figure shows an abstracted system architecture when MPEG-2 is applied to compress audio signals and video signals.

In FIG. 53, encoder 71 compresses (encodes) audio signal, and encoder 72 compresses (encodes) video signal. Buffer 73 buffers the audio data compressed by the encoder 71, and buffer 74 buffers the video data thus compressed by the encoder 72. Multiplexing circuit 75 multiplexes the compressed audio data LO stored in the buffer 73 and compressed video data stored in the buffer 74. At this time, a reference clock that is needed for synchronous reproduction and time stamps are embedded as additive information into the multiplexed data.

Specifically, the time stamps are a decoding time stamp representing a decoding timing and a display time stamp representing a display timing. The decoding time stamp is generally used only when interpolative prediction is carried out. This is because when the interpolative prediction is carried out, the decoding timing and the display timing are different from each other in some cases. In the other cases, the decoding time stamp is unnecessary.

Storage/transmission device 76 stores or transmits the multiplexed data created by the multiplexing circuit 75. Separation circuit (demultiplexing circuit) 77 separates compressed audio data, compressed video data, and a reference clock and time stamp used for synchronous reproduction from the multiplexed data supplied from the storage/transmission device 76. Buffer 78 buffers the compressed audio data supplied from the separation circuit 77, and buffer 79 buffers the compressed video data supplied from the separation circuit 77. Decoder 80 decodes and reproduces the compressed audio data stored in the buffer 78, and decoder 81 decodes and displays the compressed video data stored in the buffer 79.

The synchronous reproduction of the audio signals and video signals in FIG. 53 is implemented as follows. The reference clock embedded in the multiplexed data is used to control the oscillation frequency of a clock generating circuit for driving the decoder 80 and decoder 81, and PLL (Phased Locked Loop) is generally used. The synchronization between the encoder side and the decoder side is established by the PLL. The time stamp embedded in the multiplexed data is used to transmit the decoding timing of the decoder 80 and decoder 81 or the reproduction/display timing of the decoding result. The time axes of the encoder side and decoder side are synchronized with each other with a fixed delay being set therebetween by the reference clock, and the decoding operation is started at the time which is intended at the encoder side and the reproduction/display is carried out.

Accordingly, the synchronous reproduction of the audio signals and video signals can be implemented insofar as a suitable time stamp is set at the encoder side. In the case of an application in which synchronous reproduction isn't needed between the encoder side and the decoder side, the synchronous reproduction is carried out with the clock of the decoder itself without using the reference clock.

Next, ISO/IEC JTC1/SC29/WG11 N1825 "Working Draft 5.0 of ISO/IEC 14996-1" (popularly called MPEG-4 Systems) describes a mechanism for synchronously reproducing audio signals, video signals, and artificial scene data such as computer graphics from multiplexed data.

FIG. 54 shows a system decoder model (SDM) used for the description of the above mechanism. This model is an abstracted system decoder when MPEG-4 is applied to compress audio signals, video signals, and artificial scene data such as computer graphics. In this paper, detailed description isn't made on the model and concrete construction of the encoder, however, it is described as syntax that a reference clock and a time stamp are embedded as additive information in multiplexed data. Specifically, there are provided two time stamps, a decoding time stamp representing a decoding timing and a composite time stamp representing a timing at which decoded data can be supplied to a composition circuit.

In FIG. 54, a separation circuit 91 separates from the multiplexed data compressed audio data, compressed video data, compressed scene data, and a reference clock and a time stamp used for synchronous reproduction. Buffer 92 buffers the compressed audio data supplied from the separation circuit 91, and buffer 93 buffers the compressed video data supplied from the separation circuit 91. Buffer 94 buffers the compressed artificial scene data supplied from the separation circuit 91. Decoder 95 decodes the compressed audio data stored in the buffer 92, decoder 96 decodes the compressed video data stored in the buffer 93, and decoder 97 decodes the compressed artificial scene data stored in the buffer 94.

Buffer 98 buffers the audio signal decoded by the decoder 95, buffer 99 buffers the video signal decoded by the decoder 96, and buffer 100 buffers the artificial scene data decoded by the decoder 97. Composition circuit 101 composes a scene on the basis of the audio signal stored in the buffer 98, the video signal stored in the buffer 99 and the artificial scene data stored in the buffer 100. At this time, the scene information that is composed is described in the artificial scene data, and in accordance with the scene information the audio signal is modulated or the video signal is deformed, and the signal is mapped to an object in the scene. Display circuit 102 reproduces/displays a scene supplied from the composition circuit 101.

The composition and reproduction of the audio signal, the video signal and the artificial scene data in FIG. 54 is implemented as follows:

The reference clock can be provided every decoder. After it is picked up from the multiplexed data, it is input to a clock generating circuit which is provided every decoder in order to control the oscillation frequency of the clock generating circuit, whereby the synchronization between the encoder side and the decoder side can be established every decoder. The time stamp can be also provided every decoder. After it is picked up from the multiplexed data, it is used to transmit the time at which the decoding timing of the decoder or the decoding result can be supplied to the composition circuit 101. The time axes of the encoder side and the decoder side are synchronized with each other with a fixed delay being set therebetween by the reference clock, and the decoding is started at the time intended by the encoder side and the writing operation into the buffer is carried out.

Subsequently, the composition circuit 101 takes out the audio signal, the video signal and the artificial scene data held in each buffer to perform scene composition. The times at which the audio signal, the video signal and the scene data are obtained by the composition circuit 101 are respectively given on the basis of the composite time stamps added to these signals and data. However, the timing for composing a scene is unclear, and the composition circuit 101 itself is set to start a event processing in accordance with a discrete time event described in the scene data. Finally, the display circuit 102 reproduces and displays the scene supplied from the composition circuit 101.

Further, as representative one of artificial scene data, VRML (Virtual Reality Modeling Language) has been known as a description format to describe computer graphics, transmit or store the data thus described, build and share a virtual three-dimensional space on the of the data. VRML is defined as international standards by SC24 managed under JTC1 (Joint Technical Committee 1) for handling common items in the data processing fields of ISO (International Organization for Standardization) and IEC (International Electrotechnical Commission) and a VRML consortium to which associated companies pertain in cooperation with each other. In this VRML, a description method of taking an audio signal and a video signal into a scene is further described.

The details of the description method are described in ISO/IEC DIS 14772-1 "The virtual Reality Modeling Language (popularly called VRML97). IN the ISO/IEC DIS 14772-1, not only computer graphics, but also ISO/IEC 11172 (popularly called MPEG-1) which is one of the MPEG standards are contained as support targets. MPEG-1 is one of coding international standards for audio signals and video signals. Specifically, the audio signals and the video signals are mapped as a sound source and as a moving picture texture for a three-dimensional object respectively in a three-dimensional scene constructed by VRML. Further, the description of a time event is supported on VRML, and a time event occurs according to a time stamp described in the VRML format.

The time event is further classified into two types; a continuous time event and a discrete time event. The continuous time event is an event in which the action of an animation or the like is continuous on time axis, and the discrete time event is an event in which an object in a scene starts after a time elapses.

FIG. 55 shows the construction of a decoding processing system for receiving the VRML format and constructs a three-dimensional scene (called as "Browser" in VRML). Buffer 111 receives through the internet multiplexed data compressed by MPEG-1 and buffers the data received. Buffer 112 receives through the internet the VRML format or the compressed VRML format and buffers the format received. At this time, the original place of the VRML format may be different from that of the MPEG-1 data.

Separation circuit 113 separates compressed audio data and compressed video data from the MPEG-1 multiplexed data supplied from the buffer 111. Decoder 114 decodes the compressed audio data supplied from the separation circuit 113, and decoder 115 decodes the compressed video data supplied from the separation circuit 114. Decoder 116 decodes the compressed VRML format stored in the buffer 112. When the VRML format is not compressed, no action is taken. Memory 117 stores the audio signal decoded by the decoder 114, and memory 118 stores the video signal decoded by the decoder 115. Memory 119 stores the VRML format decoded by the decoder 116.

Composition circuit 120 synthesizes a scene on the basis of the audio signal stored in the memory 117, the video signal stored in the memory 118 and the artificial scene data stored in the memory 119. In this case, scene information to be composed is described in the artificial scene data. According to the scene information, the audio signal is modulated and the video signal is deformed, and then these signals are mapped into an object in the scene. Display circuit 121 reproduces/displays the scene supplied from the composition circuit 120.

The composite of the audio signal, the video signal and the VRML format in FIG. 55 and the reproduction thereof are implemented as follows:

After the loading of the MPEG-1 multiplexed data from the external to the buffer 111 is terminated, the decoder 114 decodes the compressed audio data and the decoder 115 decodes the compressed video data, and the audio signal and the video signal obtained through the above decoding operation are written into the memory 117 and the memory 118 respectively. Further, after the loading of the VRML format from the external to the buffer 112 is terminated, the decoder 116 decodes the VRML format when the VRML format is compressed or takes no action when the VRML format is not compressed, and then writes the VRML format thus obtained into the memory 119. After the above processing is terminated, that is, the processing of a part surrounded by a dotted line indicated by reference numeral 222 is terminated, the composition circuit 120 and the display circuit 121 start operating to perform composite (mixing), reproduction and display.

On the other hand, when it is intended that only the video signal and the computer graphics are combined with each other, a chromakey system which has been already used for the weather forecast in the present broadcasting system has been known. According to the chromakey system, a person or an object is disposed under the background whose color is specified to a single color such as blue color or the like to shoot an overall picture, and then the background-colored portion is deleted from the picture, whereby only the person or the object in front of the background can be picked up.

FIG. 56 shows the construction of a coding processing system for creating a composite picture of the video signal and the computer graphics by using the chromakey system, and compressing and multiplexing the composite picture and the audio signal. Chromakey processing circuit 131 deletes from an input video signal a portion having the color coincident with the background color. Composition circuit 132 creates a computer graphics image from artificial scene data given. Memory 133 stores a cut-out picture supplied from the chromakey processing circuit 131. In this case, memory 133 may store directly the picture data and inform merely a subsequent-stage convolution circuit 135 that the RGB value corresponding to the background color is deleted. Memory 134 stores the computer graphics picture generated by the composition circuit 132. The convolution circuit 135 overwrites the cut-out picture obtained from the memory 133 on the computer graphics image obtained from the memory 134. It may be also allowed to detect the RGB value corresponding to the background color and replace only pixels located within a specified range by a computer graphics image.

Encoder 136 compresses (encodes) the audio signal. Encoder 137 compresses the composite picture obtained from the convolution circuit 135. Buffer 138 buffers the audio data compressed by the encoder 136, and buffer 139 buffers the composite picture data compressed by the encoder 137. Multiplexing circuit 140 multiplexes the compressed audio data stored in the buffer 138 and the compressed composite picture data stored in the buffer 139. At this time, the reference clock which is necessary for the synchronous reproduction and the time stamp are embedded as additive information into the multiplexed data.

The creation of the composite picture of the video signal and computer graphics is performed in the portion surrounded by a dotted line indicated by reference numeral 141. The other portions correspond to the coding portion of the coding/decoding system shown in FIG. 53. That is, the video signal and the computer graphics are first combined with each other to obtain a composite picture, and then the composite picture and the audio signal are compressed and multiplexed. The construction of the decoding side is the same as that of FIG. 53.

The coding/decoding synchronous reproduction system of the audio signal and the video signal shown in FIG. 53 relates to the coding, multiplexing, separating and decoding for the audio signal and the video signal, and no description is made on the processing of artificial scene data such as computer graphics.

Further, in the decoding synchronous reproduction system of the audio signal, the video signal and the artificial scene data shown in FIG. 54, the decoding timing and the timing at which each data may be supplied to the composition circuit are given. However, the timing at which all the data are composed and the timing at which the composite picture is displayed are not specified. In other words, the composition circuit is set to start its composite operation freely. Further, it is suggested that the composition (mixing) is started in accordance with a discrete time event described in the artificial scene data.

However, the artificial scene data suffers a buffer delay in the decoding operation, and thus a desired time may have passed at the time when the artificial scene data are supplied to the composition circuit 101. Therefore, the artificial scene data itself cannot be used to give an accurate timing for composing. Further, when a continuous time event is described in the artificial scene data, the composition start time is different between the coding side and the decoding side in some cases. Therefore, occurrence of an accurately coincident continuous time event cannot be ensured.

Particularly, in the case of animation or the like for which motion is required to be continuously represented, the position of a moving object is displaced between the coding side and the decoding side. Due to the above problem, a composite picture desired by the coding side cannot be composed while it is accurately coincident at the decoding side.

Further, the decoding and reproducing system of the audio signal, the video signal and the artificial scene data shown in FIG. 55 does not support stream data which are transmitted continuously on time axis. That is, the processing of a portion 122 surrounded by a dotted line must be finished before the reproduction is started.

Still further, in the coding/decoding synchronous reproducing system of the audio signal, the video signal and the artificial scene data shown in FIG. 56, the composite picture is degenerated into a mere two-dimensional picture at the coding side, and thus an interaction function which would be obtained by using the artificial scene data is lost. That is, there is a disadvantage that additive functions such as movement of a visual point in the three-dimensional space, and navigation cannot be implemented.

SUMMARY OF THE INVENTION

An object of the present invention is to provide a coding apparatus, a decoding apparatus, a coding/decoding system and a multiplexed bit stream which implements coding/decoding synchronous reproduction of an audio signal, a video signal and artificial scene data while excluding the disadvantage of the conventional systems described above, ensuring generation of a composite picture desired at the coding side, supporting stream data transmitted continuously on time axis, and supporting the interaction function in the decoding side.

A coding apparatus according to the present invention comprises: audio signal coding means for coding an audio signal; video signal coding means for coding a video signal; interface means for accepting information on a composite scene; scene data coding means for coding scene data supplied from the interface means; composition means for composing a scene from the audio signal supplied from the audio signal coding means, the video signal supplied from the video signal coding means and the composite scene data supplied from the scene data coding means; display means for reproducing/displaying the composite picture signal and the audio signal supplied from the composition means; clock supply means for supplying clocks to the audio signal coding means, the video signal coding means, the scene data coding means and the composition means; and multiplexing means for creating a bit stream on the basis of the time information and compressed audio data supplied from the audio signal coding means, the time information and compressed video data supplied from the video signal coding means, the time information and compressed scene data supplied from the scene data coding means, the time information supplied from the composition means and the clock value supplied from the clock supplying means.

According to the present invention, the coding apparatus further comprises means for detecting the status of the composition means and controlling the operation of the coding means of the video signal.

According to the present invention, the coding apparatus further comprises means for detecting the status of the coding means for the audio signal, the status of the coding means for the video signal and the status of the coding means for the scene data, and controlling the operation of the composition means.

According to the coding apparatus of the present invention, the clock supply means includes first clock supply means for supplying clocks to the audio signal coding means, second clock supply means for supplying clocks to the video signal coding means and third clock supply means for supplying clocks to the scene data coding means and composition means, and the multiplexing means multiplexes the clock values supplied from the first, second, and third clock supply means respectively.

According to the coding apparatus of the present invention, the clock supply means includes first clock supply means for supplying clocks to the audio signal coding means, second clock supply means for supplying clocks to the video signal coding means and composition means, and third clock supply means for supplying clocks to the scene data coding means, and the multiplexing means multiplexes the clock values supplied from the first, second, and third clock supply means respectively.

A decoding apparatus according to the present invention comprises: means for separating both of compressed data and time information of an audio signal, both of compressed data and time information of a video signal, both of compressed data and time information of scene data, time information of scene composition and clock information from a bit stream; means for decoding the audio signal on the basis of the compressed data and time information of the audio signal; means for decoding the video signal on the basis of the compressed data and time information of the video signal; means for decoding the scene data on the basis of the compressed data and time information of the scene data; means for composing a scene on the basis of the time information for the scene composition supplied from the separation means, the audio signal supplied from the decoding means for the audio signal, the video signal supplied from the decoding means for the video signal and the scene data supplied from the decoding means for the scene data; means for generating clocks according to the clock value supplied from the separating means and supplying the clocks to the decoding means for the audio signal, the decoding means for the video signal, the decoding means for the scene data and the composition means; means for reproducing/displaying the composite picture signal and the audio signal supplied from the composition means; and interface means for accepting an interaction from a viewer to the composite picture.

According to a first embodiment of the decoding apparatus, the separation means separates a plurality of independent clock values from the bit stream, and the independent clock values are input to means for supplying the clocks to the decoding means for the audio signal, means for supplying the clocks to the decoding means for the video signal, and means for supplying the clocks to the decoding means for the scene data and the composition means.

According to a second embodiment of the decoding apparatus, the separation means separates a plurality of independent clock values from the bit stream, and the independent clock values are input to means for supplying the clocks to the decoding means for the audio signal, means for supplying the clocks to the decoding means for the video signal and the composition means, and means for supplying the clocks to the decoding means for the scene data.

A multiplexed bit stream according to the present invention comprises an audio signal, a video signal and scene data, characterized in that a flag representing whether time information representing a decoding timing doubles as time information representing a composition timing is added to said time information.

BRIEF DESCRIPTION OF THE DRAWINGS

FIG. 26 is a diagram showing a bit stream generated by the coding apparatus according to the first embodiment of the present invention;

FIG. 27 is a diagram showing a bit stream generated by the coding apparatus according to the fourth embodiment of the present invention;

FIG. 35 is a second time chart for coding, decoding and composition in the case of plural inputs, which is solved by the coding apparatus of the second embodiment of the present invention;

FIG. 46 is a second block diagram showing the construction of the composition circuit of FIG. 5;

DETAILED DESCRIPTION OF THE PREFERRED EMBODIMENTS

Preferred embodiments according to the present invention will be described hereunder with respect to the accompanying drawings.

Figure 1:
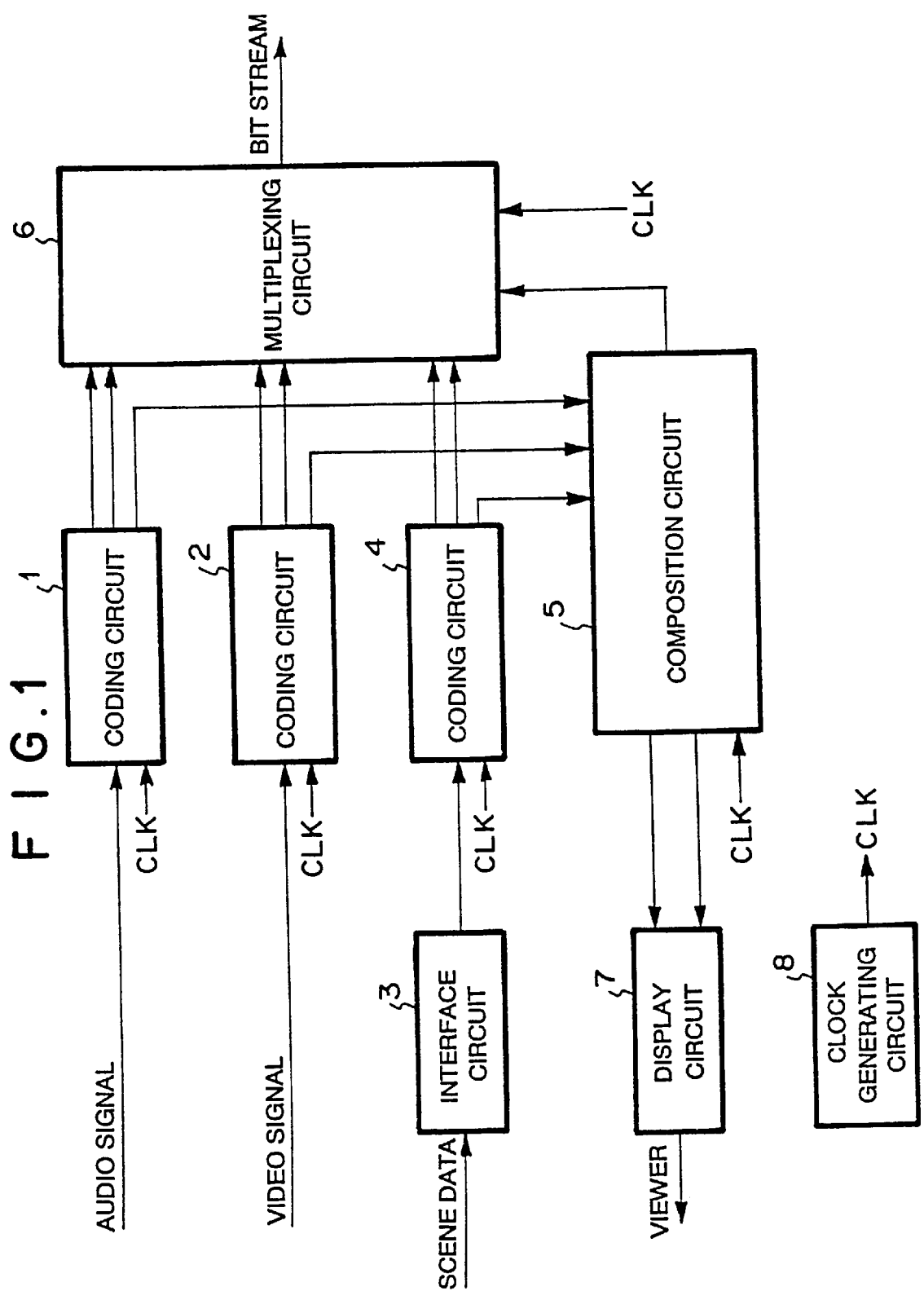
FIG. 1 is a block diagram showing a first embodiment of a coding apparatus according to the present invention.

FIG. 1 is a block diagram showing a first embodiment of a coding apparatus according to the present invention. The coding apparatus shown in FIG. 1 comprises a coding circuit 1 for audio signals (hereinafter referred to as "audio coding circuit"), a coding circuit 2 for video signals (hereinafter referred to as "video coding circuit"), an interface circuit 3 for input of scene data, a coding circuit 4 for scene data (hereinafter referred to as scene coding circuit"), a composition circuit 5, a multiplexing circuit 6, a display circuit 7 and a clock generating circuit 8.

The audio coding circuit 1 compresses an audio signal input thereto, and outputs the compressed data, a time stamp representing a decoding timing and audio data which is locally decoded. The video coding circuit 2 compresses a video signal input thereto, and outputs the compressed data, a timestamp representing a decoding timing and video data which are locally decoded. In place of the video signal, text data, graphics data or the like may be coded in some cases.

The interface circuit 3 for the input of the scene data accepts description, update on composite scenes from a transmitter, and outputs it as scene data. A keyboard input, a mouse input or the like may be used as the interface. The scene coding circuit 4 receives the scene data from the interface circuit 3, and outputs the compressed data of the scene data, a timestamp representing a decoding timing and scene data which are locally decoded. The time stamp generated in each coding circuit may be the same as ISO/IEC JTC1/SC29/WG11 N1825 described in the above-described conventional technique, and a decoding time stamp and a composite time stamp are used.

The decoding time stamp is used for only an interpolative predicted picture, and only the composite time stamp is used for video, audio and scene data of the other prediction modes. That is, the decoding timing and the timing at which the decoding data is allowed to be used by the composition circuit 5 are assumed to be equal to each other. However, it is important that a fixed delay is set between the coding apparatus or a storage medium and the decoding apparatus, and the decoding of the decoding apparatus may be terminated after a fixed time elapses from the time represented by the time stamp.

The composition circuit 5 receives the audio signal output from the audio coding circuit 1, the video signal output from the video coding circuit 2 and the scene data output from the scene coding circuit 4 to compose a scene according to a scene description described in the scene data, and outputs a composite picture, the audio signal and the time stamp representing the composition timing. This time stamp is not shown in ISO/IEC JTC1/SC29/WG11 N1825, and in this specification, it is called as "display time stamp". That is, the composition timing and the display timing are assumed to be equal to each other. However, it is important that a fixed delay is set between the coding apparatus or the storage medium and the decoding apparatus, and the composition of the decoding apparatus may be terminated after a fixed time elapses from the time represented by the time stamp.

The multiplexing circuit 6 receives both of the compressed data and the time stamp representing the decoding timing which are output from the audio coding circuit 1, both of the compressed data and the time stamp representing the decoding timing which are output from the video coding circuit 2, both of the compressed data and the time stamp representing the decoding timing which are output from the scene coding circuit 4, the time stamp representing the composition timing which is output from the composition circuit 5, and clocks supplied from a clock generating circuit 8 described later, and generates and outputs a bit stream.

The display circuit 7 receives the composite picture signal and the audio signal which are output from the composition circuit 5, and display/reproduces the data through a display for video data and through a speaker or the like for audio data. The clock generating circuit 8 generates clocks as clock inputs (CLK) to the audio coding circuit 1, the video coding circuit 2, the scene coding circuit 4, the composition circuit 5, and the multiplexing circuit 6.

Figure 2:
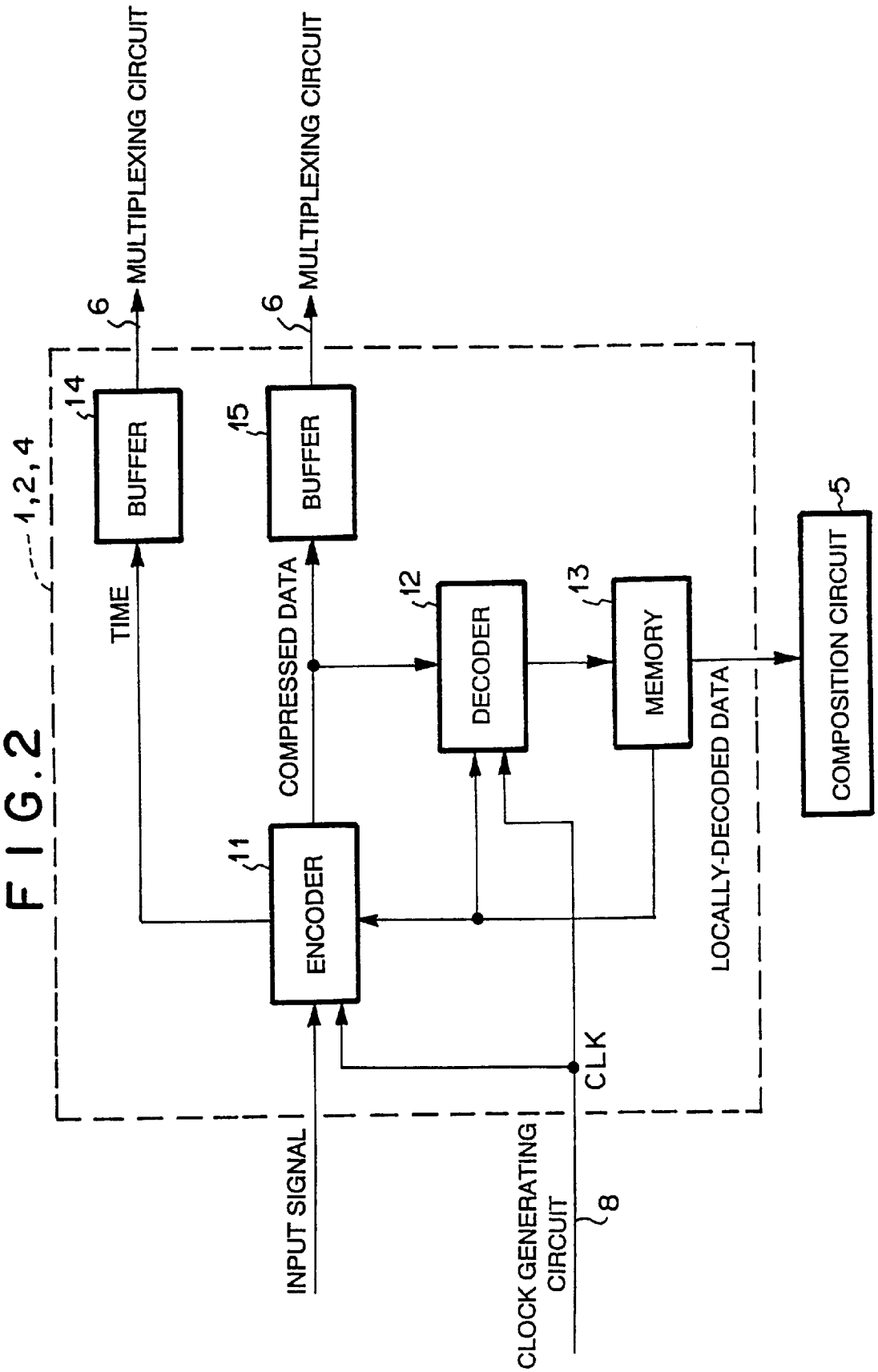
FIG. 2 is a block diagram showing the construction of a coding circuit of FIG. 1.

FIG. 2 shows the construction of the audio coding circuit 1, the video coding circuit 2 and the scene coding circuit 4. The input signals to the respective coding circuits are different from one another, however, the respective coding circuits have the functionally common structure which comprises encoder 11, decoder 12, memory 13, buffer 14 and buffer 15. The encoder 11 receives the input signal and locally decoded data supplied from the memory 13 (described later) and outputs the compressed data. Further, it outputs the time stamp representing the decoding timing. For example, it outputs the time at which the coding is finished. The decoder 12 receives the compressed data output from the encoder 11 and the locally decoded data supplied from the memory 13 and outputs new locally decoded data. The memory 13 stores the locally decoded data supplied from the decoder 12, and outputs the data to the encoder 11 and the composition circuit 5. The buffer 14 buffers the time stamp representing the decoding timing supplied from the encoder 11, and outputs it to the multiplexing circuit 6. The buffer 15 buffers the compressed data output from the encoder 11, and outputs the data to the multiplexing circuit 6. Further, clocks are supplied from the clock generating circuit 8, and these clocks are set as clock inputs (CLK) to the encoder 11 and the decoder 12.

In FIG. 2, the locally decoded data stored in the memory 13 are used as an input to the encoder 11 and the decoder 12 for a subsequent coding process. However, these data may not be used for the subsequent coding process in such a case as coding of a still picture.

Figure 3:
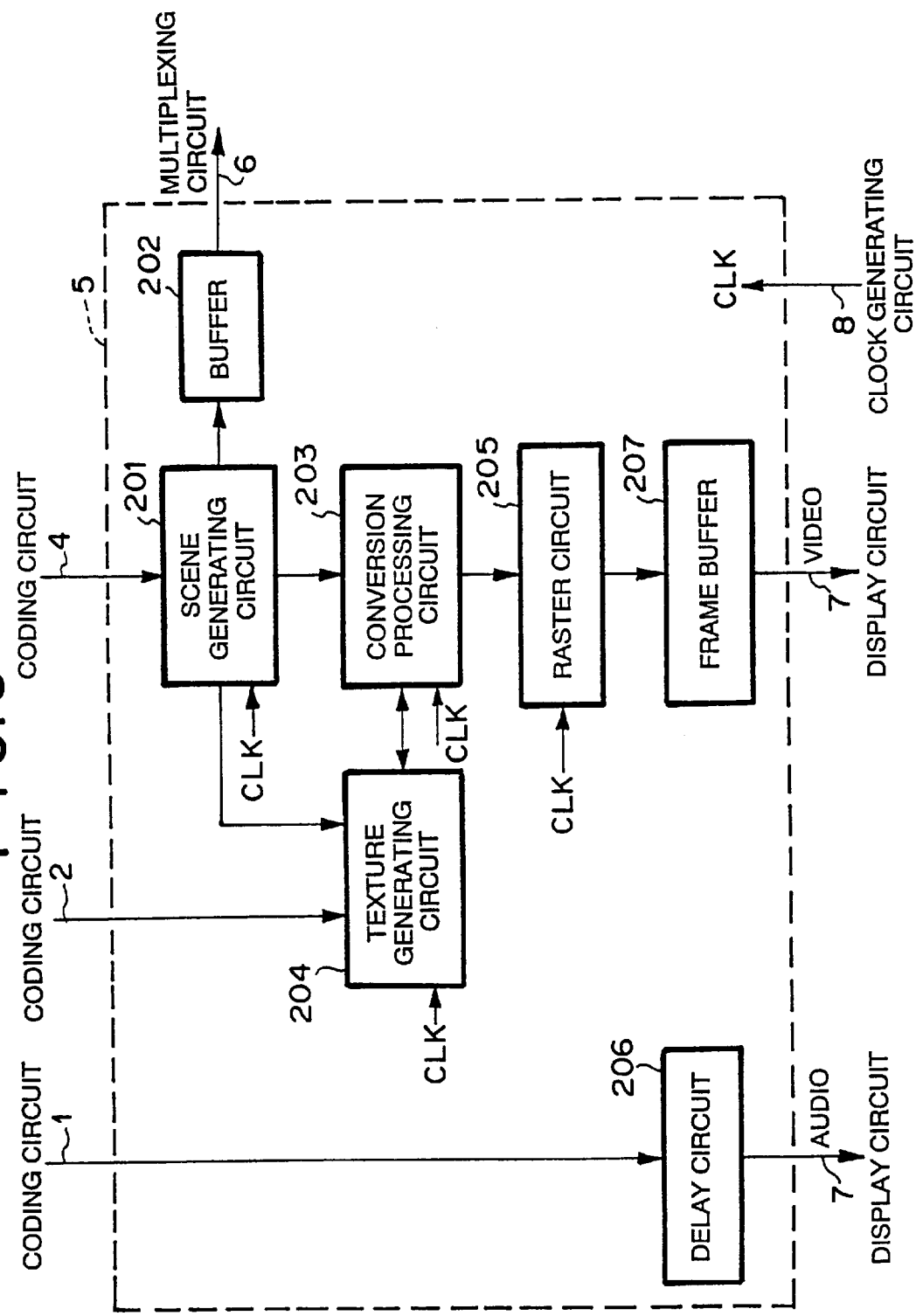
FIG. 3 is a first block diagram showing the construction of a composition circuit of FIG. 1.

FIG. 3 shows the construction of the composition circuit 5 of FIG. 1. The composition circuit 5 comprises scene generating circuit 201, buffer 202, conversion processing circuit 203, texture generating circuit 204, raster circuit 205, delay circuit 206 and frame buffer 207.

The scene generating circuit 201 receives the scene data from the scene coding circuit 4 to generate a scene graph, and outputs a scene drawing command and intermediate data together with a time stamp representing the composition timing. In the case of a two-dimensional scene, coordinate data, graphics data, text data are generated at every object in a scene. Further, the fore-and-aft relationship of respective objects is added. In the case of a three-dimensional scene, setting of a camera, setting of the angle of field of view, setting of a light source, deletion of objects out of the visual field are further performed. The buffer 202 buffers the time stamp representing the composition timing which is supplied from the scene generating circuit 201.

The conversion processing circuit 203 receives a scene drawing command and intermediate data supplied from the scene generating circuit 201 to execute conversion processing such as coordinate transformation, light-source calculation, clipping and outputs new intermediate data. Further, it receives a texture from a texture generating circuit 204 described later, and maps it into an object in a scene. In the case of the two-dimensional scene, movement, rotation, enlargement, reduction of object, and other processing are carried out. In the case of the three-dimensional scene, the effect of the light source, and hidden surface algorithm in depth direction are further carried out. Through the above processing, the position information and the color information of each object in a scene that is viewed from a current visual point are determined and output.

The texture generating circuit 204 receives the video data supplied from the video coding circuit 2, the drawing command supplied from the scene generating circuit 201 and the coordinate information supplied from the conversion processing circuit 203, deforms into a texture the video data which are mapped into an object in a scene, and then outputs the texture thus obtained. The present invention is based on the assumption that the scene composition is repeated every frame, and thus it is general that the video data corresponds to one picture.

The raster circuit 205 receives the intermediate data from the conversion processing circuit 203 to convert the intermediate data to raster data on a pixel basis. The delay circuit 206 receives the audio data from the audio coding circuit 1 to delay the audio data in consideration of the time lapse of the processing executed from the scene generating circuit 201 to the raster circuit 205, and outputs the audio data thus delayed to the display circuit 7. The frame buffer 207 stocks the raster data supplied from the raster circuit 205, and outputs the raster data thus stored to the display circuit 7. The scene generating circuit 201, the conversion processing circuit 203, the texture generating circuit 204 and the raster circuit 205 are supplied with the clocks (CLK) from the clock generating circuit 8.

Figure 45:
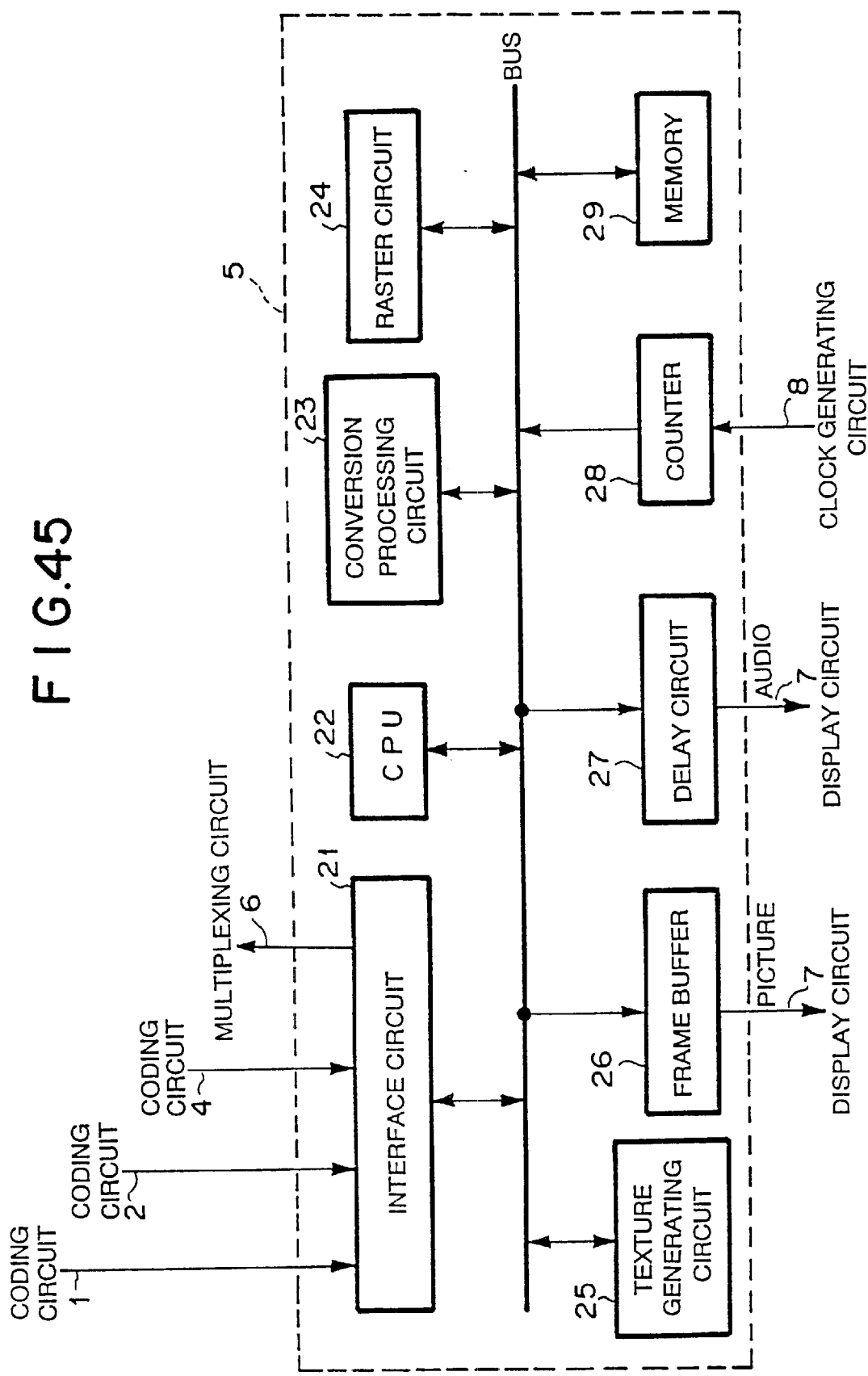
FIG. 45 is a second block showing the construction of the composition circuit of FIG. 1.

FIG. 45 shows another embodiment of the composition circuit 5 of FIG. 1, and the composition circuit 5 comprises interface circuit 21, central processing unit (CPU) 22, conversion processing circuit 23, raster circuit 24, texture generating circuit 25, frame buffer 26, delay circuit 27, counter 28 and memory 29. The respective circuits are connected to one another through a bus.

The interface circuit 21 receives the audio data supplied from the audio coding circuit 1, the video data supplied from the video coding circuit 2 and the scene data supplied from the scene coding circuit 4 and outputs the time stamp representing the composition timing described later to the multiplexing circuit 6. That is, it serves as an interface between each circuit connected to the bus and the external.

CPU 22 performs various software processing such as initial-stage processing needed for scene composition, generation of a scene graph on the basis of the scene data supplied from the scene coding circuit 4, allocation of an operation to each circuit on the basis of analysis of the scene graph, a schedule management of each more general circuit resource. Further, it outputs the time stamp representing the composition timing to the interface circuit 21, and performs an emulation of operation frequency control by using a clock calculation value given from the counter 28 described later.

The conversion processing circuit 23 performs the same processing as the conversion processing circuit 203 shown in FIG. 3 in response to the drawing command from the CPU 22. The raster circuit 24 performs the same processing as the raster circuit 205 of FIG. 3 in response to the drawing command from the CPU 22. The raster data thus finally obtained are written into the frame buffer 26 described later. The texture generating circuit 25 performs the same processing as the texture generating circuit 204 of FIG. 3 in response to the drawing command from the CPU 22. The frame buffer 26 stores the raster data obtained from the raster circuit 24 and outputs the data thus stored to the display circuit 7. The delay circuit 27 delays the audio signal from the audio coding circuit 1 in consideration of the calculation time for a series of composition processing, and outputs the audio signal thus delayed to the display circuit 7. The counter 28 counts the number of clocks supplied from the clock generating circuit 8, and outputs the count number to the CPU 22 as occasion demands.

In this case, the operation frequency of the CPU 22, the conversion processing circuit 23, the raster circuit 24 and the texture circuit 25 is given from another clock generating circuit. However, the clocks supplied from the clock generating circuit 8 may be used. The memory 29 is used to store control data and intermediate data needed for the calculation in each of the CPU 22, the conversion processing circuit 23, the raster circuit 24 and the texture generating circuit 25.

Figure 4:
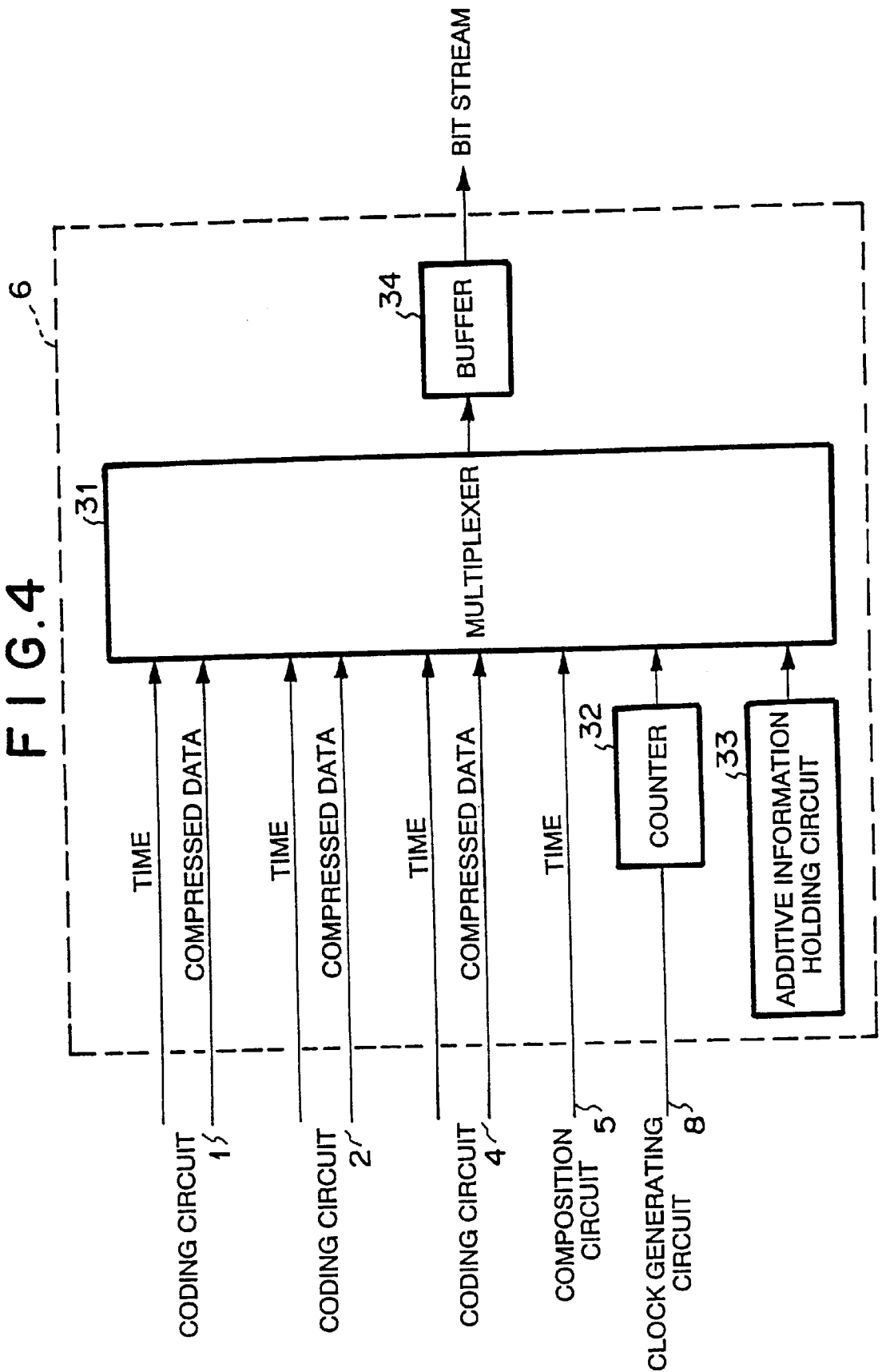
FIG. 4 is a block diagram showing the construction of a multiplexed circuit of FIG. 1.

FIG. 4 is a diagram showing the construction of the multiplexing circuit 6 of FIG. 1, and the multiplexing circuit 6 comprises multiplexer 31, counter 32, additive information holding circuit 33, and buffer 34. The multiplexer 31 multiplexes the compressed data of the audio signal and the time stamp representing the decoding timing which are supplied from the audio coding circuit 1, the compressed data of the video signal and the time stamp representing the decoding timing which are supplied from the video coding circuit 2, the compressed data of the scene data and the time stamp representing the decoding timing which are supplied from the scene coding circuit 4, the time stamp representing the composition timing supplied from the composition circuit 5, a clock count value supplied from the counter 32 described later, and additive information supplied from the additive information holding circuit 33 described later, and generates and outputs a bit stream.

The counter 32 counts the clocks supplied from the clock generating circuit 8, and outputs the count number. The additive information holding circuit 33 holds overhead information that is preset to be added for generation of a bit stream, and outputs the overhead information. The buffer 34 buffers the bit stream output from the multiplexer 31 and outputs the bit stream. The buffer 34 is needed when the present invention is applied to a transmission system, however, it is not necessarily required when the present invention is applied to a storage system.

Next, the operation of the coding apparatus according to the present invention will be described with reference to FIGS. 1 to 4 and FIG. 45.

Each of the audio coding circuit 1, the video coding circuit 2 and the scene coding circuit 4 performs compression coding on the input signal thereto, and also outputs the time stamp representing the decoding timing. As shown in FIG. 2, the encoder 11 first performs compression processing by using the input signal and the locally-decoded data output from the memory 13, and writes the compressed data into the buffer 15. At the same time, the encoder 11 outputs the time stamp representing the decoding timing, and writes the time stamp into the buffer 14. Subsequently, the decoder 12 decodes the compressed data supplied from the encoder 11, and adds the compressed data thus decoded to the locally-decoded data supplied from the memory 13 to create new locally-decoded data. This locally-decoded data is newly written into the memory 13.

The interface circuit 3 to the scene data supports various input modes for scene design and scene update such as a keyboard input, a mouse input, and it converts input data to coherent scene data and outputs the data thus obtained to the scene coding circuit 4. With respect to specific scene data, use of data replacement and data differential may be considered as in the case of the concepts of the intra-frame coding, inter-frame coding of video signals. The switching between the data replacement and the data differential is managed by the scene coding circuit 4 in response to an instruction from the interface circuit 3. Since VRML is originally text data, there may be considered a mode in which compression isn't performed and scene data are directly transmitted.

The composition circuit 5 performs the scene composition by using the audio data obtained from the audio coding circuit 1, the video data obtained from the video coding circuit 2 and the scene data obtained from the scene coding circuit 4. At the same time, it outputs the time stamp representing the composition timing. In this case, each of the data is directly used the locally-decoded data stored in the memory of the coding circuit. More specifically, as shown in FIG. 3, the scene generating circuit 201 creates a scene graph on the basis of the scene data supplied from the scene coding circuit 4, and outputs the scene drawing command and the intermediate data. At this time, it outputs the time stamp representing the composition timing at the same time, and writes it into the buffer 202. Subsequently, the conversion processing circuit 203 executes the above conversion processing on the basis of the drawing command from the scene generating circuit 201, and outputs the coordinate information and the color information of an object.

Further, the texture data supplied from the texture generating circuit 204 are mapped into an object in a scene. In parallel to the processing, the texture generating circuit 204 deforms the video data obtained from the video coding circuit 2 on the basis of the drawing command supplied from the scene generating circuit 201 and the coordinate information supplied from the conversion processing circuit 203. The conversion processing circuit 203 and the texture generating circuit 204 execute the respective processing while communicating data therebetween.

Subsequently, the raster circuit 205 converts the data from the conversion processing circuit 203 to raster data on a pixel basis on the basis of the coordinate information and the color information of the object which are supplied from the conversion processing circuit 203, and writes the conversion result into the frame buffer 207. The audio signal supplied from the audio coding circuit 1 is delayed and output by the delay circuit 206. The same operation is also carried out in the construction of FIG. 45. In this case, not only the audio signal is delayed, but also a special effect and other effects can be easily implemented by CPU 22.

There is a case where an event dependent on time is described in the scene data. This event is classified into a continuous event which varies on time axis, and a discrete event which is one-shot event on time axis. With respect to processing of these events, the continuous event is processed as an event occurring at the time stamp representing the composition timing, and the discrete event is processed as an event occurring at the time when the time stamp representing the composition timing passes the generation time of the discrete even. Accordingly, when the same event processing is carried out according to the time stamp representing the composition timing at the reception side, it is ensured that the same composition result can be implemented at both the transmission side and the reception side.

The specific processing is carried out by the scene generating circuit 201 of FIG. 3 or the CPU 22 of FIG. 45. Therefore, the scene generating circuit 202 or the CPU 22 has a counter or the like at the inside or the outside thereof for time management. The counter is set to zero at the time when a session is started, and it is driven with clocks supplied by the clock generating circuit 8 in the case of the scene generating circuit 202, while it is driven with clocks which exist independently of the clock generating circuit 8 in the case of the CPU 22.

The multiplexing circuit 6 multiplexes the compressed data, the time stamp and the reference clock value to generate a bit stream. More specifically, as shown in FIG. 4, in accordance with a predetermined timing, the multiplexer 31 multiplexes the compressed data and the time stamp supplied from the audio coding circuit 1, the compressed data and the time stamp supplied from the video coding circuit 2, the compressed data and the time stamp supplied from the scene coding circuit 4, the time stamp supplied from the composition circuit 5, the count value of the clocks supplied from the counter 32 and an overhead representing system information supplied from the additive information holding circuit 33.

The counter 32 counts the clocks supplied from the clock generating circuit 8, and outputs the count value thereof. The additive information holding circuit 33 holds not only the overhead representing the system information, but also multiplexing management information such as the bit length of each data to be multiplexed, the time stamp and supplies the information as control information to the multiplexer 31. As a specific mode of the additive information holding circuit may be used ROM containing predetermined fixed data, a ROM card or RAM into which data are loaded at an initialization time through a keyboard or the like.

FIG. 26 shows a finally-obtained bit stream. That is, the bit stream comprises the reference clock value, and the time stamps and compressed data for audio, video, scene data respectively. Each time stamp representing the decoding timing is appended to the corresponding compressed data, and the time stamp representing the composition timing is selectively appended to the compressed video data, to the compressed scene data, or out of the compressed data as in the case of the reference clock.

The display circuit 7 performs display and reproduction of the composite picture signal and the audio signal supplied from the composition circuit 5, whereby a transmitter can observe, on the spot, a picture desired to be composed by itself and the audio signal thereof. Further, the scene can be suitably updated through the interface circuit 3. The clock generating circuit 8 continues to generate clocks (CLK) in a coherent way, and supplies the clocks thus generated to the audio coding circuit 1, the video coding circuit 2, the scene coding circuit 4, the composition circuit 5 and the multiplexing circuit 6.

Figure 28:
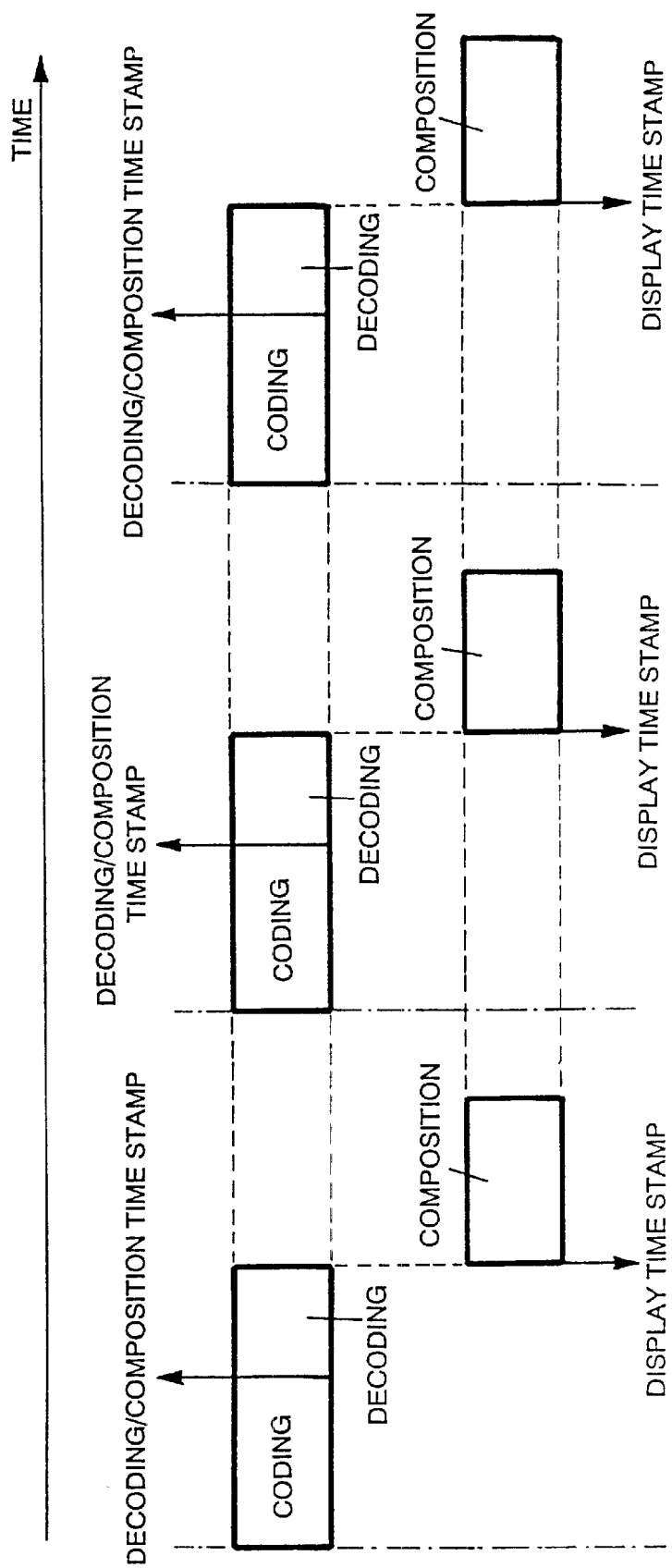
FIG. 28 is a time chart for normal coding, decoding and composition.

In the coding apparatus of the first embodiment according to the present invention, no consideration is given to the delay needed to the composition processing. That is, when all the processing is carried out while the frame rates thereof are kept within given limits, the time chart representing the processing flow for coding, decoding and composition at the coding apparatus side is shown in FIG. 28. Here, the coding corresponds to the processing of the encoder in the coding circuit, and the decoding corresponds to the processing of the decoder in the coding circuit, that is, the creation of the locally-decoded data. The composition corresponds to the processing of the composition circuit. The time period from the start time of a coding operation to the start time of the next coding operation corresponds to the frame rate of the input video signal. Further, the time period from the start time of a composition operation to the start time of the next composition operation corresponds to the frame rate of the composite picture. In FIG. 28, the coding, the decoding and the composition are expressed as sequential processing. However, by dividing each of the coding and decoding operations into plural threads, the parallel processing on plural signals may be supported. An example of the occurrence timing of the decoding time stamp and the composition time stamp is shown in FIG. 28. However, for the purpose of keeping a fixed delay between the coding apparatus side and the decoding apparatus side, the occurrence timing may be set to the time when the decoding, composition are terminated, or to any time. In this case, the coding and the decoding are assumed to be absolutely finished within one frame period.

Figure 29:
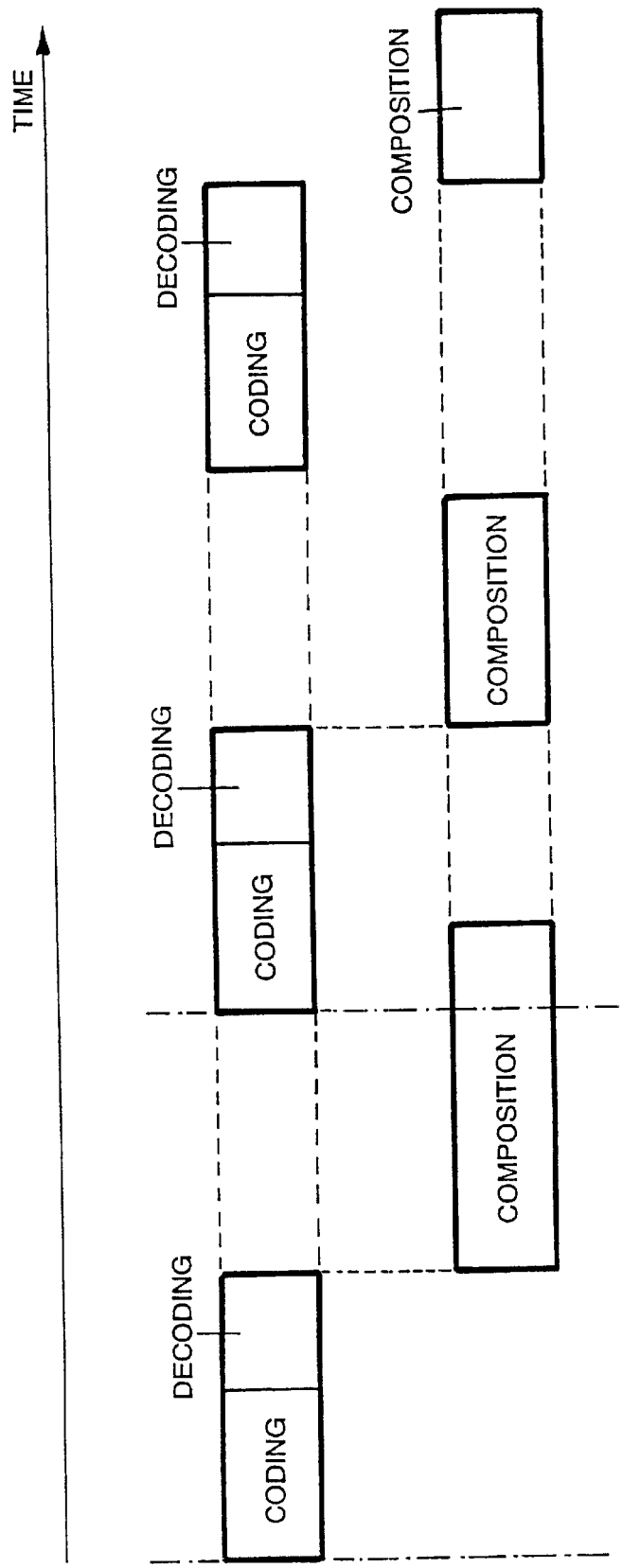
FIG. 29 is a time chart for coding, decoding and composition when excessive time is needed for composition.

On the other hand, when the composition time is needed to be long, there is a case where it is required to continue the composition operation until the time of the next composition frame as shown in FIG. 29. When the parallel processing of the coding/decoding and the composition is not supported, or when the coding/decoding and the composition cannot be executed in parallel due to a competition problem of an access to the memory for storing the locally-decoded data, it is difficult to continue the composition or the coding/decoding no longer.

Figure 30:
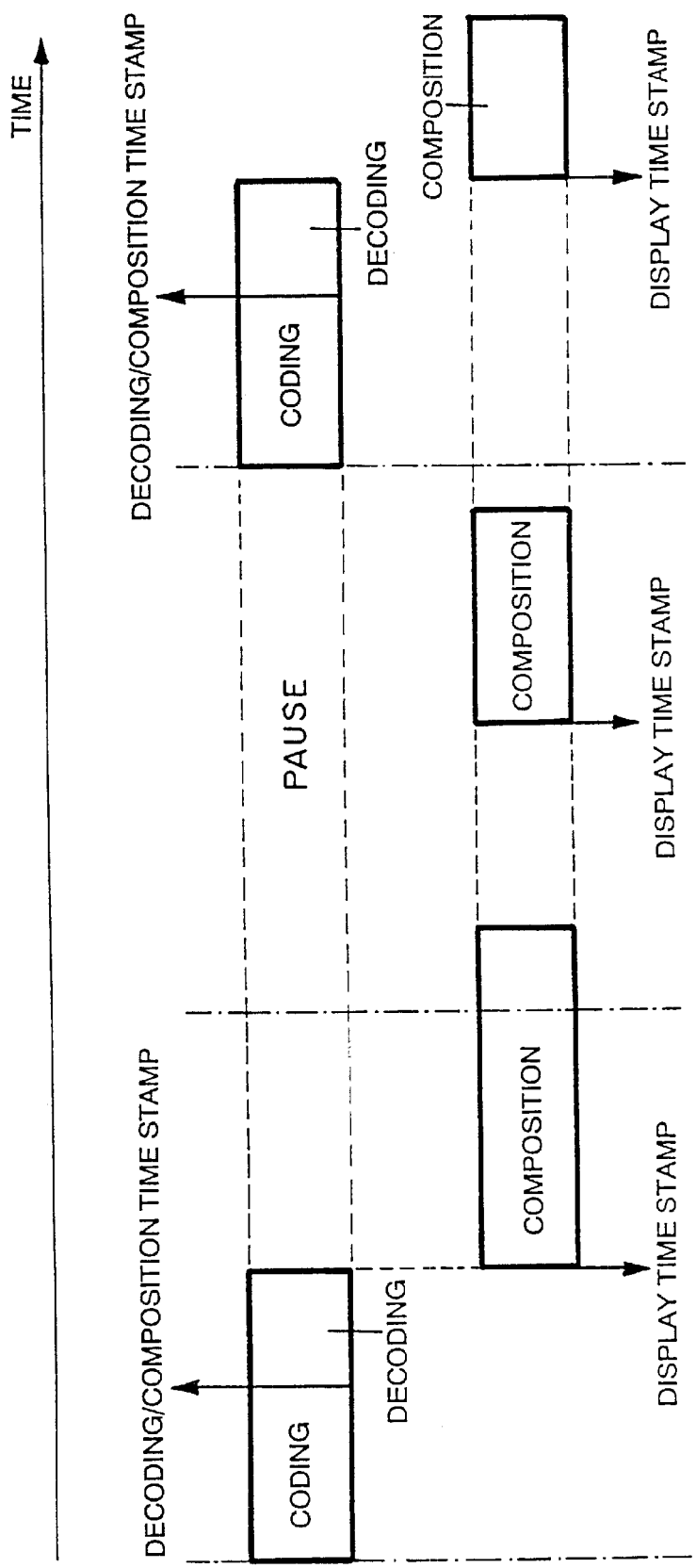
FIG. 30 is a time chart for coding, decoding and composition, which is solved by the coding apparatus of the second embodiment of the present invention.

As a countermeasure to the above case, by performing the coding, decoding and composing processing through the time chart of FIG. 30, the coding/decoding can be continued. That is, when the composition processing is not terminated until the time set at the coding apparatus side, the coding/decoding processing of the video frame at that time is paused, and the extra time corresponding to the pause time is allocated to the composition processing. For the video data of the paused frame, nothing (containing the time stamp) is transmitted, or the coding is performed on the assumption that there is no variation between the frame concerned and the preceding frame. After the composition of the frame concerned is terminated, a next composition operation is started in accordance with the frame rate of the composite picture. When the composition concerned is continued until this time point, the composition circuit itself pauses for the next composition. However, the coding operation is not paused because if the coding of the audio signal is paused, sound quality would be remarkably reduced due to occurrence of missed sections.

Figure 31:
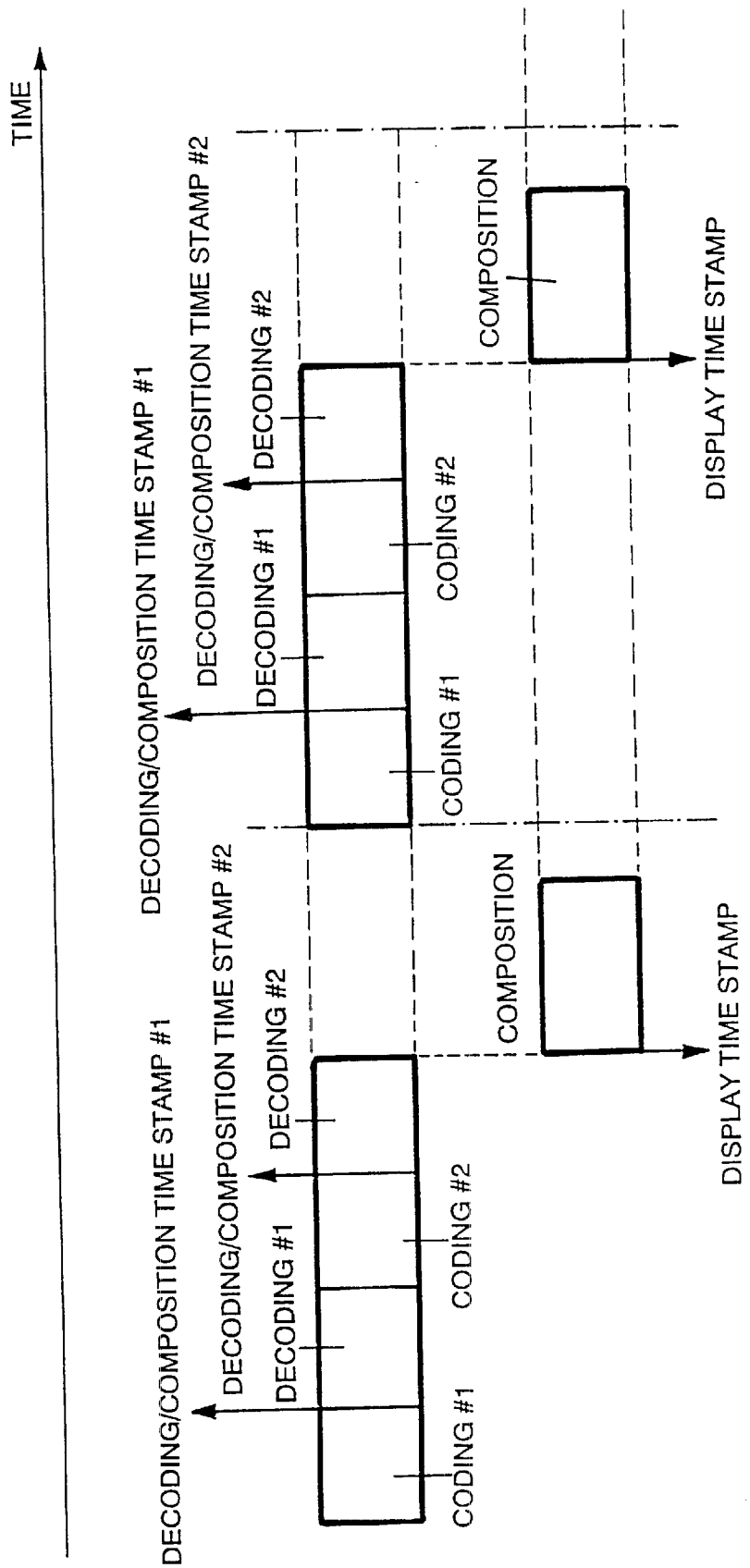
FIG. 31 is a time chart for normal coding, decoding and composition in the case of plural inputs.

FIG. 31 is a time chart for the coding, the decoding and the composition when the coding/decoding for plural input signals is carried out. The coding/decoding operation is sequentially carried out on two input signals, and then the composition processing is carried out. The decoding time stamp and the composition time stamp are generated as shown in FIG. 31, respectively.

Figure 32:
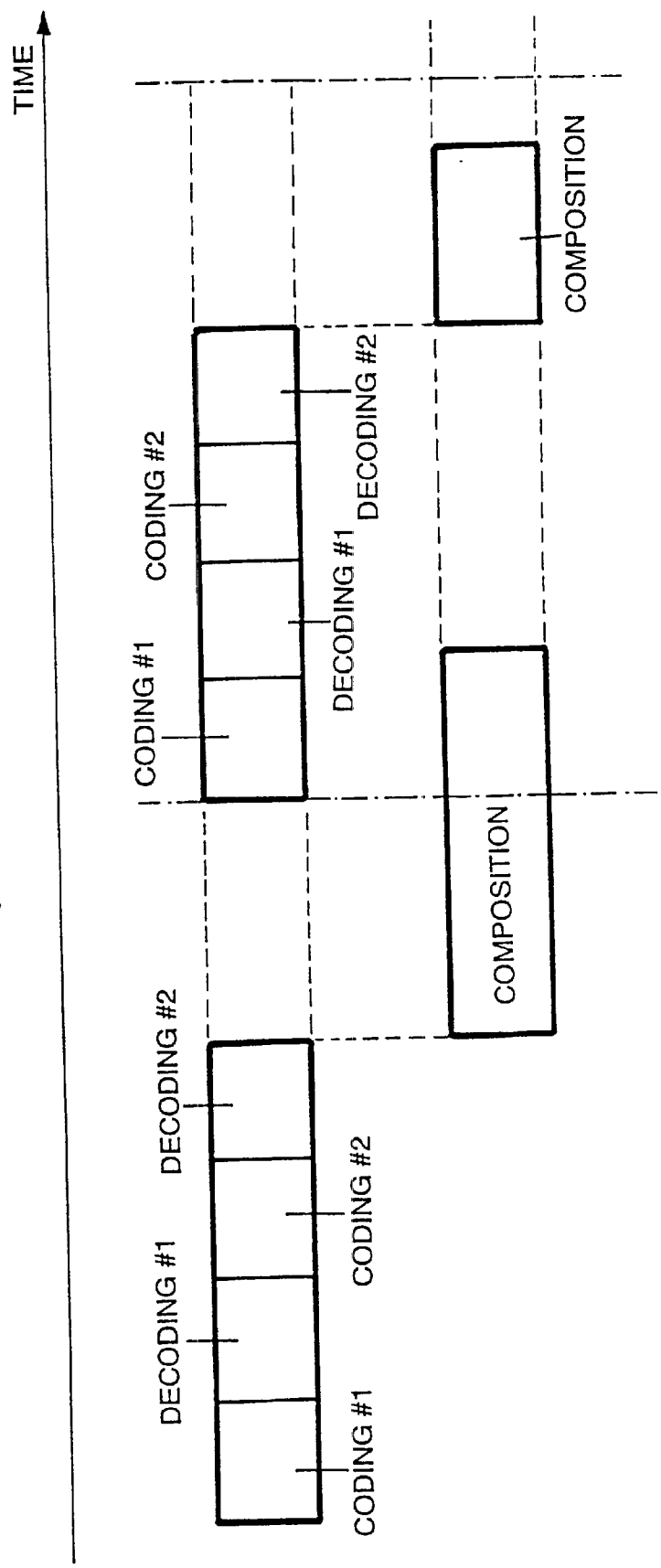
FIG. 32 is a first time chart for coding, decoding and composition when excessive time is needed for composition in the case of plural inputs.
Figure 33:
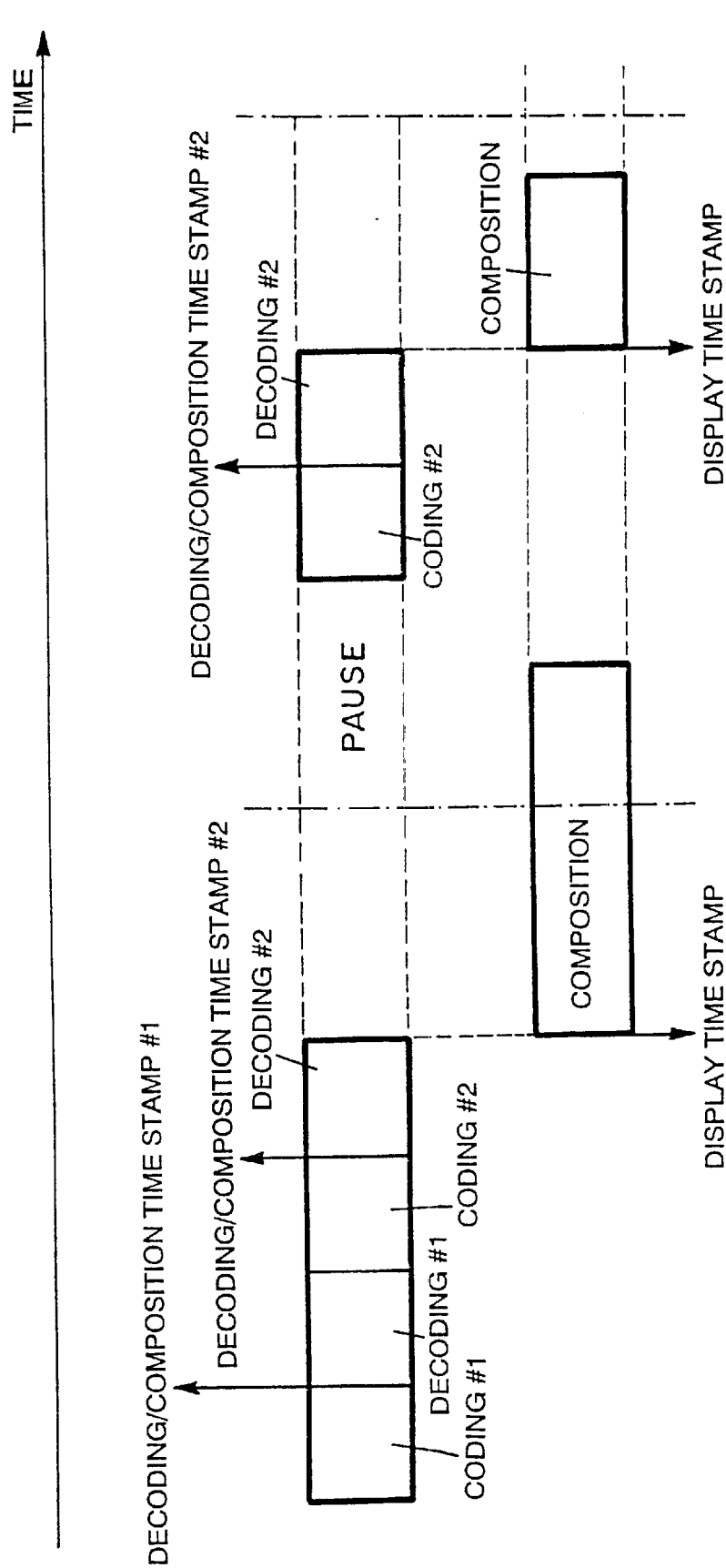
FIG. 33 is a first time chart for coding, decoding and composition in the case of plural inputs, which is solved by the coding apparatus of the second embodiment of the present invention.

FIG. 32 is a time chart when the composition processing is continued until a first input signal of a next frame. In this case, as shown in FIG. 33, the coding/decoding processing of the first input signal is paused, and for the video data of the paused frame, nothing (containing the time stamp) is transmitted, or the coding is performed on the assumption that there is no variation between he frame concerned and the preceding frame. For a second input signal, the coding/decoding is carried out, and the composition is carried out.

Figure 34:
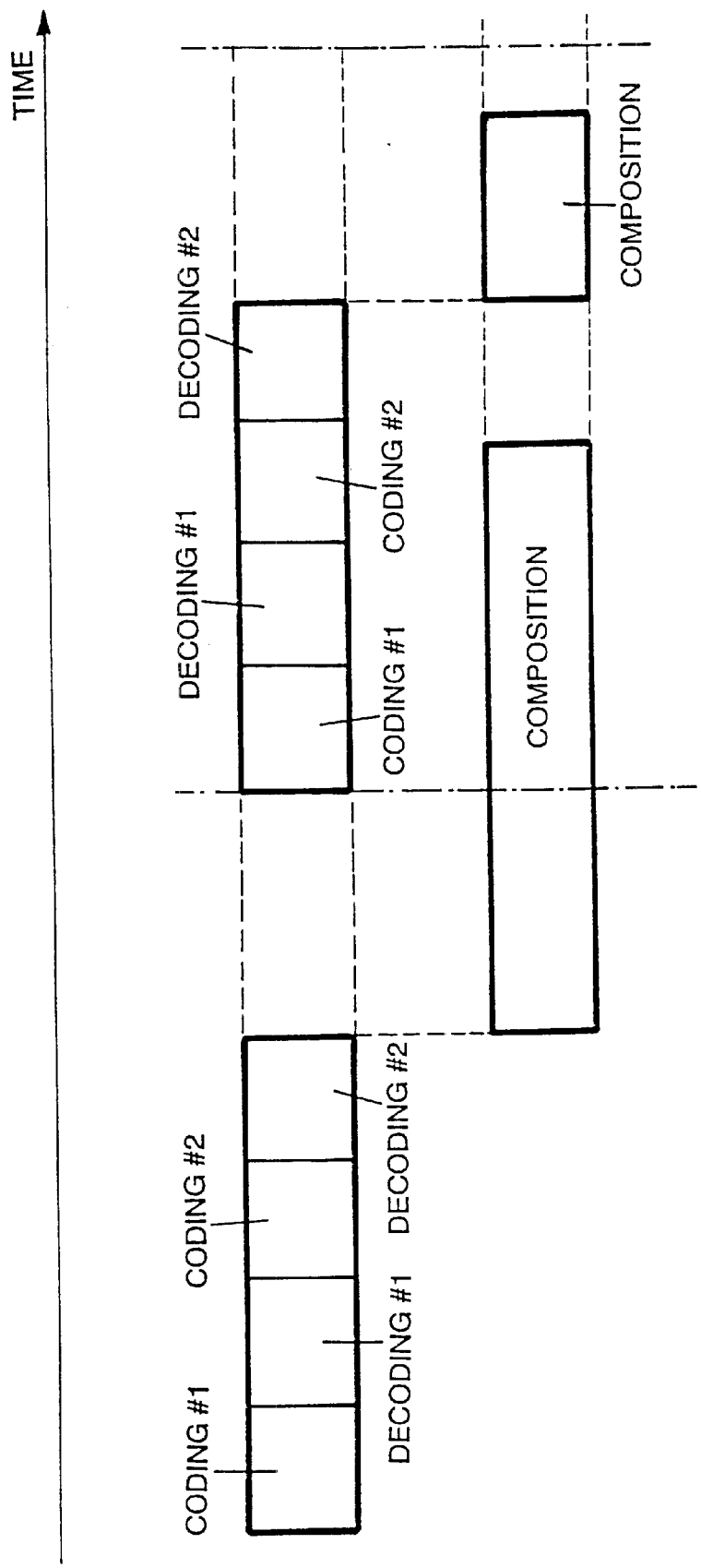
FIG. 34 is a second time chart for coding, decoding and composition when excessive time is needed for composition in the case of plural inputs.

Likewise, FIG. 34 is a time chart when the composition processing is continued until the second input signal of the next frame. In this case, as shown in FIG. 35, the coding/decoding of the first input signal and the coding/decoding of the second input signal are paused. For the video data of the paused frame, nothing (containing the time stamp) is transmitted, or the coding is carried out on the assumption that there is no variation between the frame concerned and the preceding frame.

When the composition processing concerned is not finished until the time when the next composition processing is carried out, the composition circuit itself pauses for the next composition processing. In the decoding apparatus, the decoding and composition operations are carried out in accordance with the time stamp in the bit stream, and thus when no decoding time stamp exists, the decoding processing is automatically skipped. Therefore, the frame rate of the video signal is temporarily reduced, however, the composition processing is stably performed.

Figure 5:
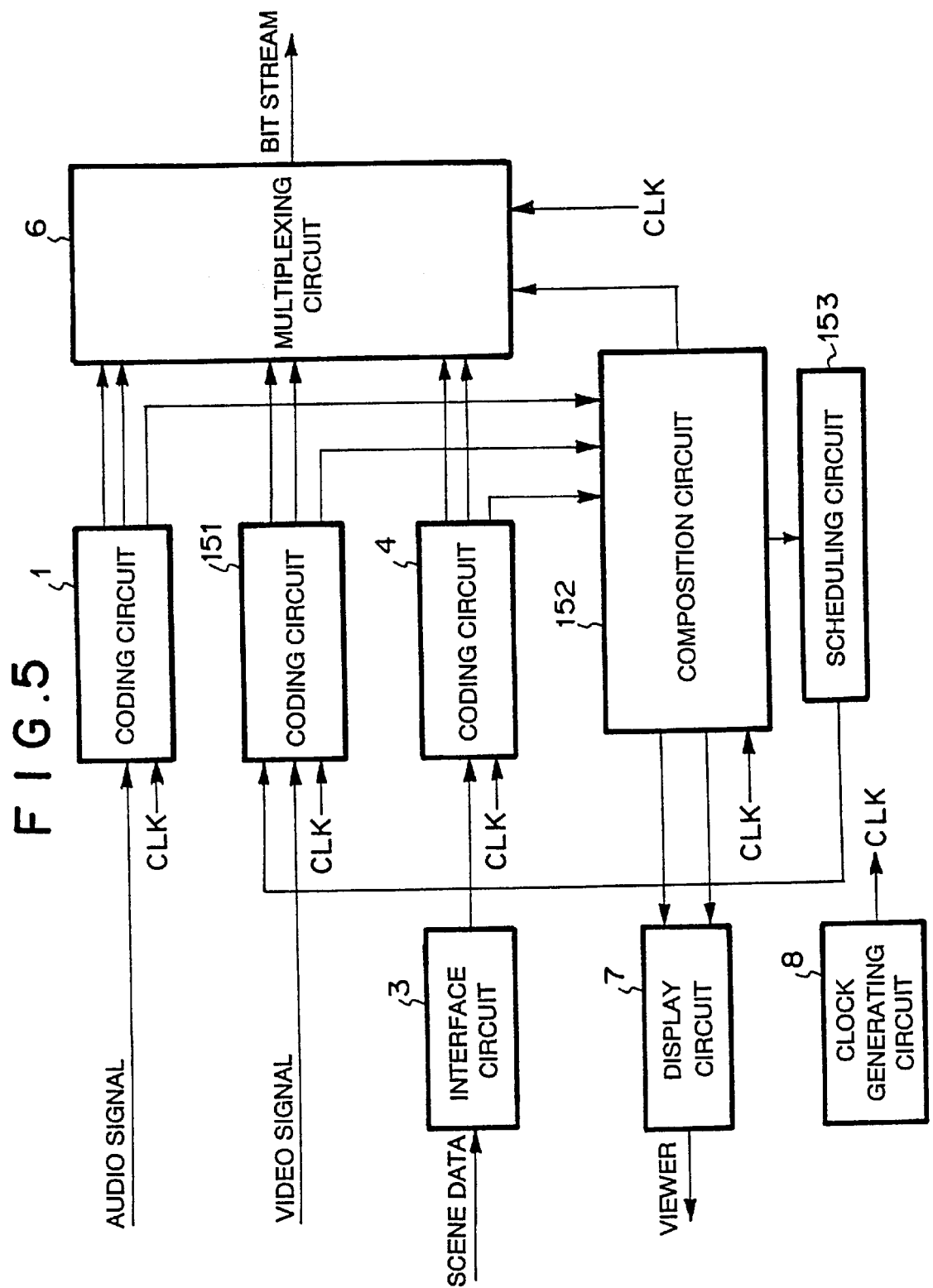
FIG. 5 is a block diagram showing a second embodiment of the coding apparatus according to the present invention.

FIG. 5 is a block diagram showing a second embodiment of the coding apparatus which is designed so that the coding/decoding can be continued even in the case where the continuity of the composition is requested until the time of the next composite frame.

In this embodiment, the coding apparatus of the first embodiment is newly added to scheduling circuit 153. That is, the video coding circuit 151 is added to a control line extending from the scheduling circuit 153 in addition to the construction of the video coding circuit 2 of FIG. 1. In addition to the construction of the composition circuit 5 of FIG. 1, a composition circuit 152 is designed so as to output a signal representing the composition status, that is, whether the composition is terminated or not, to the scheduling circuit 153. Upon receiving the composition status signal from the composition circuit 152, the scheduling circuit 153 controls the operation of the coding circuit 151.

Figure 6:
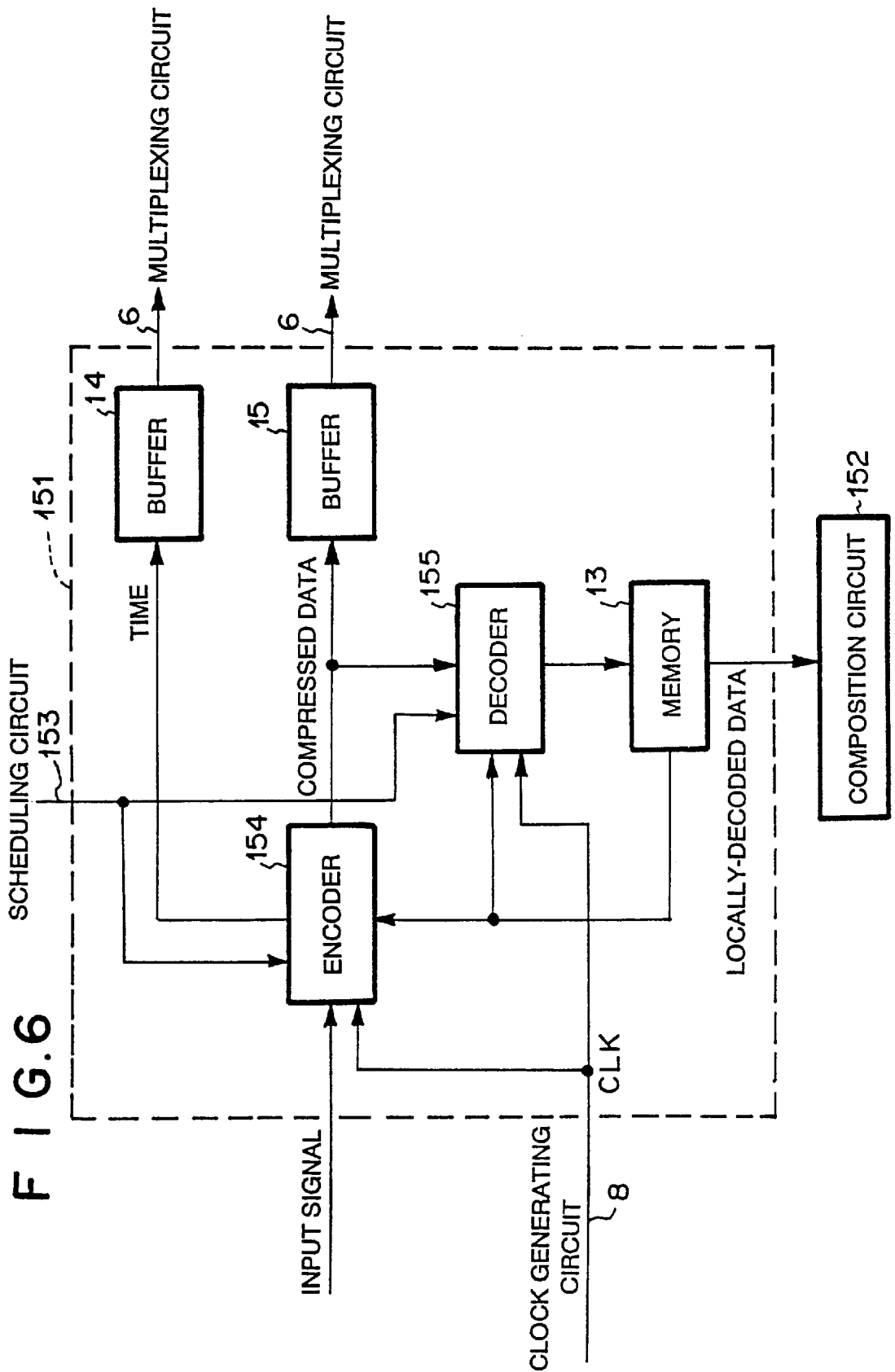
FIG. 6 is a block diagram showing the construction of a coding circuit of FIG. 5.

FIG. 6 shows the construction of the coding circuit 151, and the encoder 11 and the decoder 12 of FIG. 2 are replaced by an encoder 154 and a decoder 155, respectively. The coding operation of the encoder 154 and the decoding operation of the decoder 155 are together controlled on the basis of the input from the scheduling circuit 153.

Figure 7:
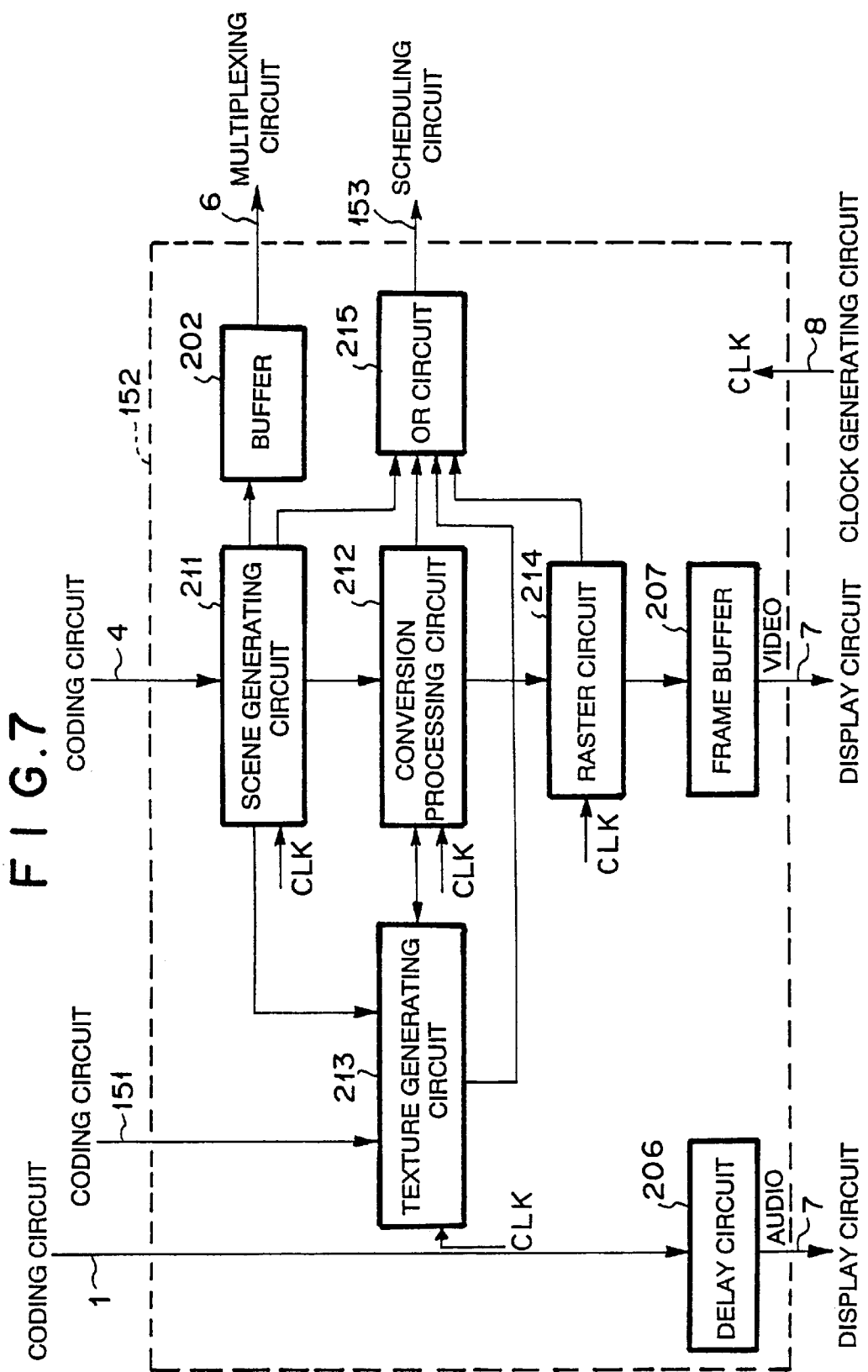
FIG. 7 is a first block diagram showing the construction of a composition circuit of FIG. 5.

FIG. 7 shows a first embodiment of the composition circuit 152 of FIG. 5, and it is designed in such a way that the scene generating circuit 201, the conversion processing circuit 203, the texture generating circuit 204 and the raster circuit 205 of FIG. 3 are replaced by a scene generating circuit 211, a conversion processing circuit 212, a texture generating circuit 213 and a raster circuit 214, and an OR circuit 215 is newly added. Each of the scene generating circuit 211, the conversion processing circuit 212, the texture generating circuit 213 and the raster circuit 214 has an output representing whether the processing thereof is terminated or not, in addition to the construction of each of the scene generating circuit 201, the conversion processing circuit 203, the texture generating circuit 204 and the raster circuit 205 of FIG. 3.

The OR circuit 215 receives the status inputs from the scene generating circuit 211, the conversion processing circuit 212, the texture generating circuit 213 and the raster circuit 214 to perform OR operation between the status inputs thus received, and outputs the OR-operation result. In this case, it is assumed that "1" is set under processing and "0" is set at the termination of the processing.

FIG. 46 shows a second embodiment of the composition circuit 152, and it is constructed so that the interface circuit 21 of FIG. 45 is replace by an interface circuit 156. In addition to the construction of the interface circuit 21, the interface circuit 156 has an output representing the composition status of the composition circuit 152 to the scheduling circuit 153.

Next, the operation of the second embodiment of the coding apparatus according to the present invention will be described with reference to FIGS. 5 to 7 and FIG. 46. The basic operation of the coding operation is the same as that of the circuit of FIG. 1. However, a signal representing the composition status is transmitted from the composition circuit 152 to the scheduling circuit 153. As the signal representing the composition status, "1" is output when any one or more of the scene generating circuit 211, the conversion processing circuit 212, the texture generating circuit 213 and the raster circuit 214 are under operation, and "0" is output when all of the circuits are at rest as shown in FIG. 7.

In the construction of FIG. 46, the CPU 22 transmits the same signal to the scheduling circuit 153 through the interface circuit 156. Upon receiving the signal, the scheduling circuit 153 outputs "1" when the input signal is "1", and outputs "0" when the input signal is "0". As shown in FIG. 6, the encoder 154/decoder 155 receives this signal, and the coding circuit 151 does not start the coding/decoding even at a predetermined timing when the input signal is "1" while the coding circuit 151 starts the coding/decoding when the input signal is "1".

In FIG. 28, the coding/decoding is illustrated as being sequentially carried out, and there occurs a problem in existence of decoding data when the input signal is set to "1" at the coding start time and to "0" at the decoding start time. However, this problem could be avoided by presetting the decoding operation so that the decoding operation is not carried out when the input signal is "1" at the coding start time.

Figure 36:
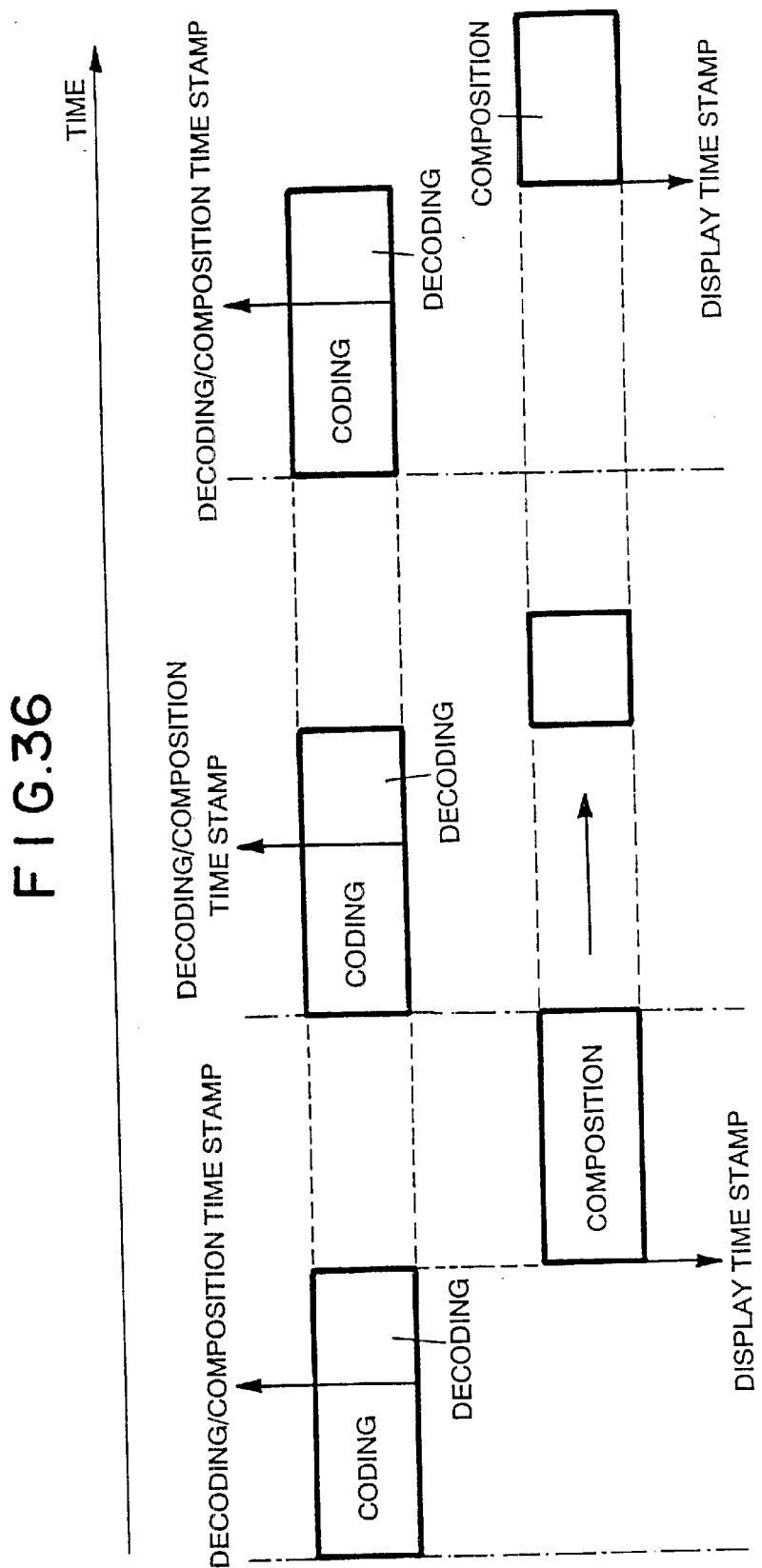
FIG. 36 is a time chart for coding, decoding and composition, which is solved by the coding apparatus of the third embodiment of the present invention.

The problem of the composition processing time shown in FIG. 29 can be also avoided by scheduling the coding operation, the decoding operation and the composition operation as shown in FIG. 36. In this case, when the composition has not been terminated until the coding start timing of the next frame which is set by the coding apparatus, the coding/decoding is not paused, but the composition is paused, and then the composition is resumed at the time when the coding/decoding is finished. When the composition concerned has not been terminated until the next coding start timing, the composition is paused again, and the composition processing is on standby until the coding/decoding is finished.

In the decoding apparatus, the decoding and the composition are carried out in response to the time stamp in the bit stream, and thus it is settled that in response to the decoding time stamp, the decoding is started while the composition is paused, and the composition is resumed at the time when the decoding is finished. Accordingly, the frame rate of the composite picture is temporarily reduced, however, the coding of the video signal based on a fixed frame rate is expected.

This is effective when only the compressed data of the video signal is afterwards reused for edition or the like.

Figure 37:
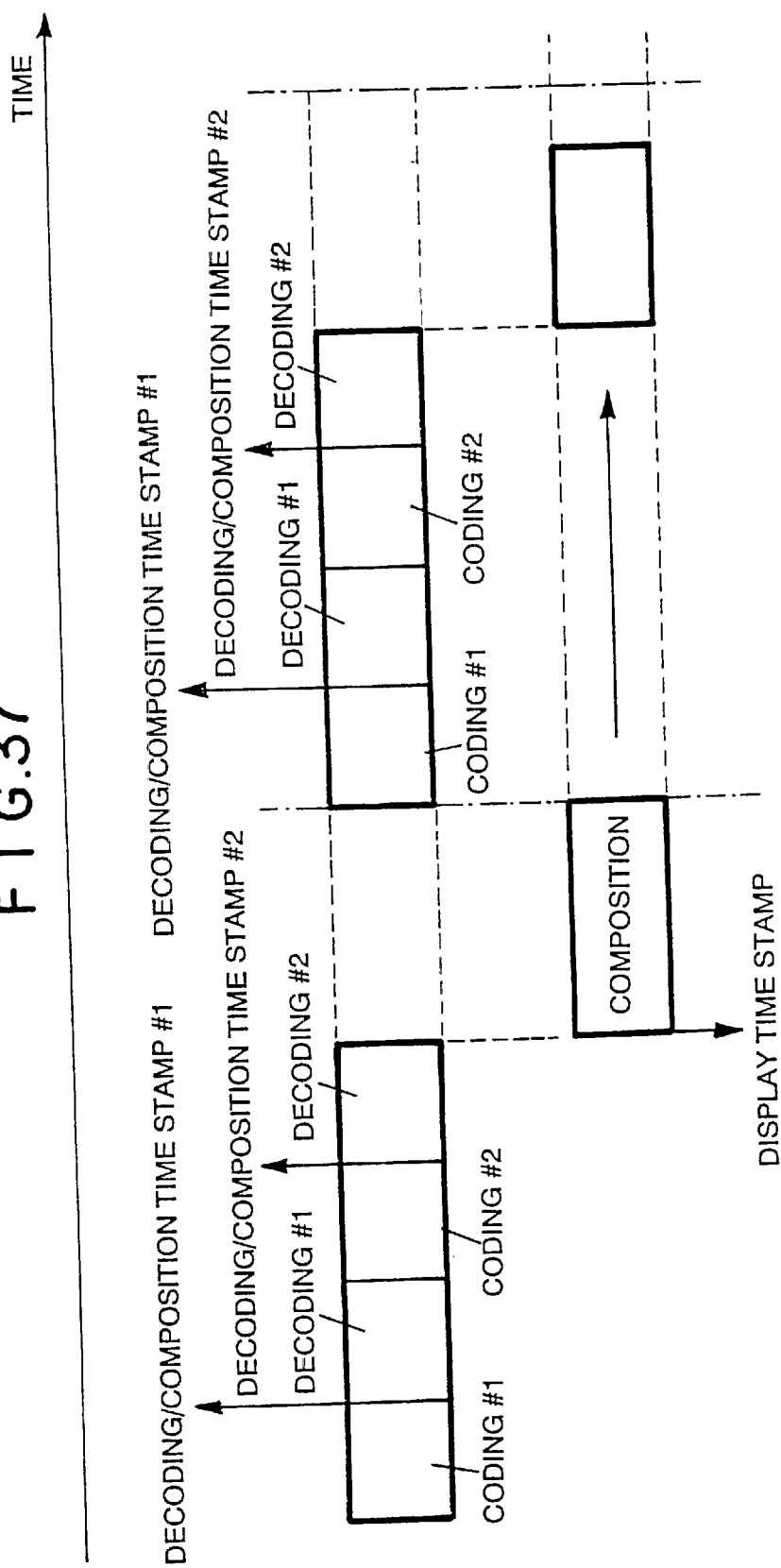
FIG. 37 is a time chart for coding, decoding and composition in the case of plural inputs, which is solved by the coding apparatus of the third embodiment of the present invention.

FIG. 37 is a diagram showing a countermeasure based on the scheduling of the coding, the decoding and the composition for plural input signals of FIGS. 32 and 34. Basically, the same countermeasure as shown in FIG. 36 is taken.

Figure 8:
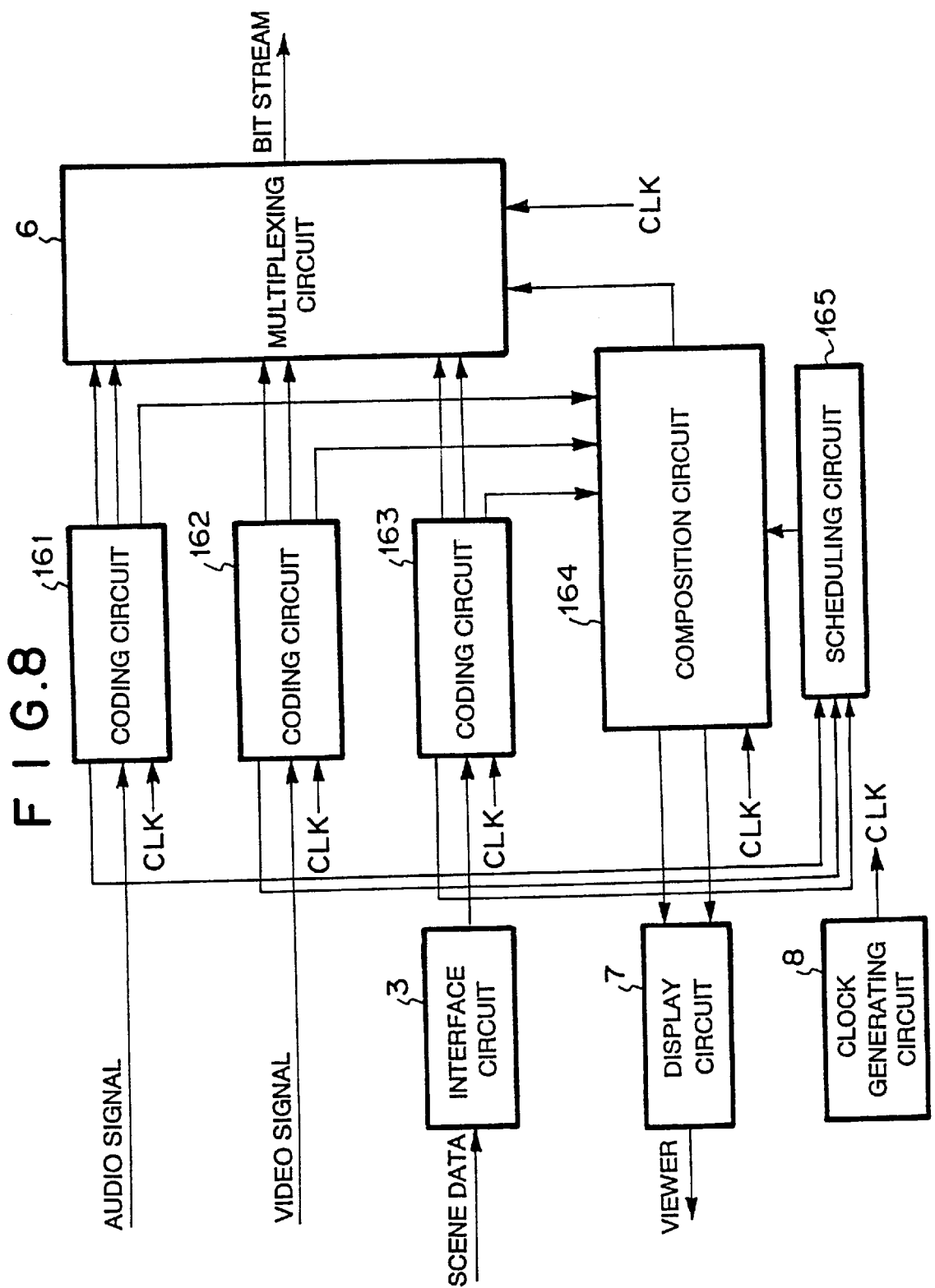
FIG. 8 is a block diagram showing a third embodiment of the coding apparatus according to the present invention.

FIG. 8 is a block diagram showing a third embodiment of the coding apparatus according to the present invention in which when the coding/decoding operation is enabled to continue by pausing the composition operation in the case where the continuity of the composition until the time of a next composite frame is requested.

In this embodiment, a scheduling circuit 165 is newly added to the coding apparatus of the first embodiment. An audio coding circuit 161, a video coding circuit 162 and a scene coding circuit 163 has the same construction as the audio coding circuit 1, the video coding circuit 2 and the scene coding circuit 4 of FIG. 1 respectively, and also each of the circuit is further designed to output to the scheduling circuit 165 a signal representing a coding status, that is, whether the coding is carried out or not.

In addition to the construction of the composition circuit 5 of FIG. 1, the composition circuit 164 is added with a control line extending from the scheduling circuit 165. The scheduling circuit 165 receives the status inputs from the coding circuit 161, the coding circuit 162 and the coding circuit 163 to control the operation of the composition circuit 164.

Figure 9:
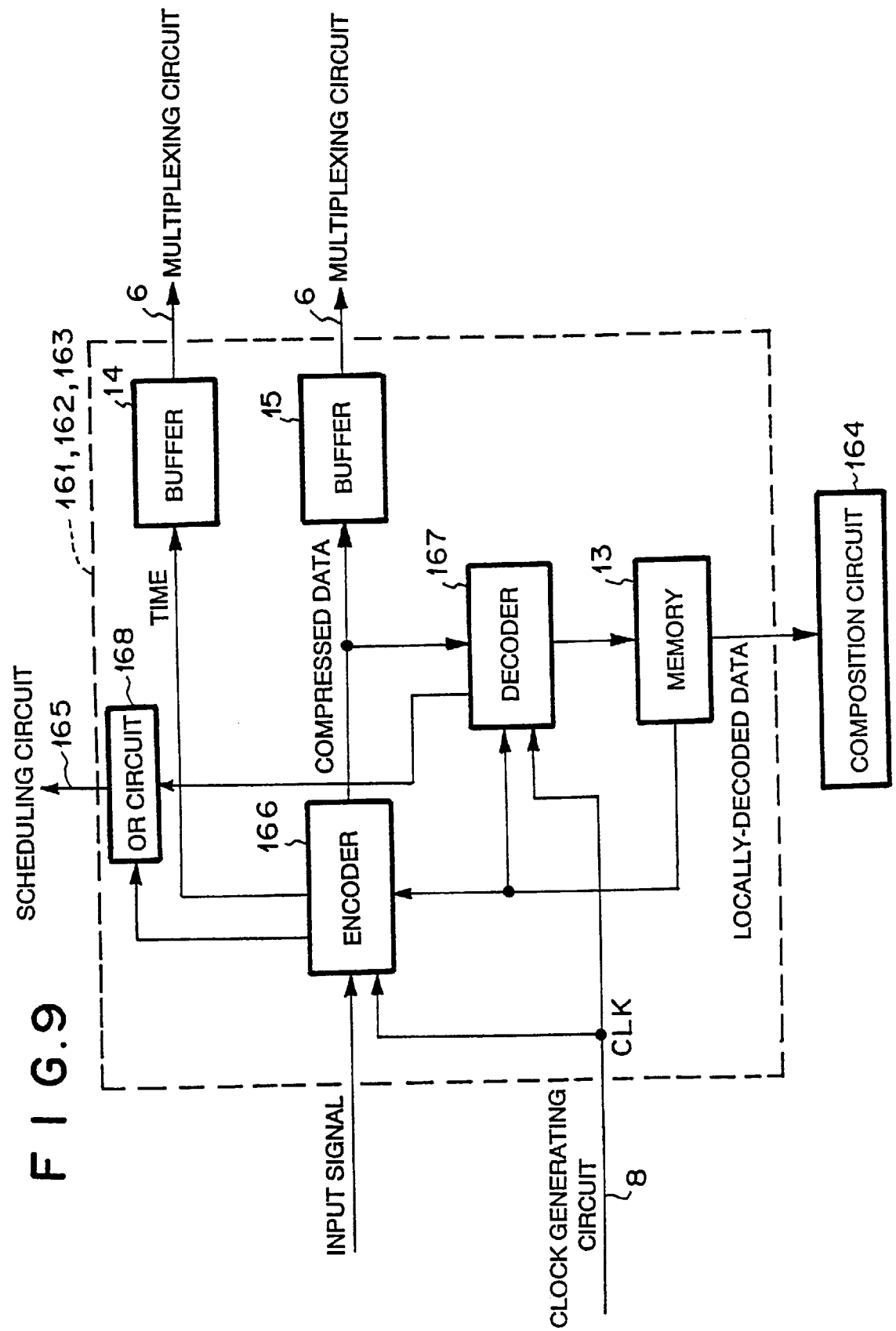
FIG. 9 is a block diagram showing the construction of a coding circuit of FIG. 8.

FIG. 9 shows the construction of the coding circuits 161, 162 and 163, and the encoder 11 and the decoder 12 of FIG. 2 are replaced by encoder 166 and decoder 167. Further, OR circuit 168 is newly provided. In addition to the construction of the encoder 11, the decoder 12, each of the encoder 166 and the decoder 167 is further designed so as to output to the OR circuit 168 a signal representing whether the processing thereof is finished or not. The OR circuit 168 receives the status inputs from the encoder 166 and the decoder 167, and outputs the OR output to the scheduling circuit 165. In this case, it is assumed that "1" is set under processing, and "0" is set at the time when the processing is finished.

Figure 10:
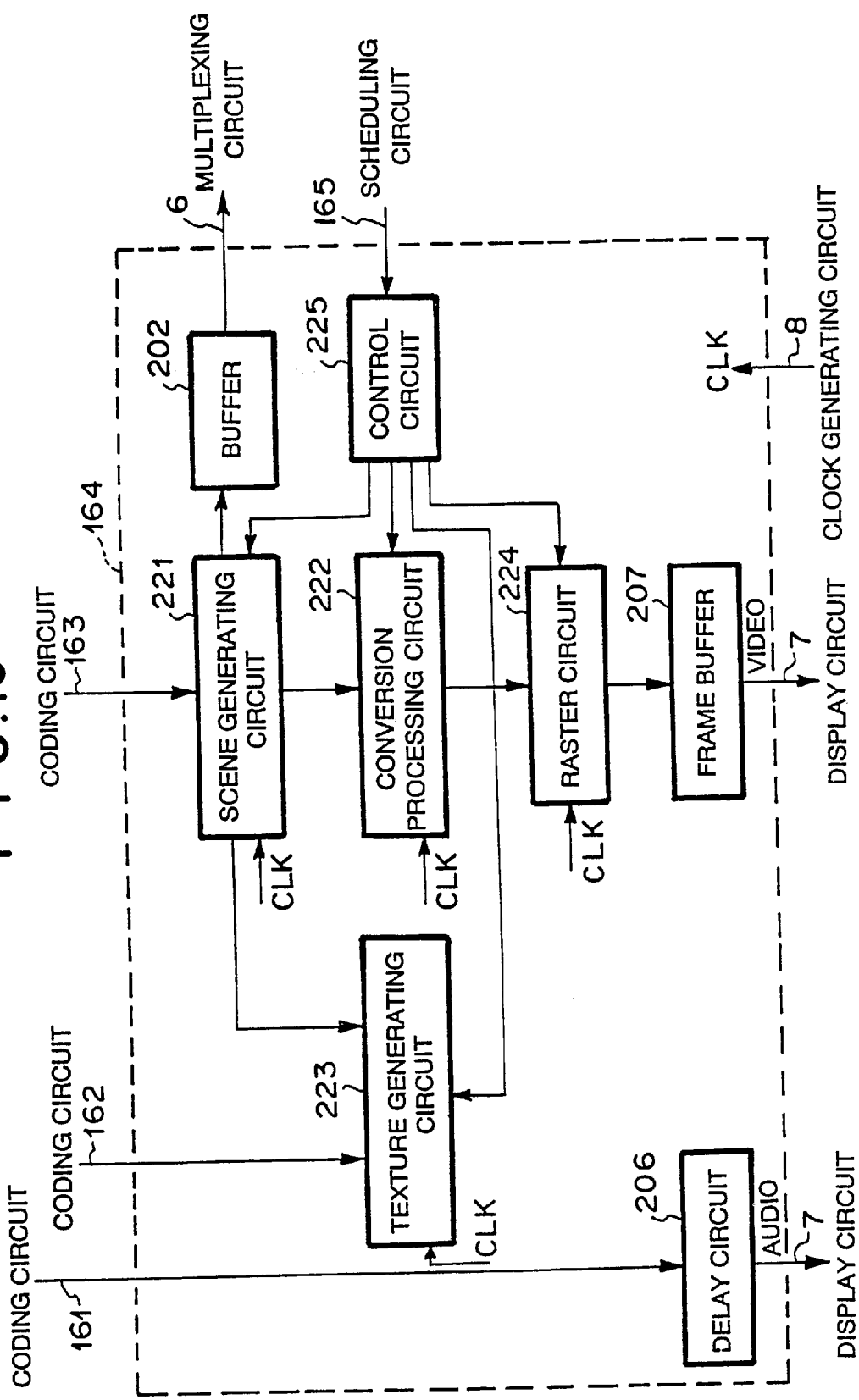
FIG. 10 is a first block diagram showing the construction of a composition circuit of FIG. 8.

FIG. 10 shows a first embodiment of the composition circuit 164 of FIG. 8. The scene generating circuit 201, the conversion processing circuit 203, the texture generating circuit 204 and the raster circuit 205 of FIG. 3 are replaced by scene generating circuit 221, conversion processing circuit 222, texture generating circuit 223 and raster circuit 224, and further control circuit 225 is newly added. In addition to the construction of each of the scene generating circuit 201, the conversion processing circuit 203, the texture generating circuit 204 and the raster circuit 205 of FIG. 3, each of the scene generating circuit 221, the conversion processing circuit 222, the texture generating circuit 223 and the raster circuit 224 is further provided with an input line from the control circuit 225. The control circuit 225 receives an input from the scheduling circuit 165 and outputs it to each of the scene generating circuit 221, the conversion processing circuit 222, the texture generating circuit 223 and the raster circuit 224 to control the operation of each circuit.

Figure 47:
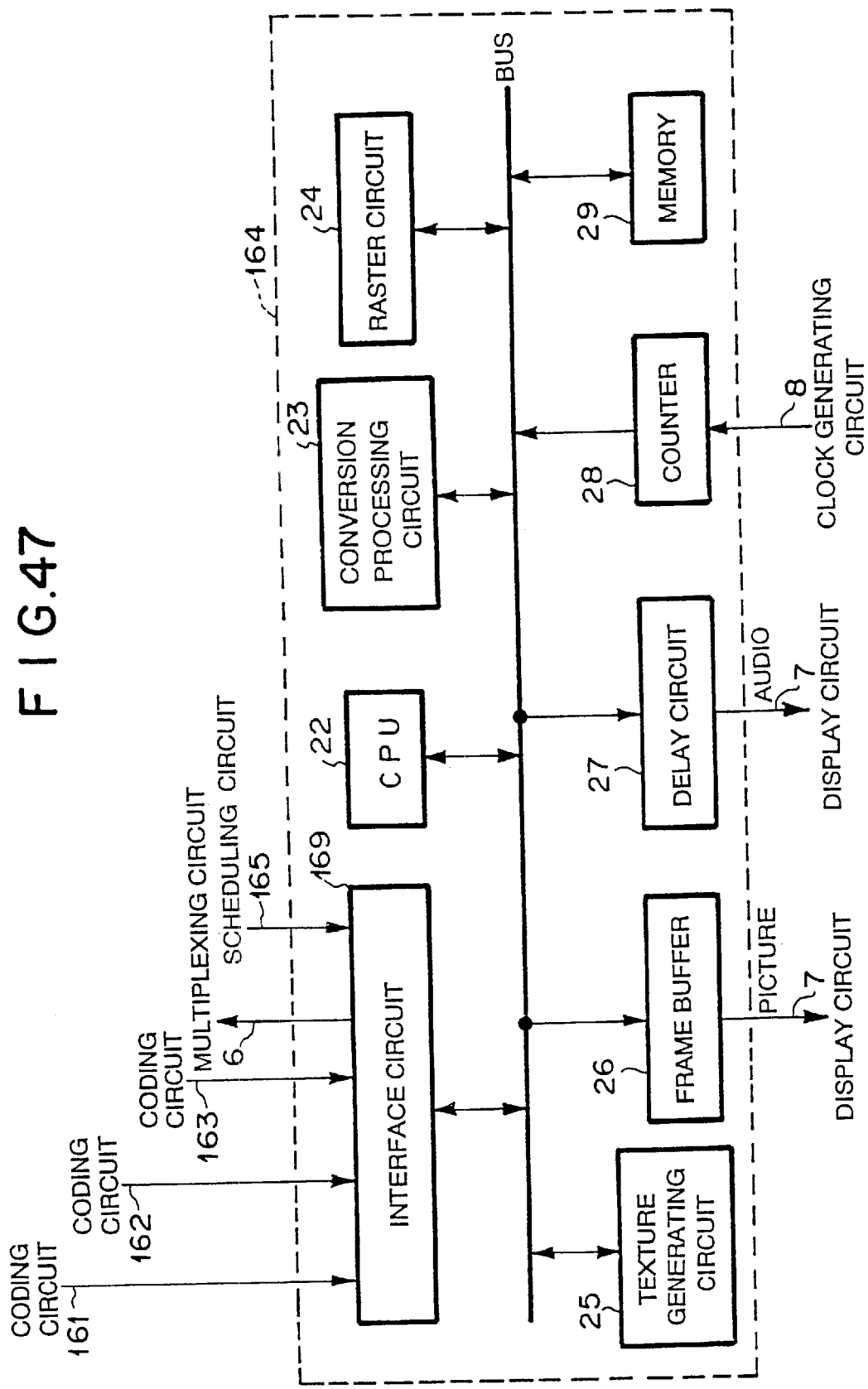
FIG. 47 is a second block diagram showing the construction of the composition circuit of FIG. 8.

FIG. 47 shows a second embodiment of the composition circuit 164, and in this embodiment the interface circuit 21 of FIG. 45 is replaced by an interface circuit 169. In addition to the construction of the interface circuit 21, the interface circuit 169 is designed so as to receive an input from the scheduling circuit 165.

The operation of the third embodiment of the coding apparatus of the present invention will be described with reference to FIGS. 8 to 10 and FIG. 47. The basic operation of the coding operation is the same as the circuit of FIG. 1. However, each of the audio coding circuit 161, the video coding circuit 162 and the scene coding circuit 163 transmits the coding status to the scheduling circuit 165. In the coding circuit 161, the coding circuit 162 and the coding circuit 163, an encoder 166 and a decoder 167 output a coding state and a decoding state to the OR circuit 168 respectively as shown in FIG. 9. The output signal is set to "1" when the encoder (decoder) is under operation, and "0" when it is at a rest. Therefore, the output of the OR circuit 168 is set to n 1n when either of the encoder and the decoder is under operation, and "0" when both the encoder and the decoder are at a rest.

The scheduling circuit 165 receives inputs from the coding circuits 161 to 163 to perform OR operation therebetween, and outputs the OR result. In the composition circuit 164, the control circuit 225 receives an input from the scheduling circuit 165 and outputs it to the scene generating circuit 221, the conversion processing circuit 222, the texture generating circuit 223 and the raster circuit 224 as shown in FIG. 10. At the time when the input value from the control circuit 225 varies from "0" to "1", each of the scene generating circuit 221, the conversion processing circuit 222, the texture generating circuit 223 and the raster circuit 224 stores intermediate data and pauses the processing thereof. At the time when the input value varies from "1" to "0", each circuit recovers the intermediate data and resumes the processing. When the input value is equal to "1" at all times, each circuit is at a rest. When the input value is equal to "0" at all times, the processing is started in synchronism with the composition timing.

In the first to third embodiments of the coding apparatus according to the present invention, the same clocks are supplied from the same clock generating circuit for the audio signal, the video signal and the scene data. However, according to the system shown in ISO/IEC JTC1/SC29/WG11 N1825 described in the conventional technique, it is allowed that different clocks may be provided for each of the audio signal, the video signal and the scene data. Accordingly, in the coding apparatus of the present invention, there may be provided different clocks between the audio signal, the video signal and the scene data.

Figure 11:
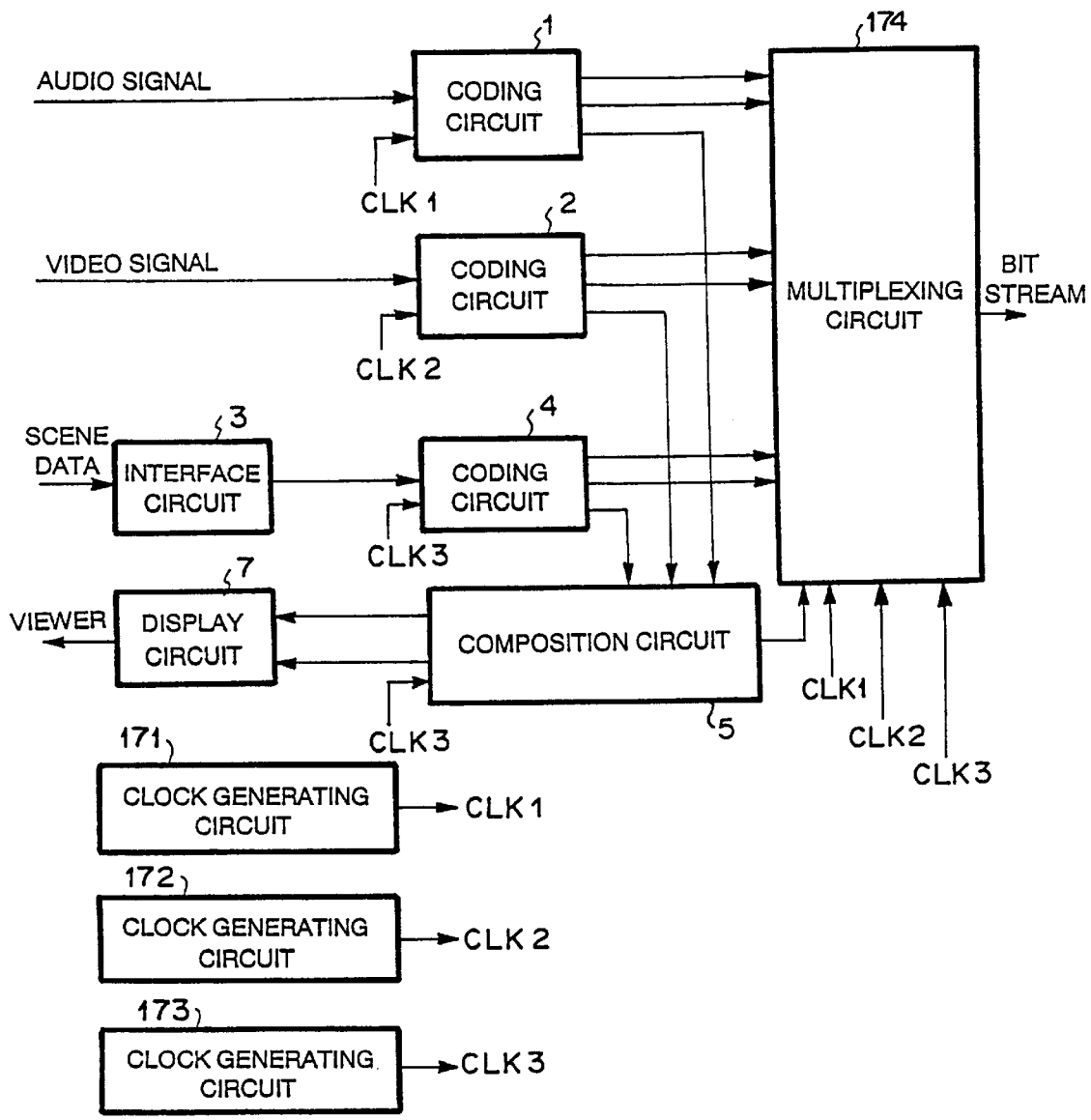
FIG. 11 is a block diagram showing a fourth embodiment of the coding apparatus according to the present invention.

FIG. 11 shows a fourth embodiment of the coding apparatus according to the present invention. In the fourth embodiment, a clock generating circuit is individually provided to each of the audio coding circuit 1, the video coding circuit 2, the scene coding circuit 4 and the composition circuit 5 in the first embodiment. That is, in place of the clock generating circuit 8 of FIG. 1, three clock generating circuits 171, 172 and 173 are provided. The audio coding circuit 1 is supplied with clocks (CLK1) from the clock generating circuit 171, the video coding circuit 2 is supplied with clocks (CLK2) from the clock generating circuit 172 and the scene coding circuit 4 and the composition circuit 5 are supplied with clocks (CLK3) from the clock generating circuit 173.

In addition to the construction of the multiplexing circuit 6 of FIG. 1, the multiplexing circuit 174 is designed to receive clock inputs from three clock generating circuits 171, 172, 173.

Figure 12:
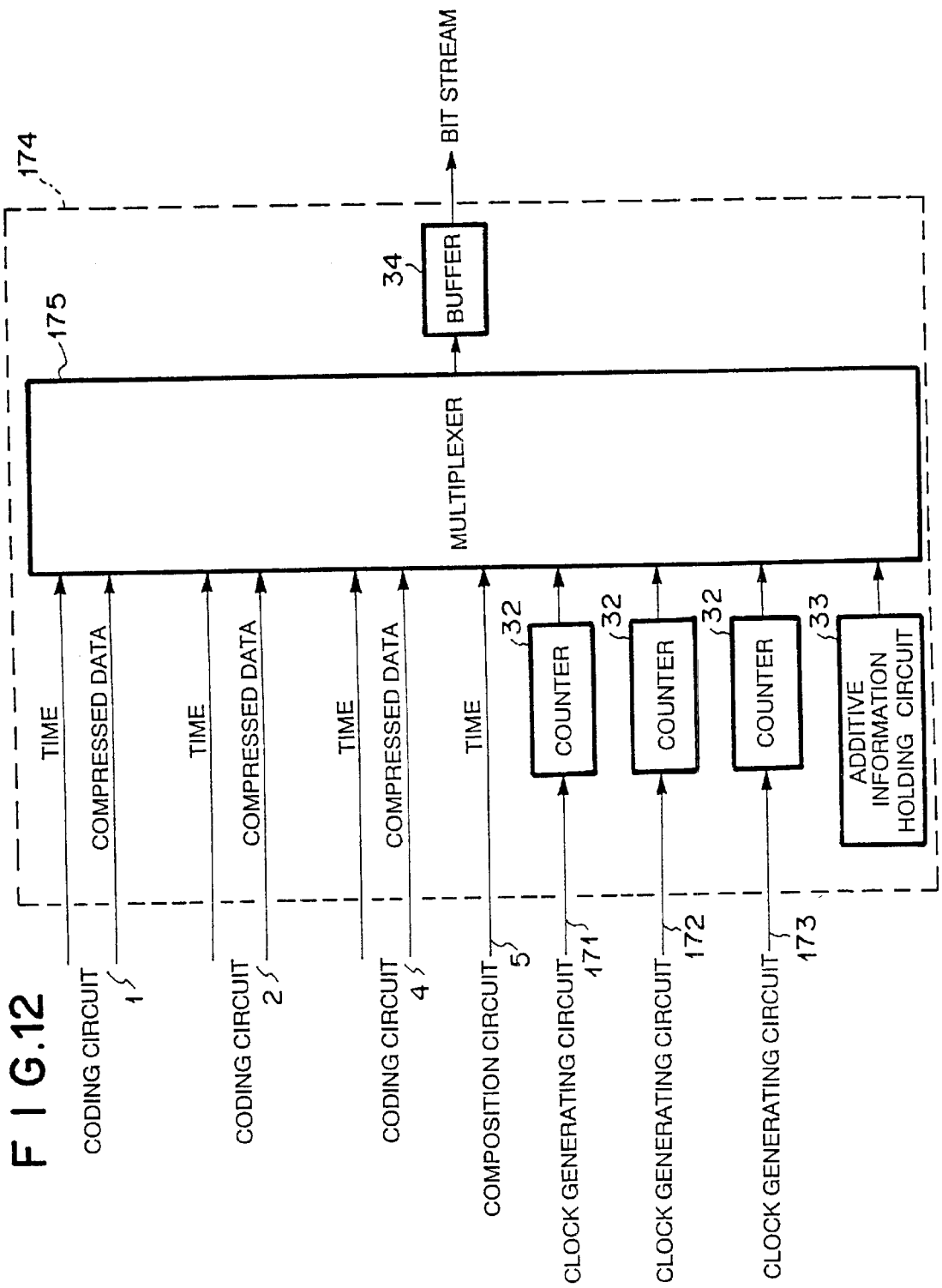
FIG. 12 is a block diagram showing the construction of a multiplexed circuit of FIG. 11.

FIG. 12 shows the construction of the multiplexing circuit 174 of FIG. 11. The multiplexing circuit 174 has three counters 32 in association with the three clock generating circuits 171, 172 and 173 in addition to the construction of the multiplexing circuit 6 of FIG. 4. A multiplexer 175 is designed so as to receive and multiplex inputs from the three counters 32 in addition to the construction of the multiplexer 31 of FIG. 4.

Next, the operation of the fourth embodiment of the coding apparatus according to the present invention will be described with reference to FIGS. 11 to 13. The basic operation of the coding is the same as the circuit of FIG. 1. The difference from the circuit of FIG. 1 resides in that the audio coding circuit 1, the video coding circuit 2 and both the scene coding circuit 4 and the composition circuit 5 are respectively operated with the respective clocks supplied from the three different clock generating circuits 171, 172 and 173, and that the multiplexing circuit 174 multiplexes the clocks supplied from the three different clock generating circuits 171, 172 and 173.

The final bit stream is shown in (1) of FIG. 27. That is, the bit stream comprises a reference clock value, a time stamp and compressed data for each of audio, video and scene data. Each time stamp representing the decoding timing is appended to the corresponding compressed data, and the time stamp representing the composition timing is appended to the compressed scene data which is an output of the scene coding circuit 4 operating with the same clock as the composition circuit 5.

Figure 13:
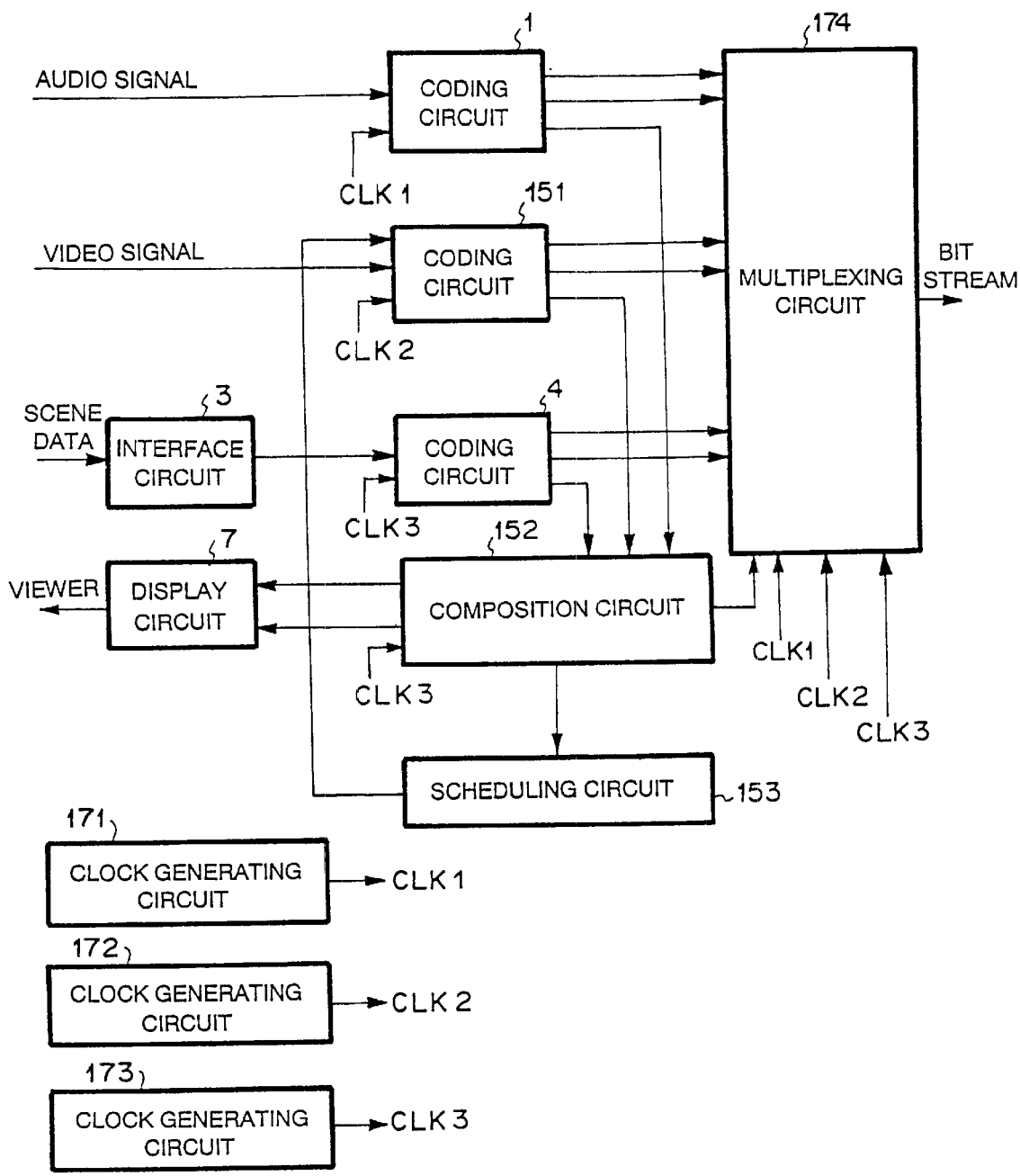
FIG. 13 is a block diagram showing a fifth embodiment of the coding apparatus according to the present invention.

FIG. 13 shows a fifth embodiment of the coding apparatus of the present invention. According to the coding apparatus of this embodiment, three different clock generating circuits 171, 172 and 173 are respectively allocated to the audio coding circuit 1, the video coding circuit 151, and both the scene coding circuit 4 and the composition circuit 152 in the coding apparatus of the second embodiment. The multiplexing circuit 174 has the same construction as the fourth embodiment.

Figure 14:
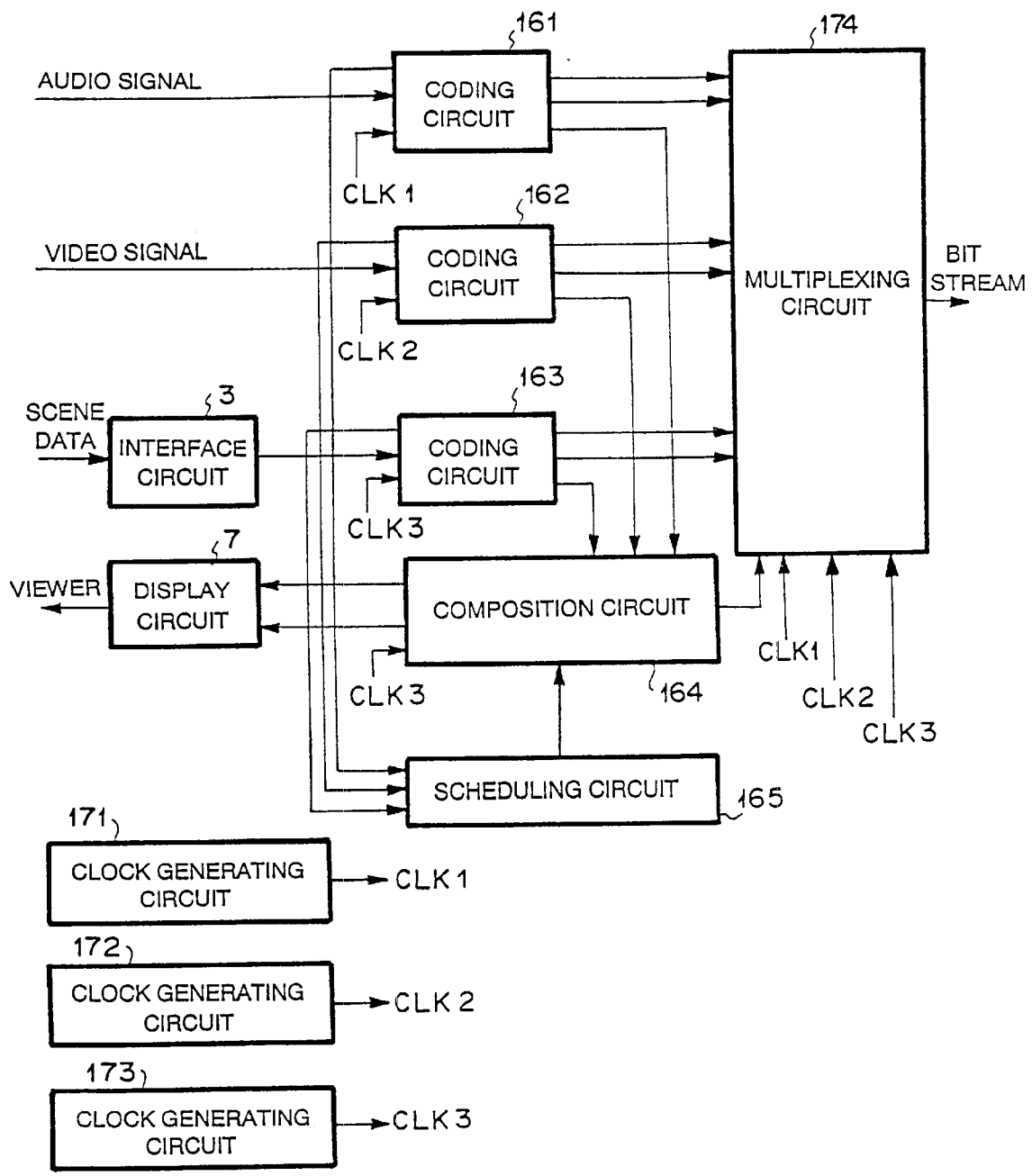
FIG. 14 is a block diagram showing a sixth embodiment of the coding apparatus according to the present invention.

FIG. 14 shows a sixth embodiment of the coding apparatus according to the present invention. According to the coding apparatus of this embodiment, three different clock generating circuits 171, 172 and 173 are respectively allocated to the audio coding circuit 161, the video coding circuit 162, and both the scene coding circuit 163 and the composition circuit 164 in the coding apparatus of the third embodiment. The multiplexing circuit 174 has the same construction as the fourth embodiment.

Figure 15:
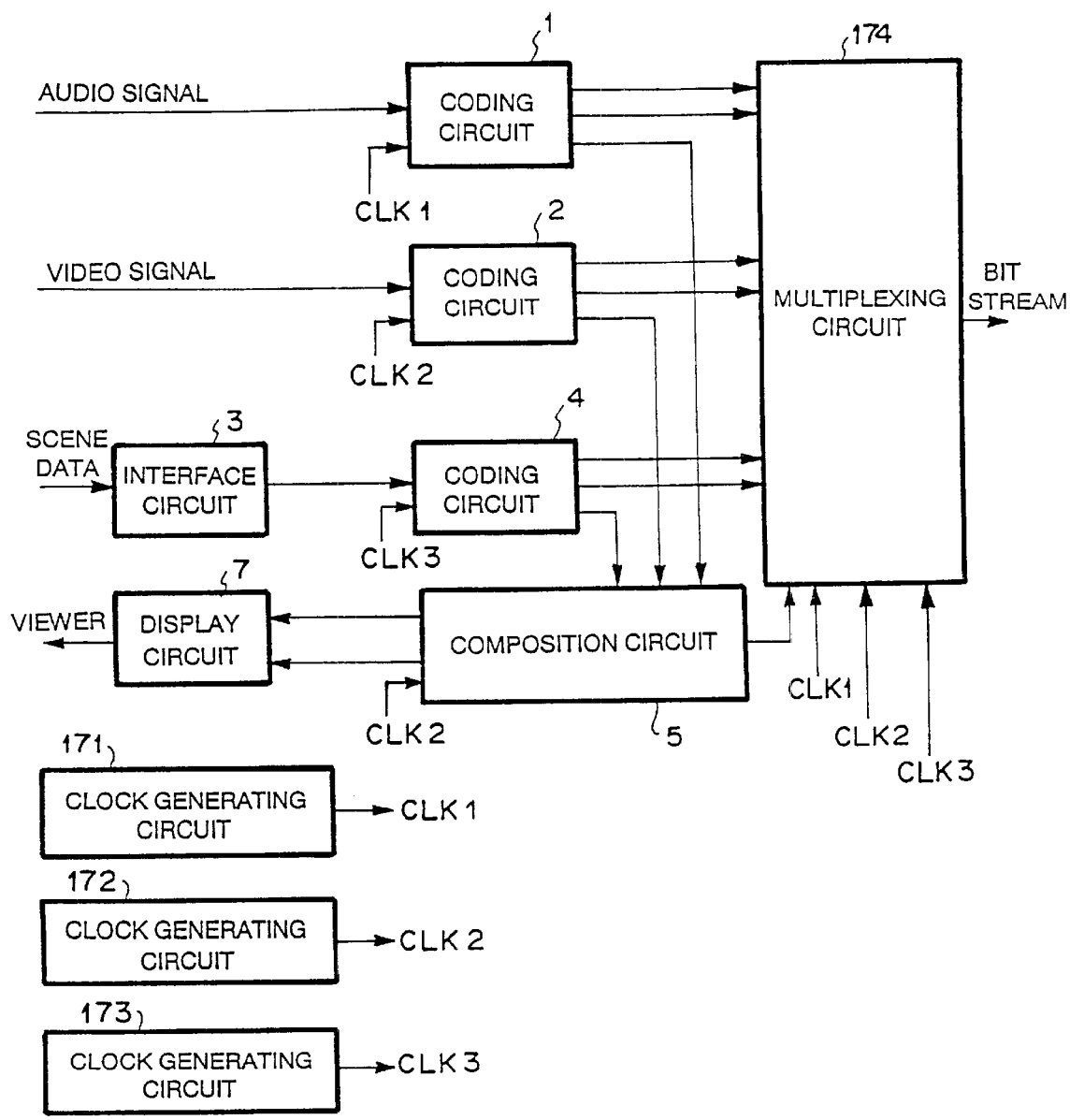
FIG. 15 is a block diagram showing a seventh embodiment of the coding apparatus according to the present invention.

FIG. 15 shows a seventh embodiment of the coding apparatus of the present invention. According to the seventh embodiment, three different clock generating circuits 171, 172 and 173 are respectively allocated to the audio coding circuit 1, both the video coding circuit 2 and the composition circuit 5, and the scene coding circuit 4 in the coding apparatus of the first embodiment. The multiplexing circuit 174 has the same construction as the fourth embodiment. The basic operation of the coding is as the same as the circuit of FIG. 1. The difference from the circuit of FIG. 1 resides in that the audio coding circuit, both the video coding circuit 2 and the composition circuit 5, and the scene coding circuit 4 are operated with the respective clocks supplied from the different three clock generating circuits 171, 172 and 173, and that the multiplexing circuit multiplexes the clocks supplied from the three different clock generating circuits 171, 172 and 173.

The final bit stream is shown in (2) of FIG. 27. That is, the bit stream comprises a reference clock value, a time stamp and compressed data for each of audio, video and scene data. Each time stamp representing the decoding timing is appended to the corresponding compressed data, and the time stamp representing the composition timing is appended to the compressed video data which is an output of the video coding circuit 2 operating with the same clocks as the composition circuit 5.

Figure 16:
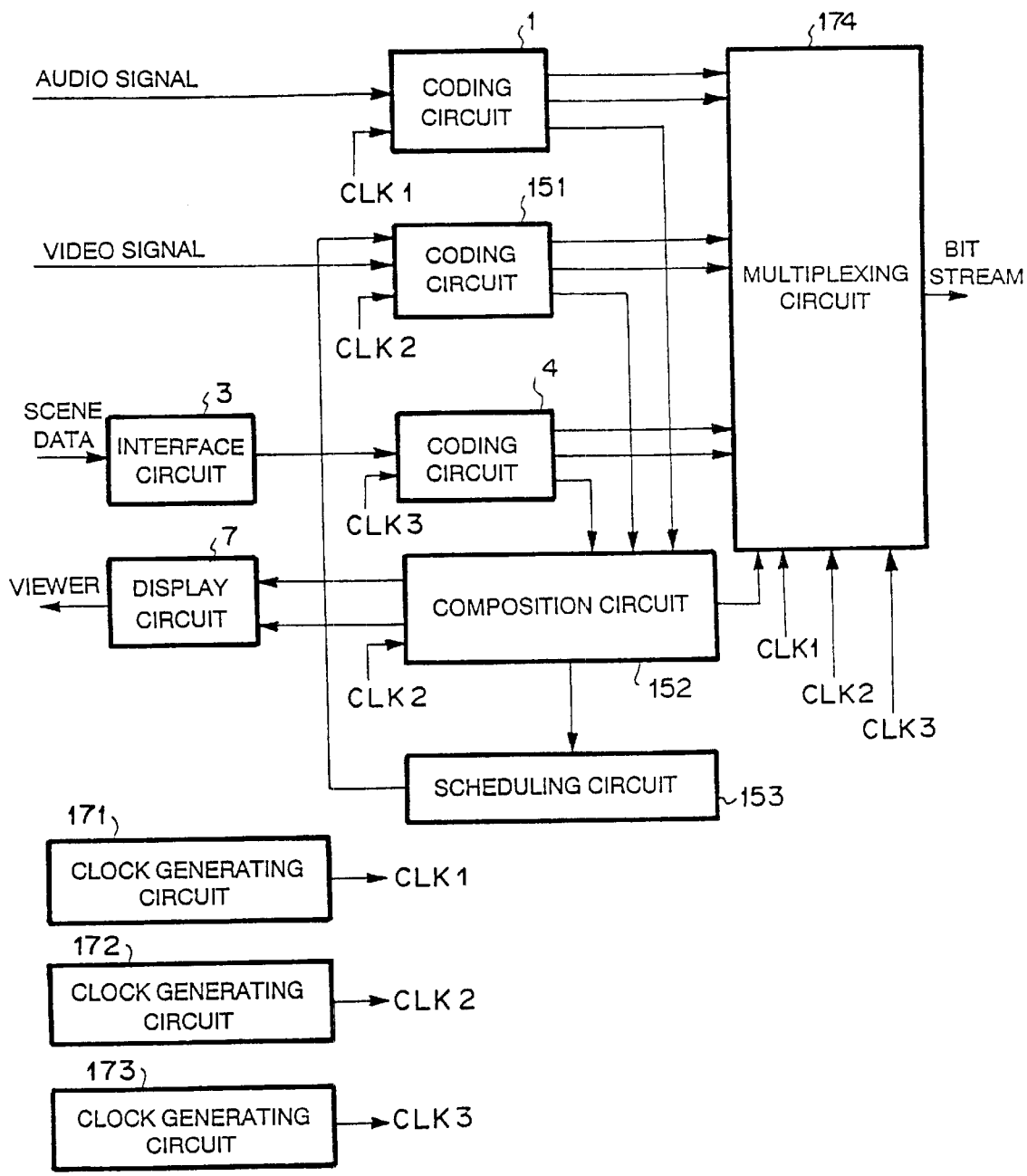
FIG. 16 is a block diagram showing an eighth embodiment of the coding apparatus according to the present invention.

FIG. 16 shows an eighth embodiment of the coding apparatus according to the present invention. According to the eight embodiment, three different clock generating circuits 171, 172, and 173 are respectively allocated to the audio signal circuit 1, both the video signal circuit 15 and the composition circuit 5, and the scene coding circuit 4 in the coding apparatus of the second embodiment. The multiplexing circuit 174 has the same construction as the fourth embodiment.

Figure 17:
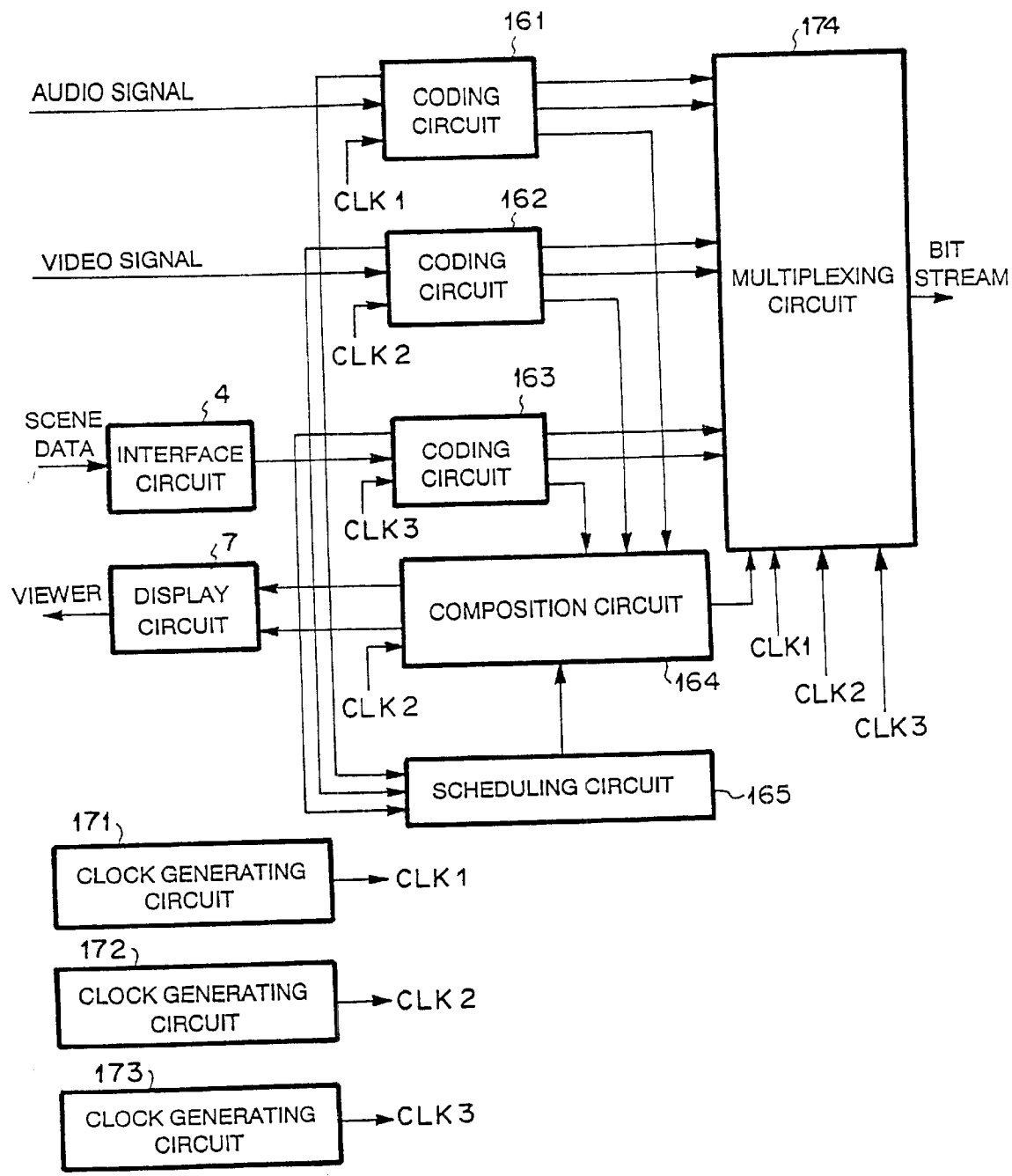
FIG. 17 is a block diagram showing a ninth embodiment of the coding apparatus according to the present invention.

FIG. 17 shows a ninth embodiment of the coding apparatus according to the present invention. According to the ninth embodiment, three different clock generating circuits 171, 172 and 173 are respectively allocated to the audio coding circuit 161, and both the video coding circuit 162 and the composition circuit 164, and the scene coding circuit 163 in the coding apparatus of the third embodiment of the present invention. The multiplexing circuit 174 has the same construction as the fourth embodiment.

Figure 18:
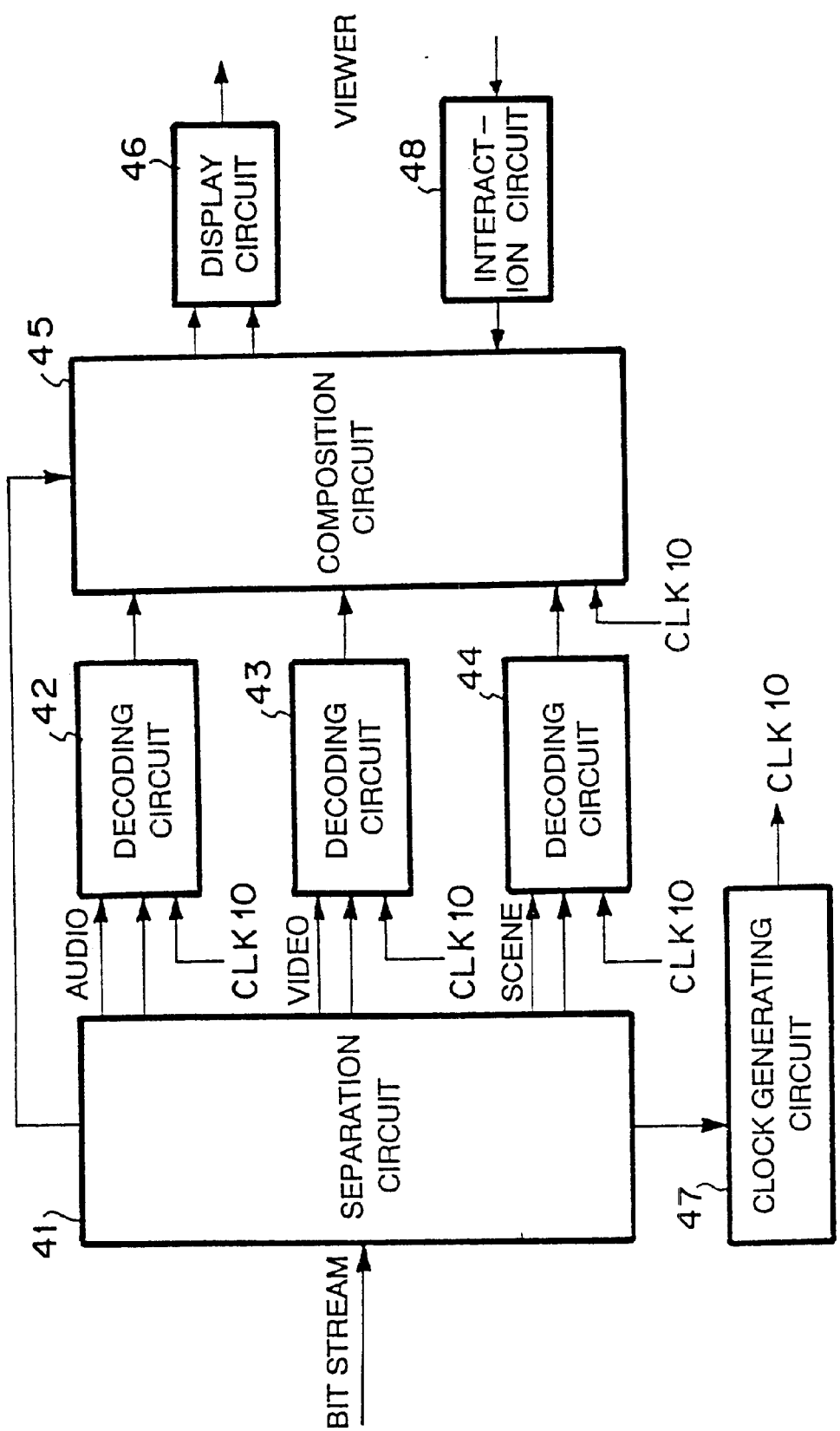
FIG. 18 is a block diagram showing a first embodiment of a decoding apparatus according to the present invention.

FIG. 18 is a block diagram showing a first embodiment to the decoding apparatus of the present invention. The decoding apparatus of the present invention comprises a separation circuit (demultiplexing circuit) 41, a decoding circuit 42 for audio signals (hereinafter referred to as "audio decoding circuit"), a decoding circuit 43 for video signals (hereinafter referred to as "video decoding circuit"), a decoding circuit 44 for scene data (hereinafter referred to as "scene decoding circuit"), a composition circuit 45, a display circuit 46, a clock generating circuit 47 and an interaction circuit 48.

The separation circuit 41 outputs from an input bit stream the compressed data and the time stamp representing the decoding timing for the audio signal, the compressed data and the time stamp representing the decoding timing for the video signal, the compressed data and the time stamp for the scene data, the time stamp representing the composition timing and a reference clock value supplied to the clock generating circuit 47 (described later).

The audio decoding circuit 42 decodes the compressed data input from the separation circuit 41 at the time represented by the time stamp representing the decoding timing which is input from the separation circuit 41. The video decoding circuit 43 decodes the compressed data input from the separation circuit 41 at the time represented by the time stamp representing the decoding timing which is input from the separation circuit 41. The scene decoding circuit 44 decodes the compressed data input from the separation circuit 41 at the time represented by the time stamp representing the decoding timing which is input from the separation circuit 41.

The composition circuit 45 performs the composition processing on the audio signal from the audio decoding circuit 42, the video signal from the video decoding circuit 43 and the scene data from the scene decoding circuit 44 input thereto in accordance with a scene description described in the scene data at the time represented by the time stamp representing the composition timing input from the separation circuit 41, and outputs a composite picture and the audio signal. Further, it accepts input data from the interaction circuit 48 described later to implement user interaction such as movement of a viewing point.

The display circuit 46 receives the composite picture signal and the audio signal from the composition circuit 45, and displays/reproduces these signals through a display or the like for pictures and through a speaker or the like for sounds. The clock generating circuit 47 generates clocks (CLK10) in accordance with the reference clock value supplied from the separation circuit 41, and supplies the clocks to the audio decoding circuit 42, the video decoding circuit 43, the scene decoding circuit 44 and the composition circuit 45. The clock generating circuit 47 is generally constructed as PLL (Phased Locked Loop), and the reference clock value is used to control the oscillation frequency of the clocks.

The interaction circuit 48 accepts an interaction such as a keyboard input, a mouse input or the like from a viewer to convert it to data representing movement of a viewing point or the like, and outputs the conversion result to the composition circuit 45.

Figure 19:
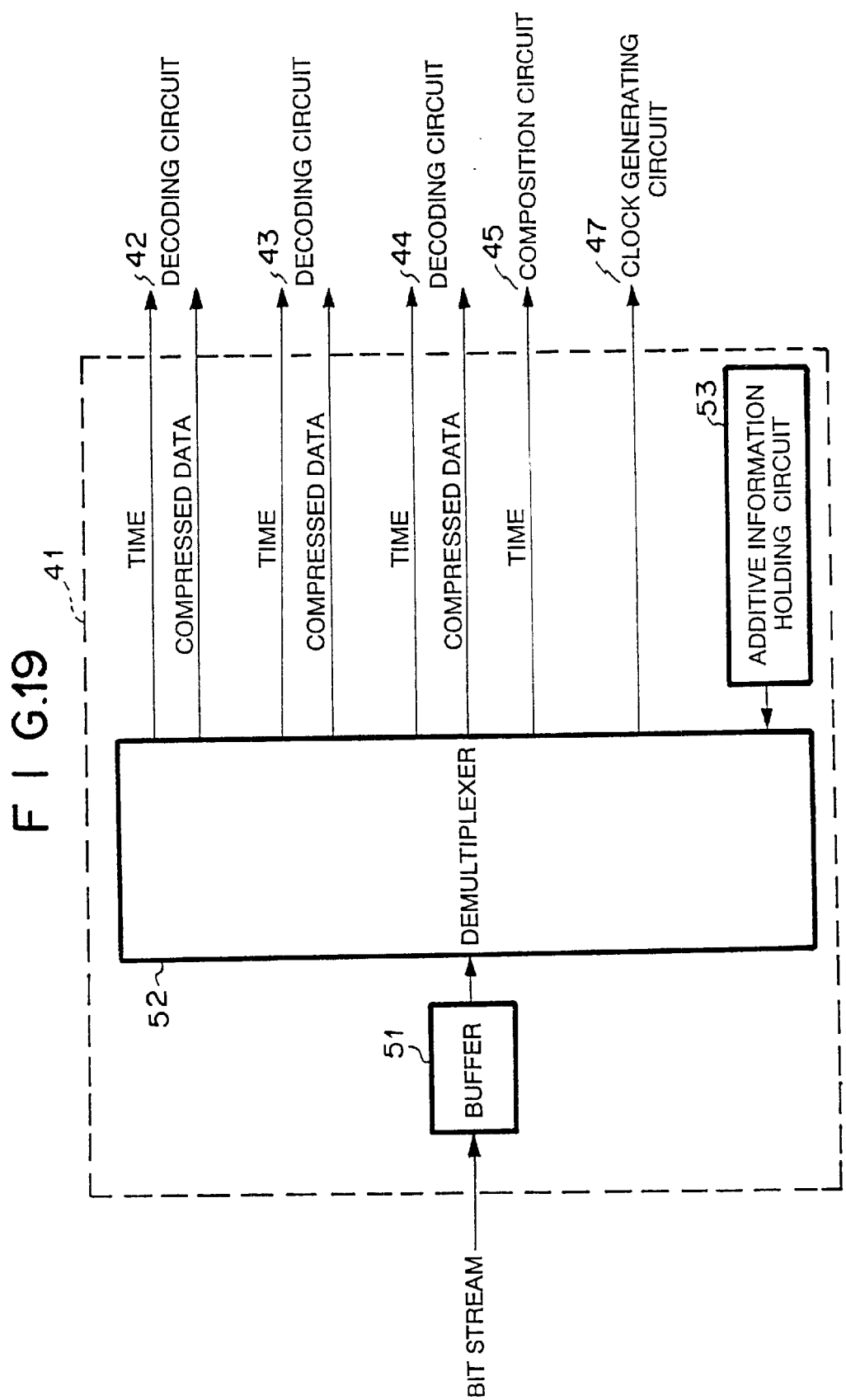
FIG. 19 is a block diagram showing the construction of a separation circuit of FIG. 18.

FIG. 19 shows the construction of the separation circuit 41 of FIG. 18, and it comprises buffer 51, demultiplexer 52 and additive information holding circuit 53. The buffer 51 buffers a bit stream which is transmitted through a network or read out from a storage medium such as a disk or the like. The demultiplexer 52 separates the bit stream input from the buffer 51 into the compressed data and the time stamp representing the decoding timing for the audio information, the compressed data and the time stamp representing the decoding timing for the video information, the compressed data and the time stamp representing the decoding timing for the scene data, the time stamp representing the composition timing, the reference clock value and overhead serving as system information on the basis of the management information such as bit length which are hold in the additive information holding circuit 53.

The additive information holding circuit 53 holds not only the overhead representing the system information, but also the multiplexing management information such as the bit length of each data to be multiplexed, the time stamps and supplies these data as control information to the demultiplexer 52. As specific modes of the additive information holding circuit 53 may be considered a ROM containing predetermined fixed data, a ROM card, a RAM into which data are loaded through a keyboard or the like at an initialization time, a RAM for storing bit stream information contained in the overhead serving as the system information in the bit stream or the like.

Figure 20:
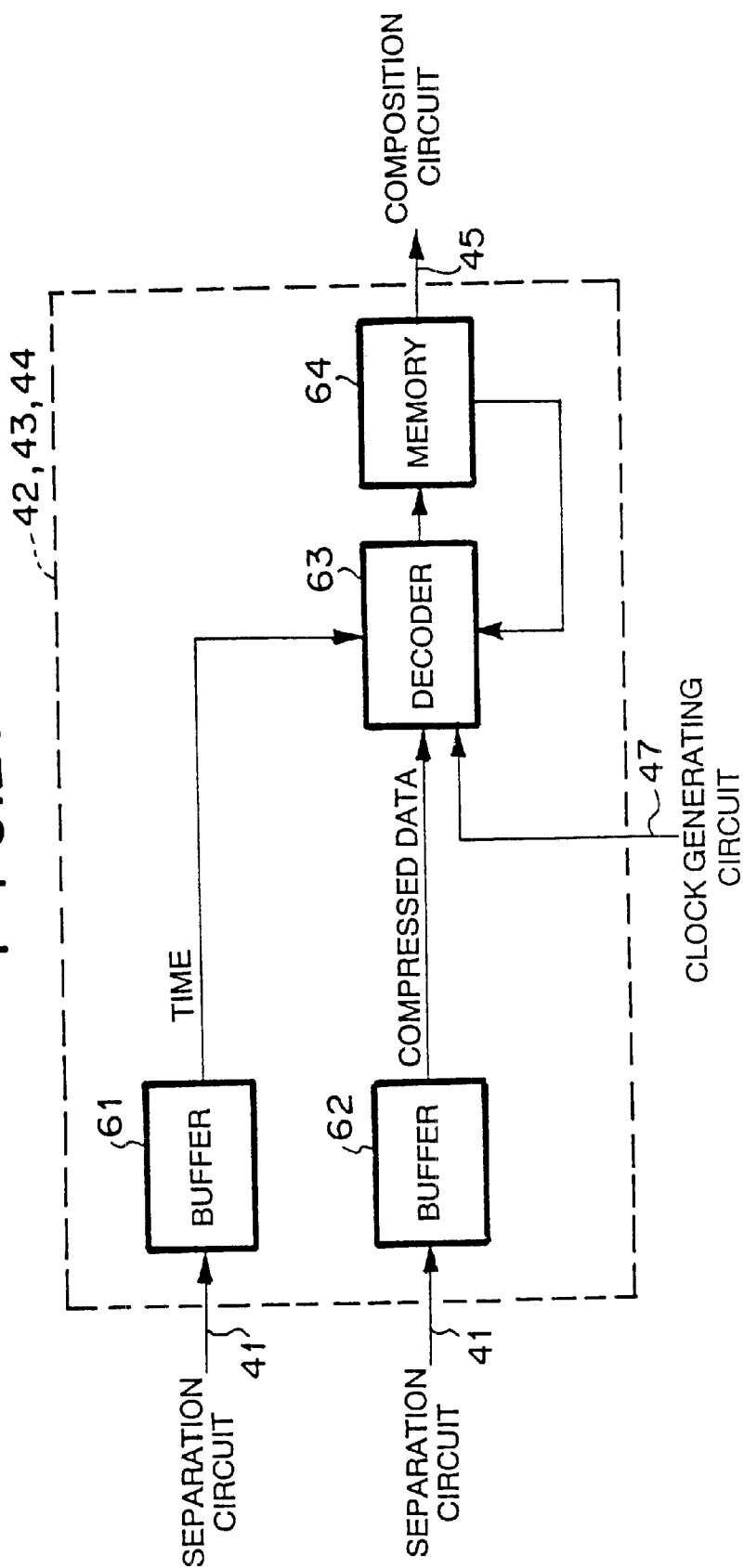
FIG. 20 is a block diagram showing the construction of a decoding circuit of FIG. 18.

FIG. 20 shows the construction of the decoding circuits 42, 43 and 44 of FIG. 18, and it comprises a buffer 61, a buffer 62, a decoder 63 and a memory 64. The buffer 61 buffers a time stamp representing a decoding timing which is supplied from the separation circuit 41. The buffer 62 buffers a compressed data which is supplied from the separation circuit 41. The decoder 63 receives the compressed data supplied from the buffer 62 and the decoding data supplied from a memory 64 described later at the time of the time stamp representing the decoding timing supplied from the buffer 61 to perform the decoding operation. The decoder 63 is supplied with clocks from the clock generating circuit 47.

The memory 64 stores the decoding data supplied from the decoder 63. In this construction, the decoding operation of the decoder 63 is carried out on the assumption that the decoding data stored in the memory 64 are used. However, there is a case where the decoding data are not used as in the case of an intra-frame coding of video. In the case of scene data, text data that are not compressed may be considered. In this case, the data are merely written into the memory modification.

Figure 21:
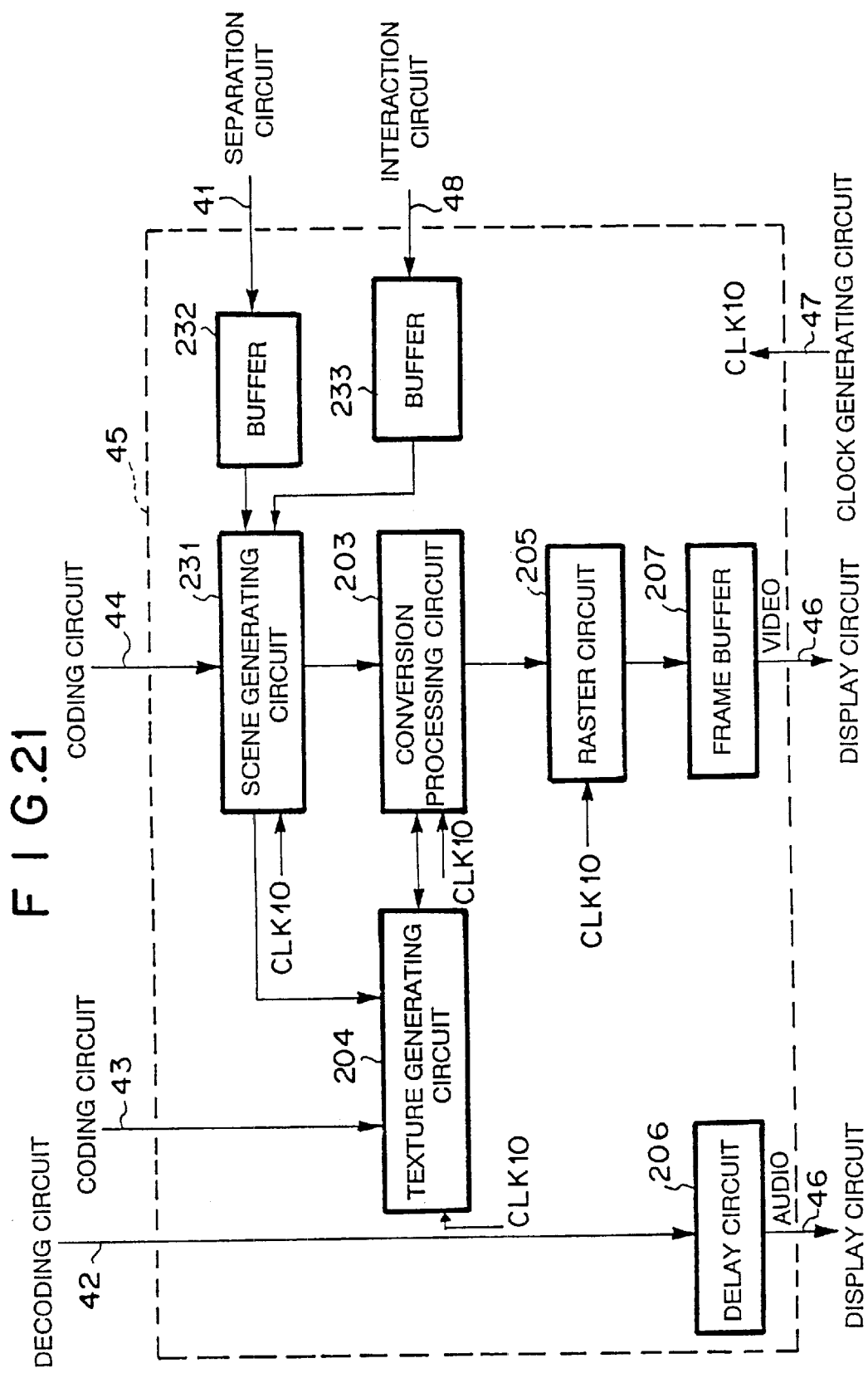
FIG. 21 is a first block diagram showing the construction of a composition circuit of FIG. 18.

FIG. 21 shows 64 with no a first embodiment of the composition circuit 45 of FIG. 18. According to this embodiment, in the construction of FIG. 3, the scene generating circuit 201 is replaced by a scene generating circuit 231 and the buffer 202 is replaced by a buffer 232, and a buffer 233 is further added. The scene generating circuit 231 is designed so that the output line of the time stamp representing the composition timing is removed from the scene generating circuit 201 and in place of the output line thus removed, input lines from the buffer 232 and the buffer 233 are added. The buffer 232 buffers the time stamp representing the composition timing from the separation circuit 41. The buffer 233 buffers interaction data from the interaction circuit 48. The clocks from the clock generating circuit 47 are supplied to the scene generating circuit 231, the conversion processing circuit 203, the texture generating circuit 204 and the raster circuit 205.

Figure 48:
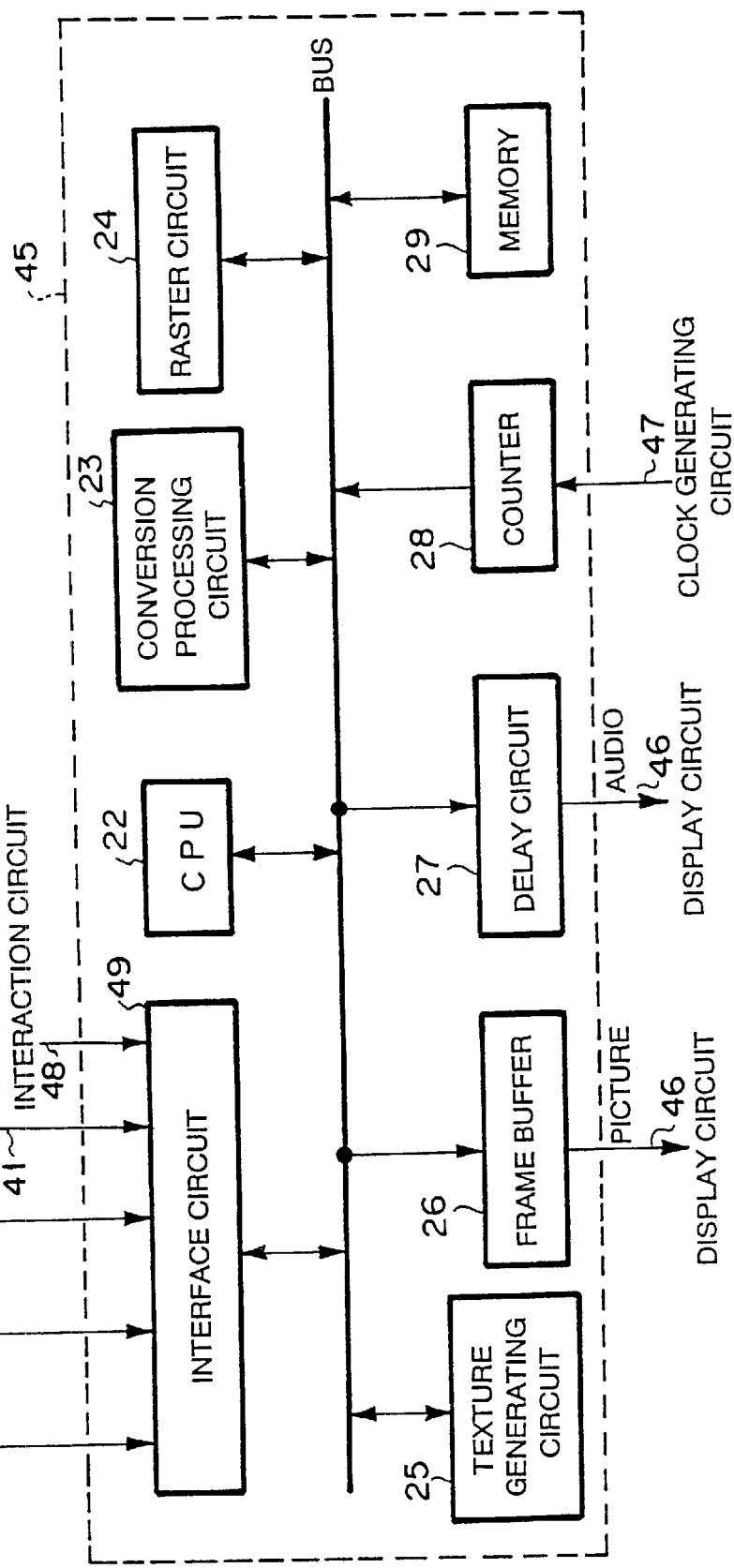
FIG. 48 is a second block diagram showing the construction of the composition circuit of FIG. 18.

FIG. 48 shows a second embodiment of the composition circuit 45. In the construction of FIG. 48, the interface circuit 21 of FIG. 45 is replaced by an interface circuit 49. The interface circuit 49 is designed so that the output line to the multiplexing circuit 6 is removed from the interface circuit 21 of FIG. 45, and in place of the output line thus removed an input line for the time stamp representing the composition timing from the separation circuit 41 and an input line for interaction data from the interaction circuit 48 are newly added.

Next, the operation of the decoding apparatus according to the present invention will be described with reference to FIGS. 18 to 21 and FIG. 48. The separation circuit 41 separates the bit stream input thereto into the compressed data and the time stamp representing the decoding timing for the audio signal, the compressed data and the time stamp representing the decoding timing for the video signal, the compressed data and the time stamp representing the decoding timing for the scene data, the time stamp representing the composition timing and the reference clock value supplied to the clock generating circuit 47 described later.

As shown in FIG. 19, in the separation circuit 41, the buffer 51 first buffers the bit stream input. Subsequently, the demultiplexer 52 separates the bit stream supplied from the buffer 51 into the compressed data and the time stamp representing the decoding timing for the audio signal, the compressed data and the time stamp representing the decoding timing for the video signal, the compressed data and the time stamp representing the decoding timing for the scene data, the time stamp representing the composition timing, the reference clock value supplied to the clock generating circuit 47 described later and the overhead information of a system header portion on the basis of an initialization set value or control information supplied from the additive information holding circuit 53 for holding the bit stream information contained in the system header portion of the bit stream. The additive information holding circuit 53 stores the overhead information of the system header portion supplied from the demultiplexer 52 as occasion demands.

Next, the clock generating circuit 47 receives the reference clock value supplied from the separation circuit 41, and controls the oscillation frequency in accordance with the reference clock vale to generate and output clocks. However, in the case of an application for which the decoding apparatus periodically and positively fetches bit streams, for example, in such a case that the bit streams are contained in a storage medium appended to the decoding apparatus, the clock generating circuit 47 may neglect the reference clock value supplied from the separation circuit 41 and generate clocks at the oscillation frequency itself as in the case of the clock generating circuit 8.

Next, each of the audio decoding circuit 42, the video decoding circuit 43 and the scene decoding circuit 44 executes the corresponding decoding operation on the compressed data at the time given by the corresponding time stamp representing the decoding timing. As shown in FIG. 20, the decoder 63 first performs the decoding operation by using the compressed data give from the buffer 62 and the decoding data give from the memory 64, and newly writes the decoding data thus created into the memory 64. At this time, the clocks (CLK 10) are supplied from the clock generating circuit 47 to each of the audio decoding circuit 42, the video decoding circuit 43 and the scene decoding circuit 44.

Next, the composition circuit 45 performs the composition processing at the time of the time stamp representing the composition timing supplied from the separation circuit 41 by using the audio data obtained from the audio decoding circuit 42, the video data obtained from the video decoding circuit 43 and the scene data obtained from the scene decoding circuit 43. In this case, the respective data may be directly used the decoding data stored in the memory of the decoding circuit. Further, an interaction such as movement of the viewing point for composite pictures, audio is reflected in accordance with the interaction data given from the interaction circuit 48.

The operation of FIG. 21 showing the first embodiment of the composition circuit 45 is basically the same as the circuit of FIG. 3. However, the scene generating circuit 231 starts the composition processing at the time of the time stamp representing the composition timing given from the buffer 232, and it creates scene graph by using the scene data given from the decoding circuit 44 and the interaction data given from the buffer 233 as in the case of the scene generating circuit 201, and then outputs a scene drawing command and intermediate data. The start of the operation of the other circuits can be supported by providing another control lines or setting the drawing command transmission time to the processing start time.

The operation of FIG. 48 showing the second embodiment of the composition circuit 45 is basically the same as the circuit of FIG. 45. However, CPU 22 starts the composition processing at the time of the time stamp representing the composition timing given from the separation circuit 41 through the interface circuit 49.

The operation of the display circuit 46 is the same as the display circuit 7 shown in FIG. 1. An interaction is applied to the resultingly displayed composite picture signal and audio signal through a keyboard, a mouse or the like by a viewer and the result is input to the interaction circuit 48.

Figure 38:
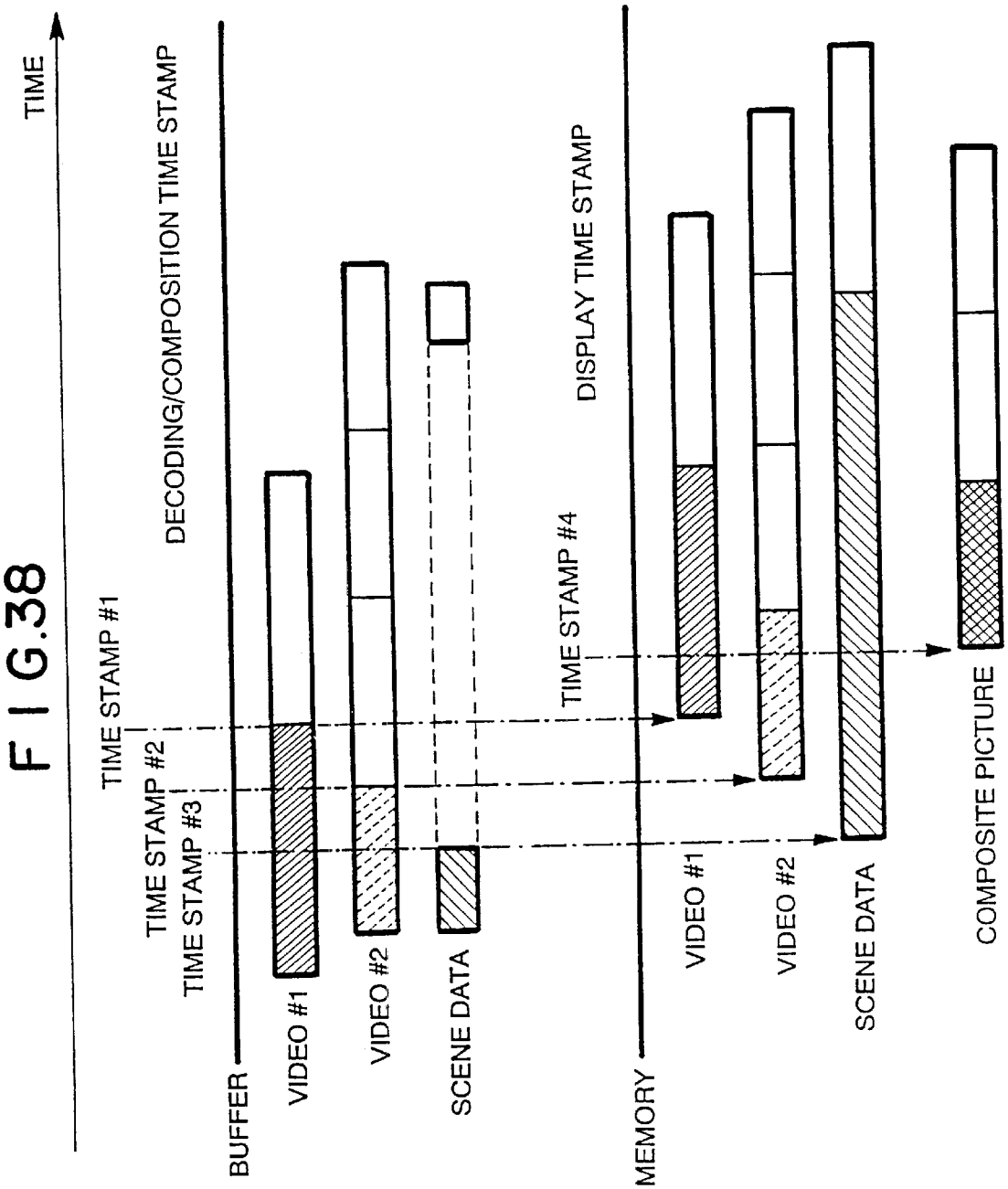
FIG. 38 is a diagram showing data flow among a buffer in a decoding circuit, a memory in the decoding circuit and a composition circuit.
Figure 39:
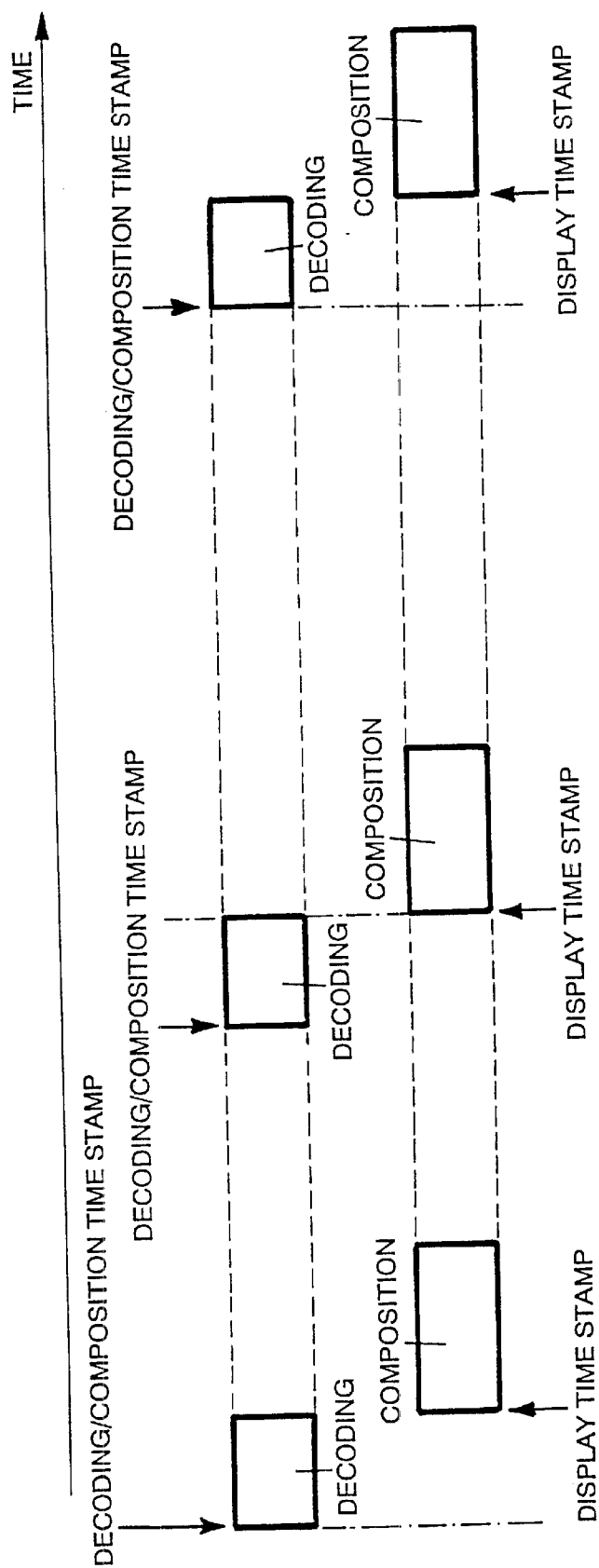
FIG. 39 is a time chart for normal decoding and composition.

FIG. 38 is a time chart showing the relationship among data of the buffer in the decoding circuit of the decoding apparatus of FIG. 18, the decoding processing on the data, data of the memory in the decoding circuit, the composition processing on the data and the final composition picture. As input compressed data are assumed first compressed video data, second compressed video data and scene data. The decoding operation on the respective data is started at the time of the time stamp representing the decoding timing. The data are read out from the buffer and the decoding processing is executed, and the decoding data thus obtained are written into the memory. Subsequently, the composition processing is started at the time of the time stamp representing the composition timing, and the respective decoding data are simultaneously read out from the memory and the composition processing is executed. The composite picture thus obtained is displayed. FIG. 39 is a time chart showing the flow of the decoding processing and the composition processing.

Figure 40:
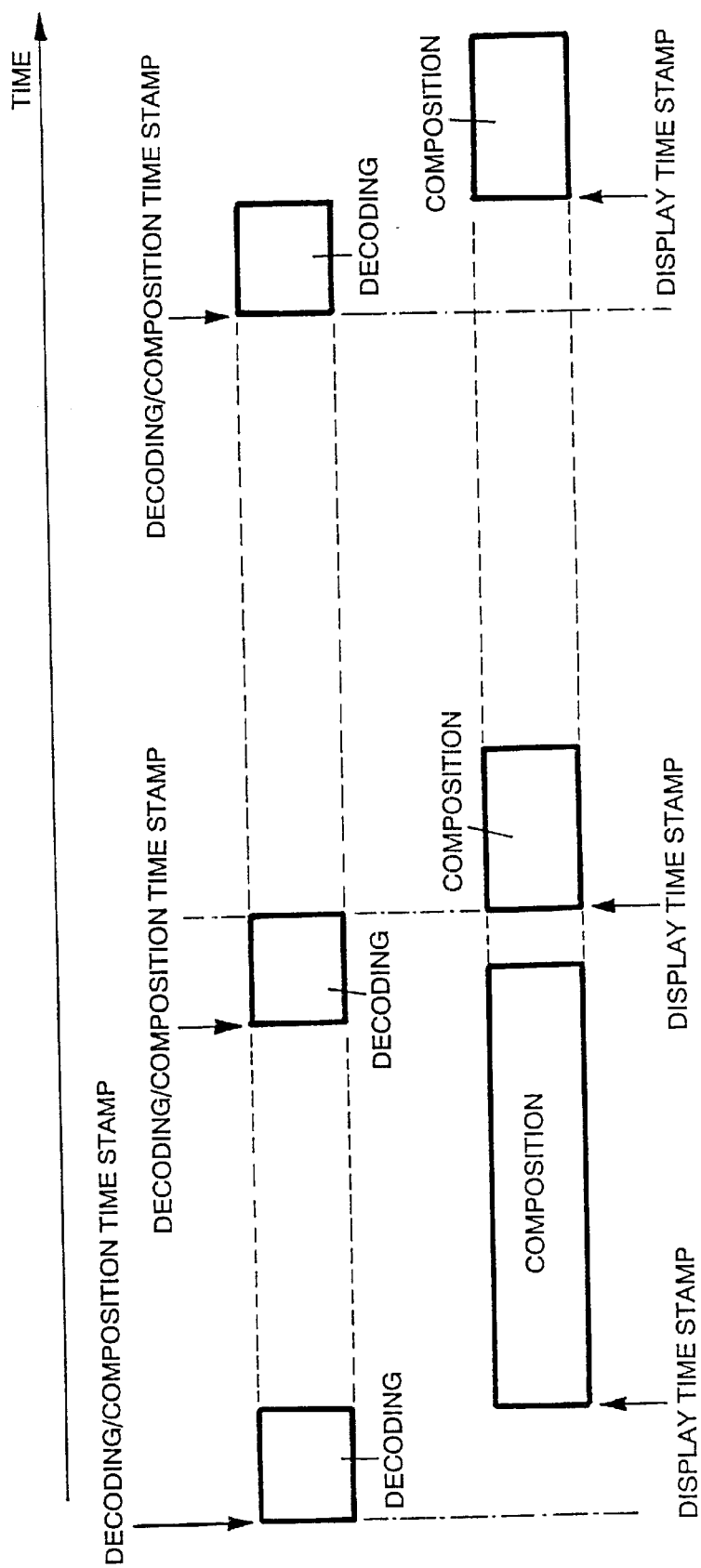
FIG. 40 is a time chart for decoding and composition when excessive time is needed for composition.

FIG. 39 shows a case where the processing speed of the decoding apparatus is sufficiently high and the composition is terminated within an estimated time of the coding apparatus. However when the processing speed of the decoding apparatus is not sufficient, there is a case where the composition processing needs a longer time than the estimated time of the coding apparatus. FIG. 40 is a time chart when the composition processing in the decoding apparatus needs a time above the estimated time.

Figure 41:
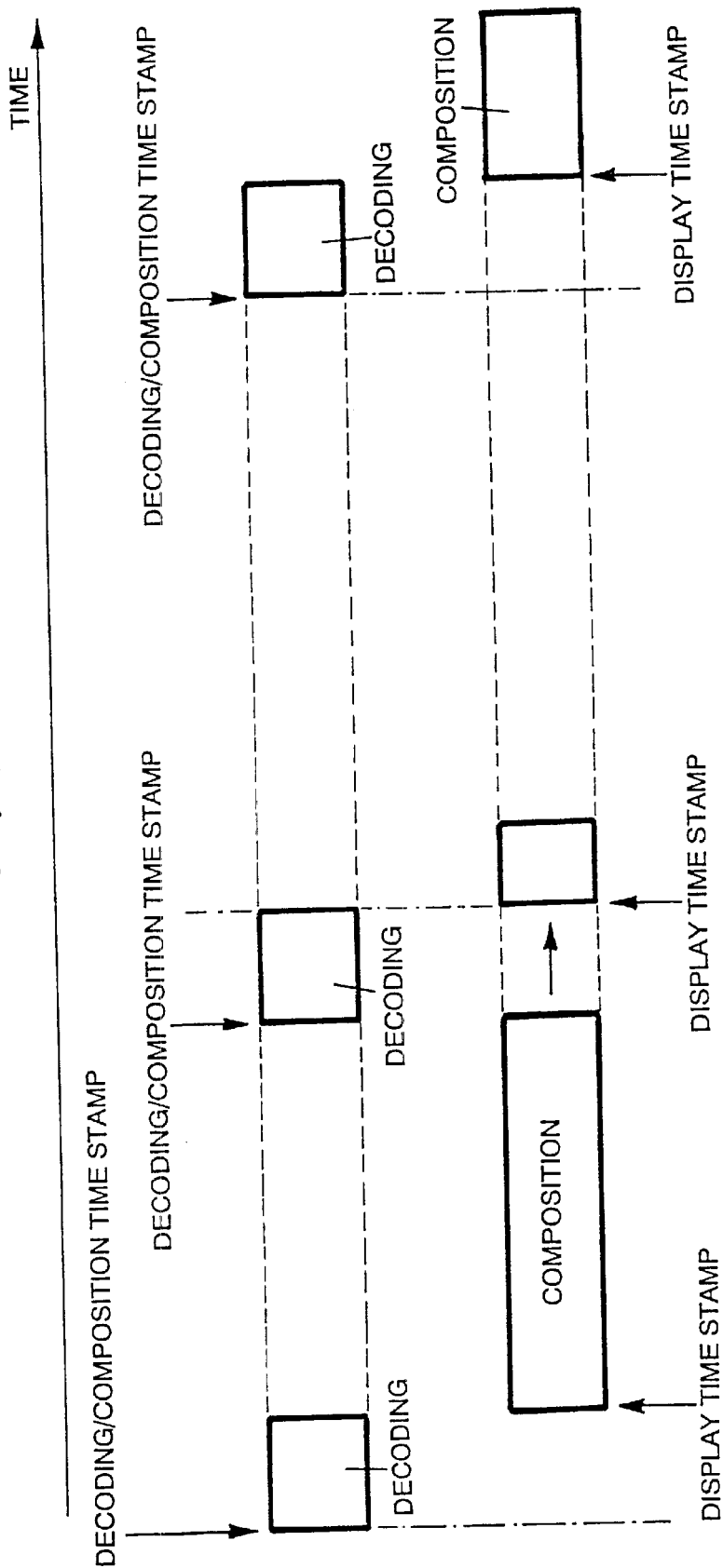
FIG. 41 is a time chart for decoding and composition, which is solved by the decoding apparatus of the first embodiment of the present invention.

As a countermeasure to the above case, the decoding and composition processing as shown in the time chart of FIG. 41 can be performed. That is, when the composition processing has not yet been terminated until the time set at the coding apparatus side, the composition is paused at the time point, that is, the time stamp representing the composition timing is neglected, and the composition is resumed at the termination time of the decoding operation. When the composition concerned has not yet been terminated until the next decoding start timing again, the composition is paused again and it is on standby until the decoding is terminated.

With respect to the audio signal and the video signal, preceding (just-before) decoding data are used for a next decoding operation, and thus skip of the decoding processing causes reduction in quality. Therefore, by pausing the composition processing as described above, the composition that causes no reduction in quality of the audio signal and the video signal can be implemented although the frame rate of the composition is reduced. However, when the pause of the composition causes missing of the audio signal in the reproduction operation, it causes great reduction in quality. Therefore, the reproduction of the audio signal in the composition is settled not to be paused.

Figure 42:
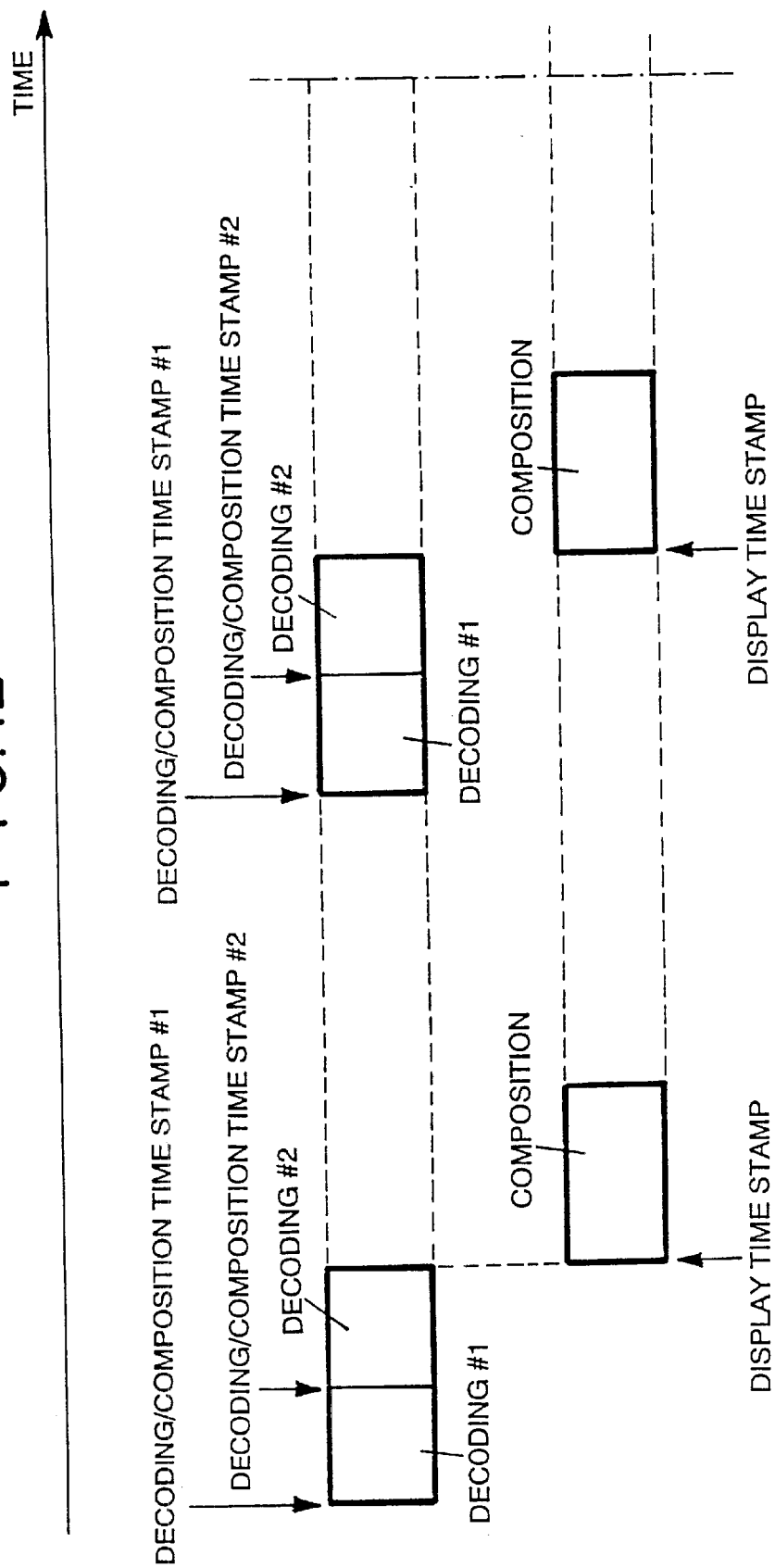
FIG. 42 is a time chart for normal decoding and composition in the case of plural inputs.
Figure 43:
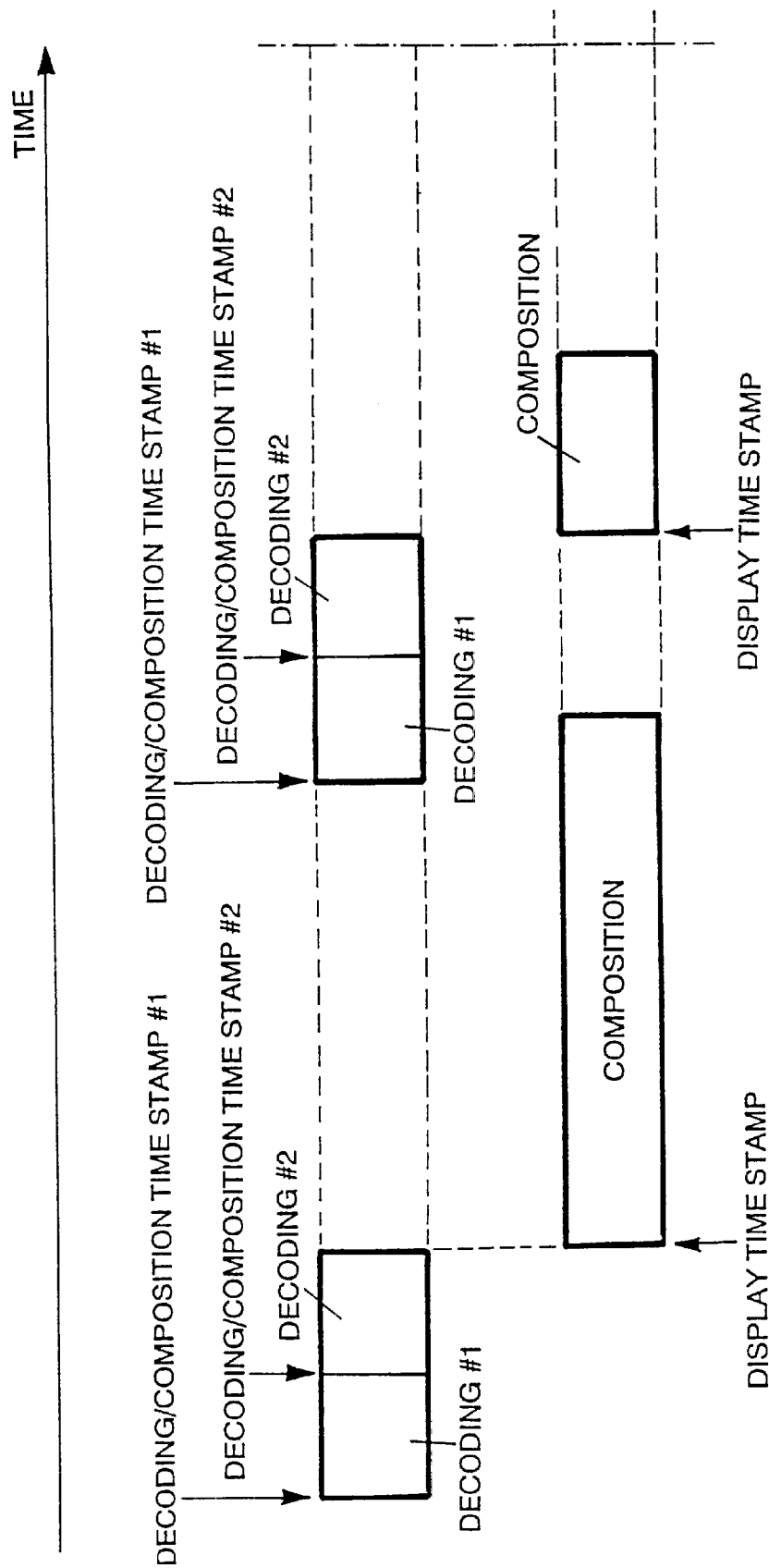
FIG. 43 is a time chart for decoding and composition when excessive time is needed for composition in the case of plural inputs.
Figure 44:
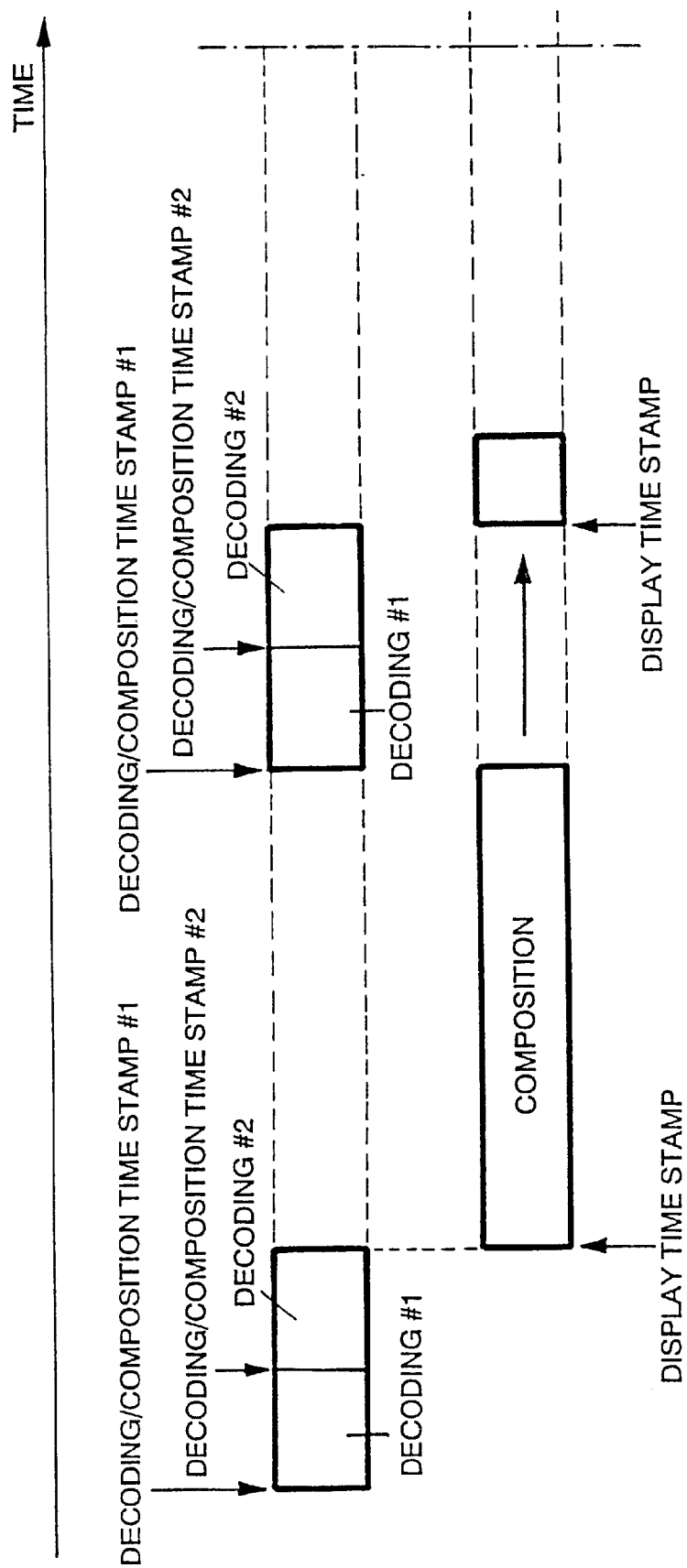
FIG. 44 is a time chart for decoding and composition in the case of plural inputs, which is solved by the decoding apparatus of the first embodiment of the present invention.

FIG. 42 is a timing chart for the normal decoding and composition when plural input data exist, FIG. 43 is a time chart for the decoding and composition showing occurrence of the same problem as FIG. 40 when plural input data exist, and FIG. 44 is a time chart for the decoding and composition, which shows a solving method of the same problem as FIG. 41 when plural input data exist.

Figure 22:
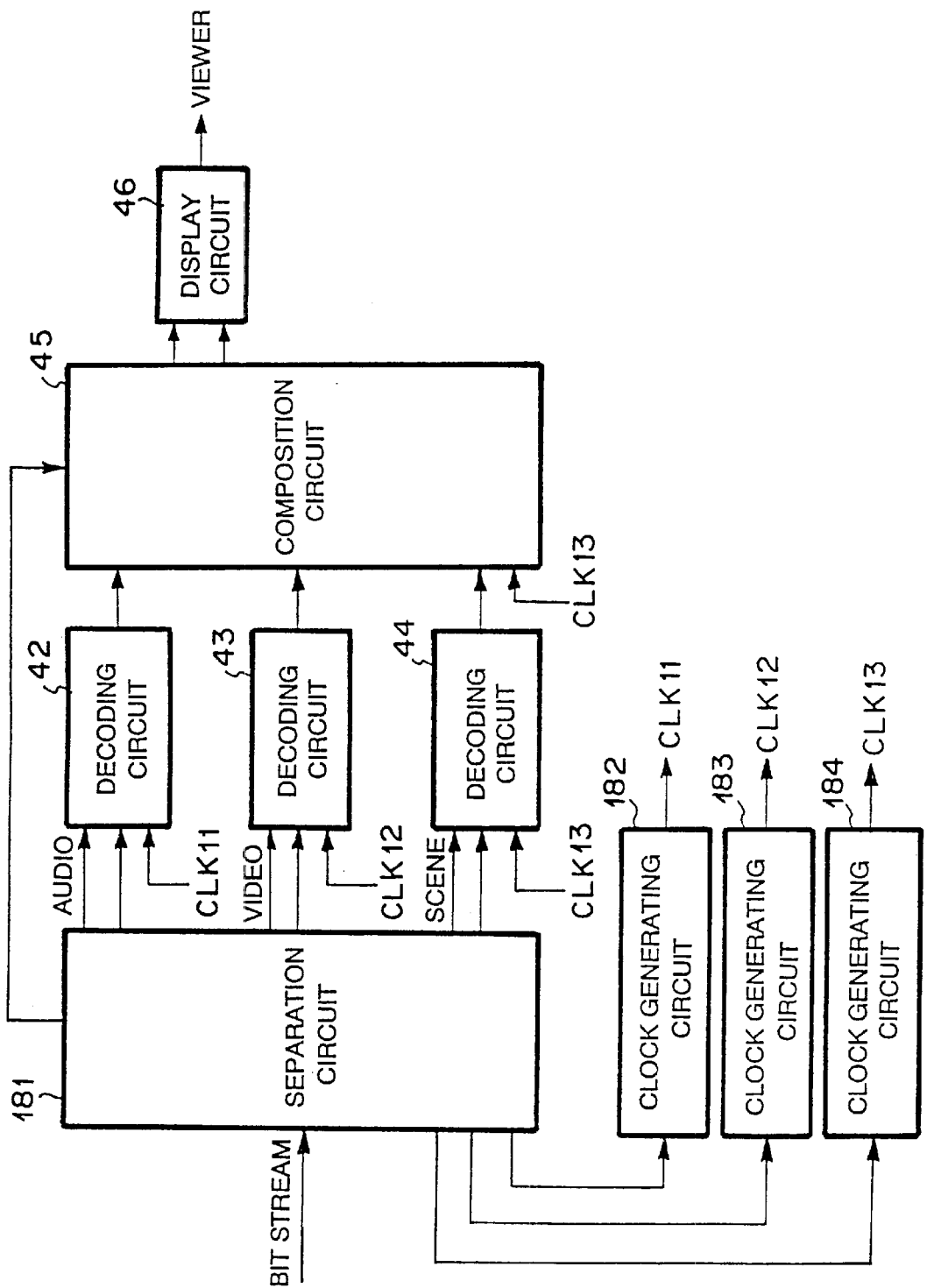
FIG. 22 is a block diagram showing a second embodiment of the decoding apparatus according to the present invention.

FIG. 22 is a block diagram showing a second embodiment of the decoding apparatus of the present invention. In this embodiment, the separation circuit 41 of FIG. 18 is replaced by a separation circuit 181, and different clock generating circuits 182, 183 and 184 are individually allocated to the decoding circuit 42 of the compressed audio data, the decoding circuit 43 for the compressed video data, and both the decoding circuit 44 for the compressed scene data and the composition 45, respectively. The separation circuit 181 is basically the same as the separation circuit 41, however, it is designed to output three reference clock values. The operation of the clock generating circuit 182, 183, 184 is the same as the clock generating circuit 47, and the oscillation frequencies thereof are controlled with the respective reference clock values given from the separation circuit 181.

Figure 23:
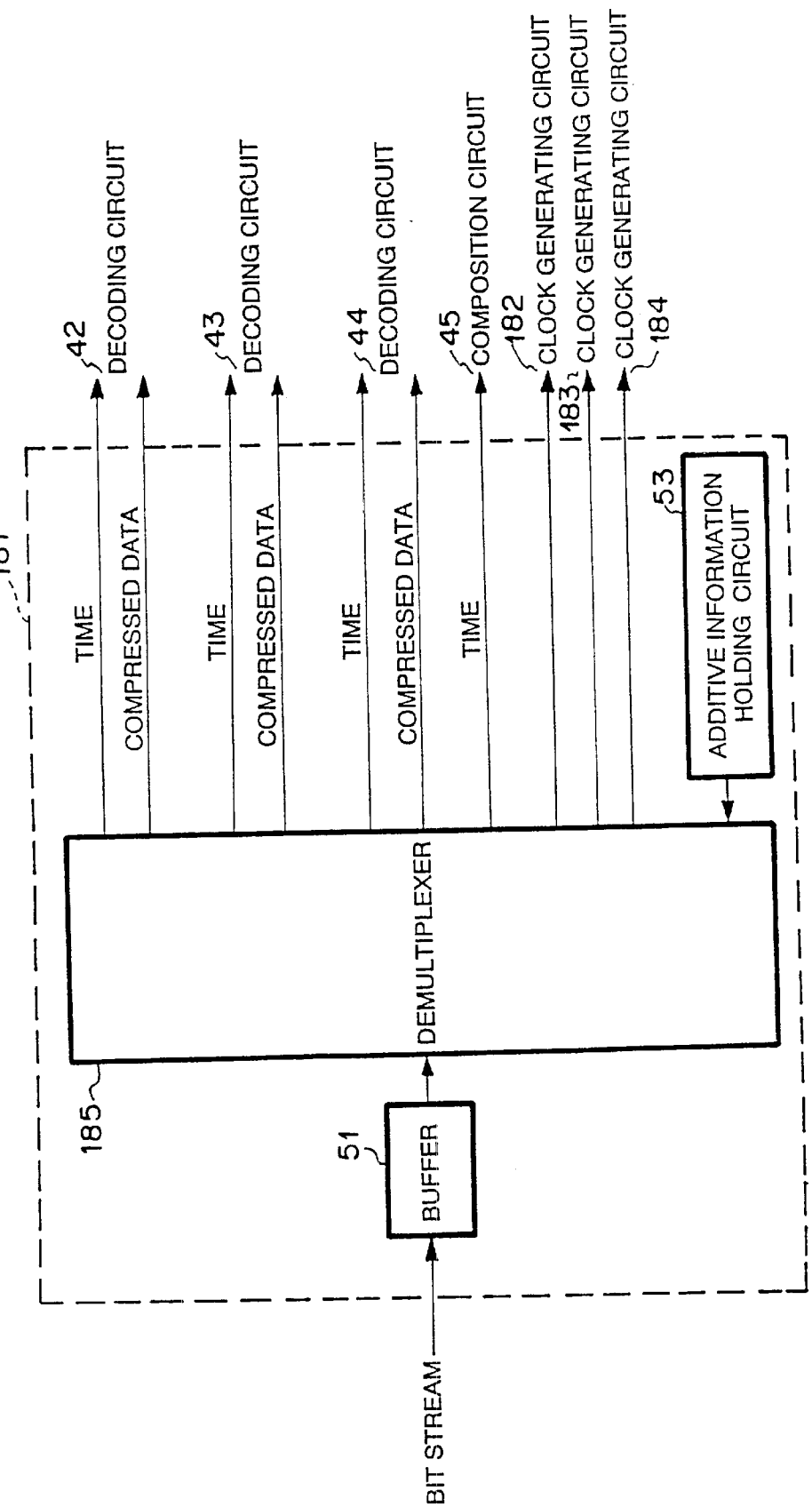
FIG. 23 is a block diagram showing the construction of a separation circuit of FIG. 22.

As shown in FIG. 23, the separation circuit 181 is designed so that the demultiplexer 52 of FIG. 19 is replaced by a demultiplexer 185. The demultiplexer 185 has three output lines for reference clock values.

Next, the operation of the circuit of FIG. 22 will be described. The basic operation is the same operation of the circuit of FIG. 18. The difference resides in that the decoding circuit 42 for the compressed audio data (hereinafter referred to as "compressed audio decoding circuit"), the decoding circuit 43 for the compressed video data (hereinafter referred to as "compressed video decoding circuit"), and both the decoding circuit 44 for the compressed scene data (hereinafter referred to as "compressed scene decoding circuit") and the composition circuit 45 are respectively operated with clocks (CLK11), (CLK12) and (CLK13) supplied from the three different clock generating circuits 182, 183 and 184, respectively, and the separation circuit 181 separates and outputs the three different reference clock values.

Figure 24:
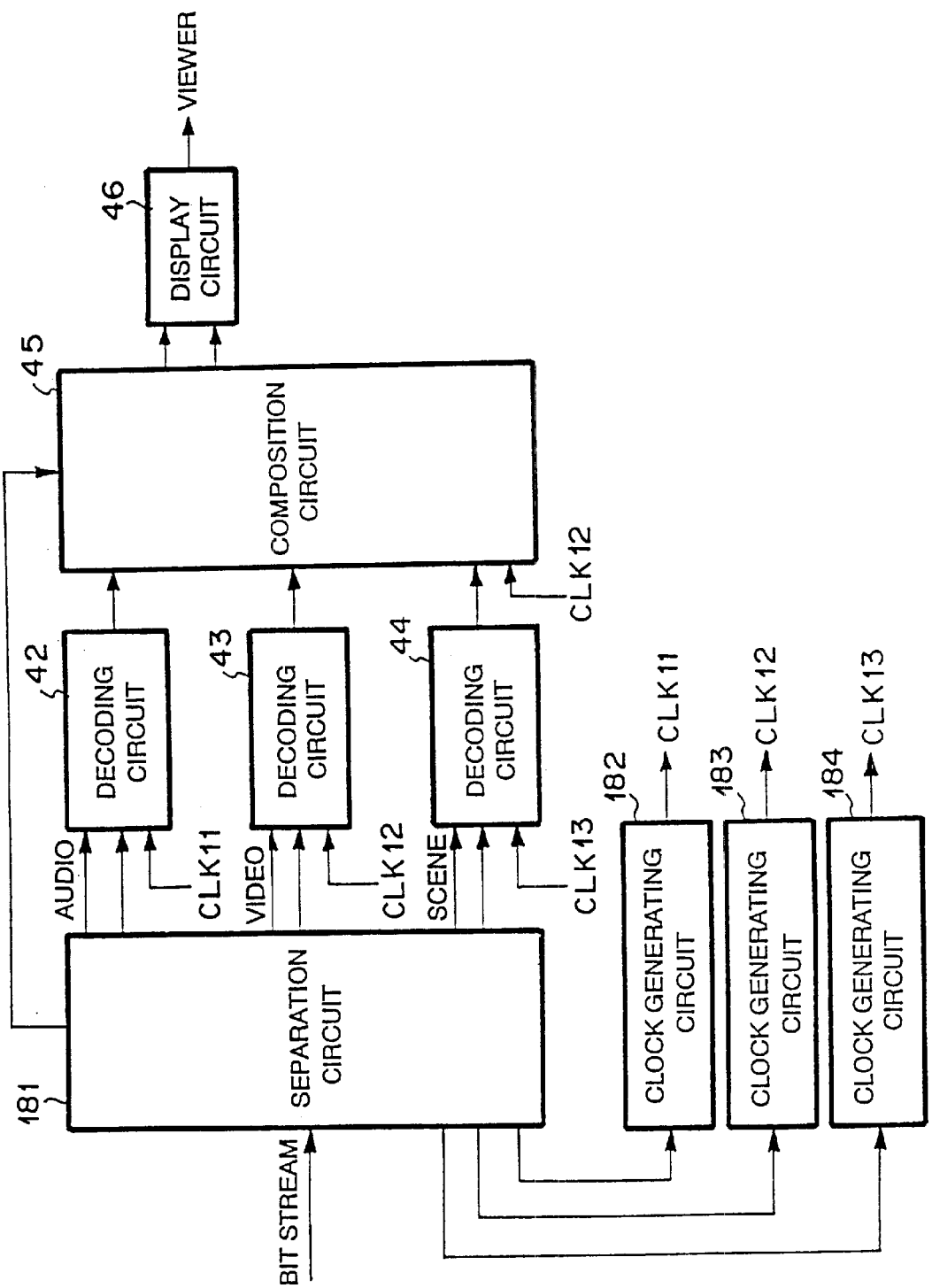
FIG. 24 is a block diagram showing a third embodiment of the decoding apparatus according to the present invention.

FIG. 24 is a block diagram showing a third embodiment of the decoding apparatus of the present invention. In this embodiment, the separation circuit 41 of FIG. 18 is replaced by the separation circuit 181. Further, the different clock generating circuits 182,183,and 184 are individually allocated to the compressed audio decoding circuit 42, both of the compressed video decoding circuit 43 and the composition circuit 45, and the compressed scene decoding circuit 44, respectively. The separation circuit 181 and the clock generating circuits 182, 183 and 184 are the same as the second embodiment of FIG. 22.

Next, the operation of the circuit of FIG. 24 will be described.

The basic operation is the same as the circuit of FIG. 18. The difference resides in that the compressed audio decoding circuit 42, both of the compressed video decoding circuit 43 and the composition circuit 45, and the compressed scene decoding circuit 44 are operated with the clocks (CLK11, CLK12, CLK13) supplied from the three different clock generating circuits 182,183 and 184, respectively, and the separation circuit 181 separates and outputs the three different reference clock values.

Figure 25:
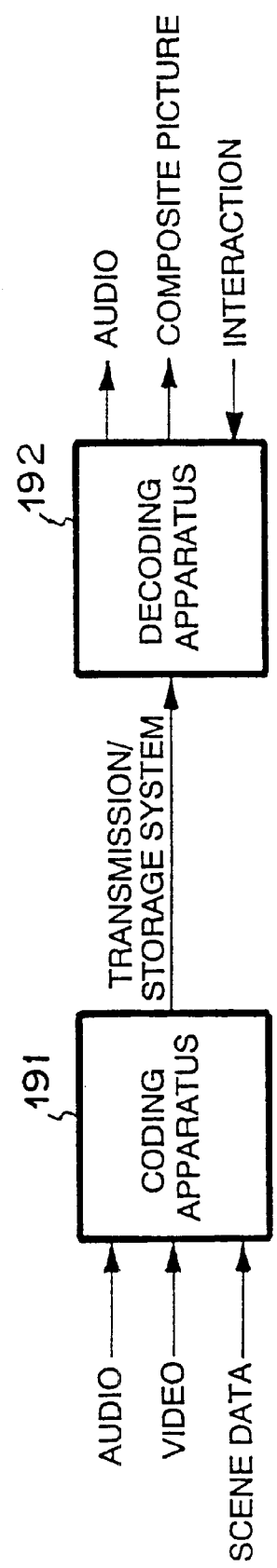
FIG. 25 is a block diagram showing a coding/decoding system according to the present invention.

FIG. 25 is a block diagram showing an embodiment of the coding/decoding system in which the coding apparatus and the decoding apparatus according to the present invention are linked to each other through a transmission/storage system. In FIG. 25, the coding/decoding system comprises coding apparatus 191, decoding apparatus 192 and a transmission/storage system.

The coding apparatus 191 first receives the audio signal, the video signal and the scene data to perform the coding operation on these data, and further multiplexing the data to form a bit stream, and then transmits the multiplexed data to the transmission/storage system. Further, the decoding apparatus 192 decodes a bit stream transmitted from the transmission/storage system, receives an interaction from a viewer to perform the composition processing, and then outputs the composite picture and the audio signal.

As described above, according to the present invention, by using the time stamp representing the composition timing, a desired composite picture can be formed at the coding apparatus side and the synchronous reproduction can be performed at the decoding apparatus side. Further, when plural video signals or scene data exist and the coding/decoding is displaced in phase between these signals or data, the time stamp representing the composition timing is added to a stream of them to manage the composition timing in the decoding apparatus. Further, in accordance with complexity of the composition, the decoding operation and the composition operation of the decoding apparatus can be controlled at the coding apparatus side.

It is unnecessary to provide the two time stamps of the time stamp representing the decoding timing and the time stamp representing the composition timing, and by using one flag it may be informed whether the stream concerned is a stream for managing the composition processing or not. As described above, use of the flag can avoid necessity of inserting the time stamp representing the composition timing into the bit stream, and thus the bit amount can be reduced.

In this case, it is assumed that the decoding timing and the composition timing are coincident with each other.

Figure 49:
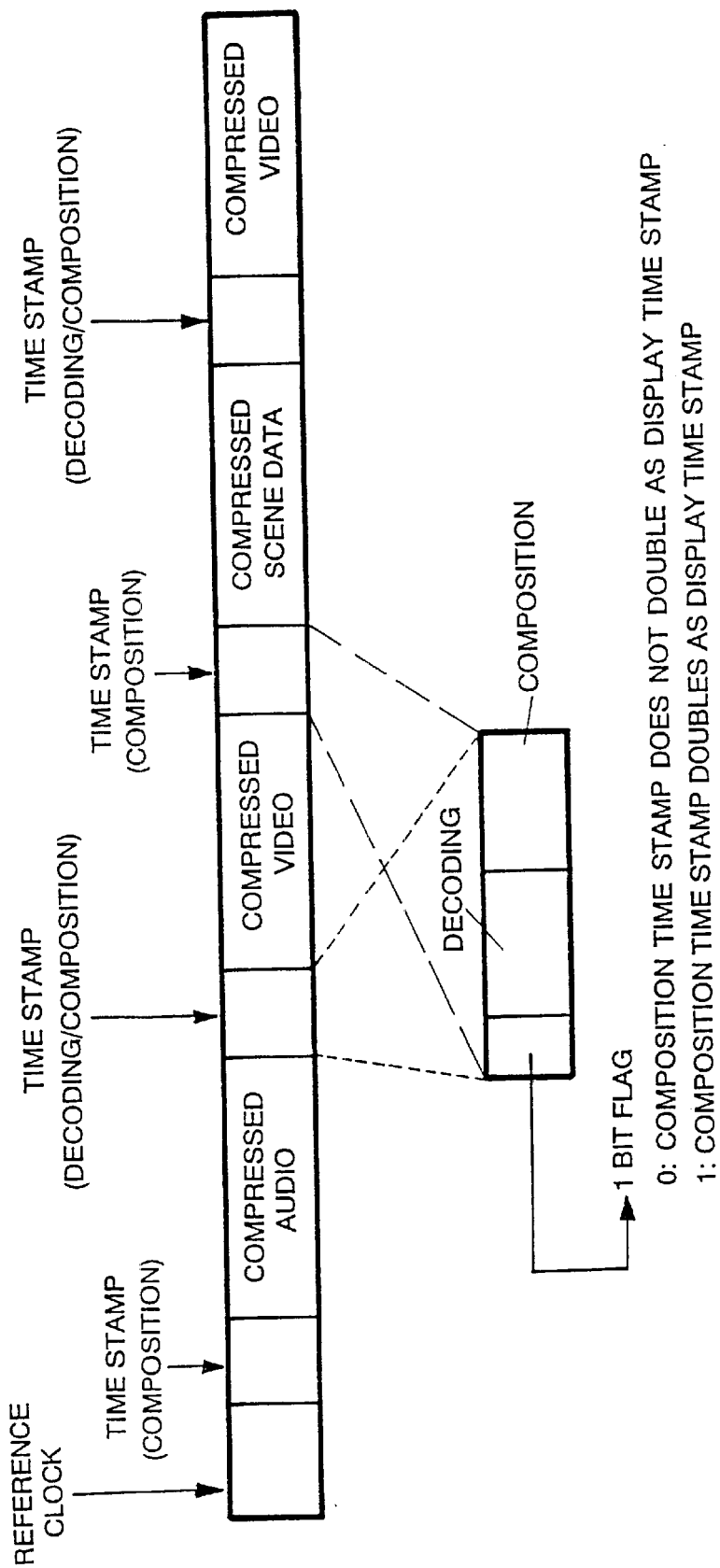
FIG. 49 is a diagram showing another example of a bit stream generated by the coding apparatus of the first embodiment of the present invention.

FIG. 49 shows an embodiment of the bit stream of the present invention when the 1-bit flag as described above is used. a 1-bit flag is added to the time stamp representing the decoding timing which is appended to each of the compressed audio data, the compressed video data and the compressed scene data, and then the multiplexing operation is carried out to generate a bit stream.

It is assumed that when the flag is "0", it is assumed that the time stamp representing the decoding timing does not double as the time stamp representing the composition timing while when the flag is "1", the time stamp representing the decoding timing doubles as the time stamp representing the composition timing.

Figure 50:
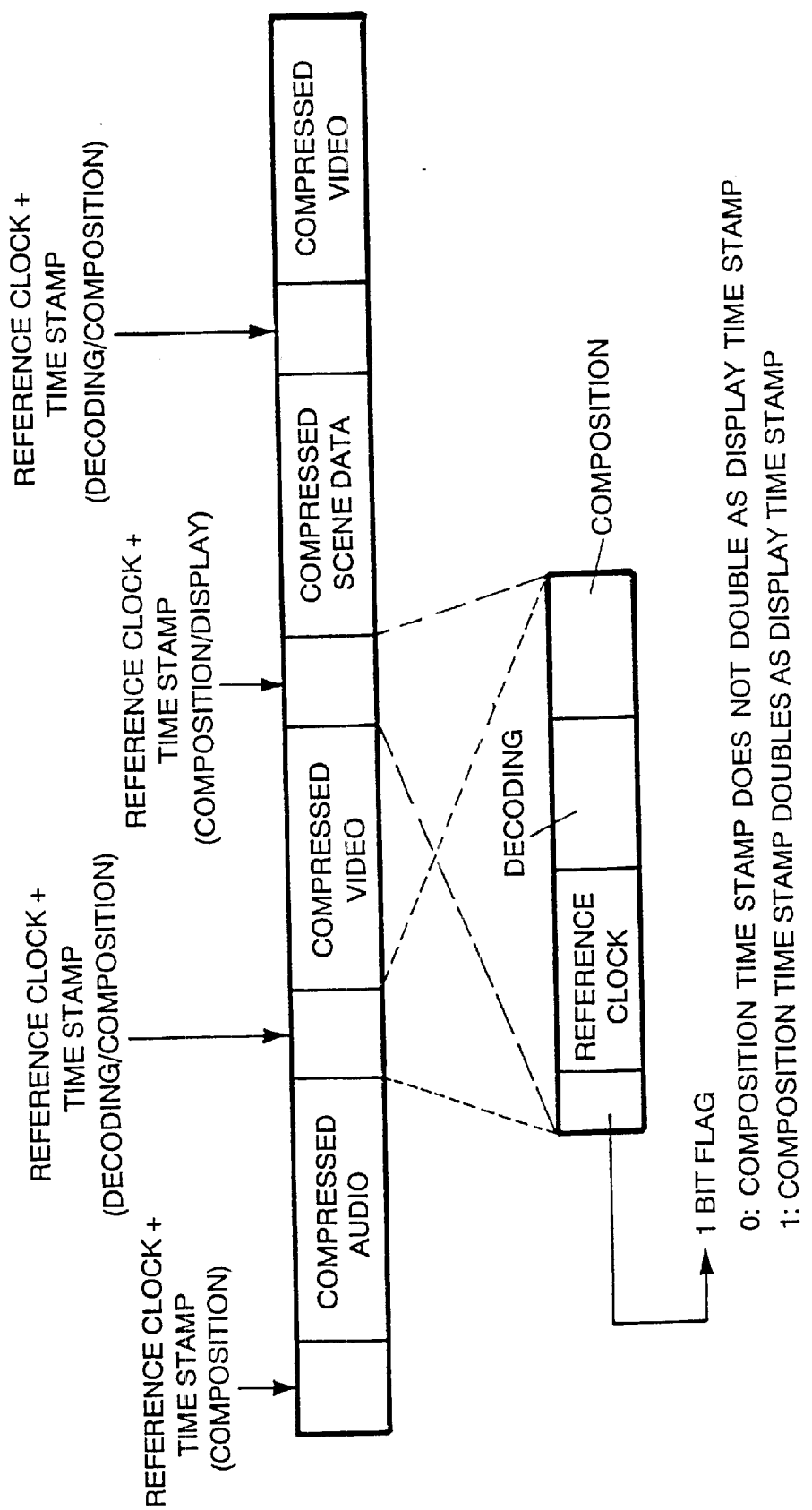
FIG. 50 is a diagram showing another example of a bit stream generated by the coding apparatus of the fourth embodiment of the present invention.

FIG. 50 shows another embodiment of the bit stream according to the present invention in which the 1-bit flag is added to the reference clock value and the time stamp representing the decoding timing. The 1-bit flag is added to the reference clock value and the time stamp representing the decoding timing which is appended to each of the compressed audio data, the compressed video data and the compressed scene data, and the multiplexing operation is carried out to generate a bit stream.

It is assumed that when the flag is "0", the time stamp representing the decoding timing does not double as the time stamp representing the composition timing while when the flag is "1", the time stamp representing the decoding timing doubles as the time stamp representing the composition timing.

Figure 51:
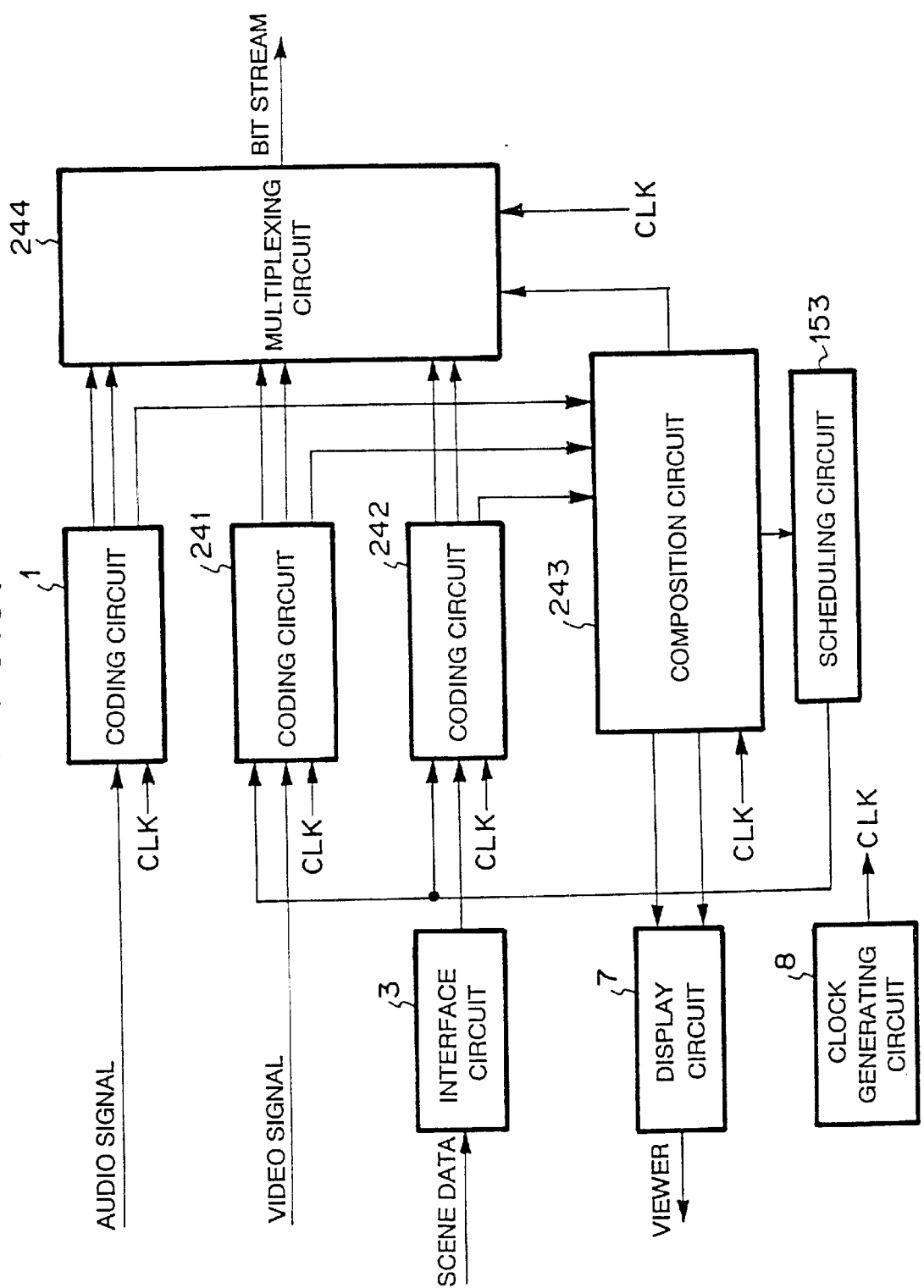
FIG. 51 is a block diagram showing a tenth embodiment of the coding apparatus of the present invention.

FIG. 51 is a block diagram showing a tenth embodiment of the coding apparatus according to the present invention.

According to this embodiment, in the construction of FIG. 5, the video coding circuit 151, the scene coding circuit 4, the composition circuit 152 and the multiplexing circuit 6 are replaced by a coding circuit 241, a coding circuit 242, a composition circuit 243 and a multiplexing circuit 244.

Next, the operation of the circuit of FIG. 51 will be described.

The operation of the circuit of FIG. 51 is basically the same as that of FIG. 5. However, the video coding circuit 241 and the scene coding circuit 242 set the flag of the bit stream of the present invention to "1" and outputs it as time information together with the time stamps representing the decoding timing when the streams thereof carry the composition timing. Conversely, when the streams do not carry the composition timing, the flag of the bit stream of the present invention is set to "0", and output as time information together with the time stamp representing the decoding timing. The composition circuit 243 outputs the composition status as in the case of the composition circuit 152 of FIG. 5. On the other hand, when the composition processing of the composition circuit 243 is not terminated, the video coding circuit 241 or the scene coding circuit 242 sets the flag of the bit stream of the present invention to "0" and outputs it as time information together with the time stamp representing the decoding timing even if the stream originally carries the composition timing. The multiplexing circuit 244 generates and outputs the bit stream according to the present invention.

Figure 52:
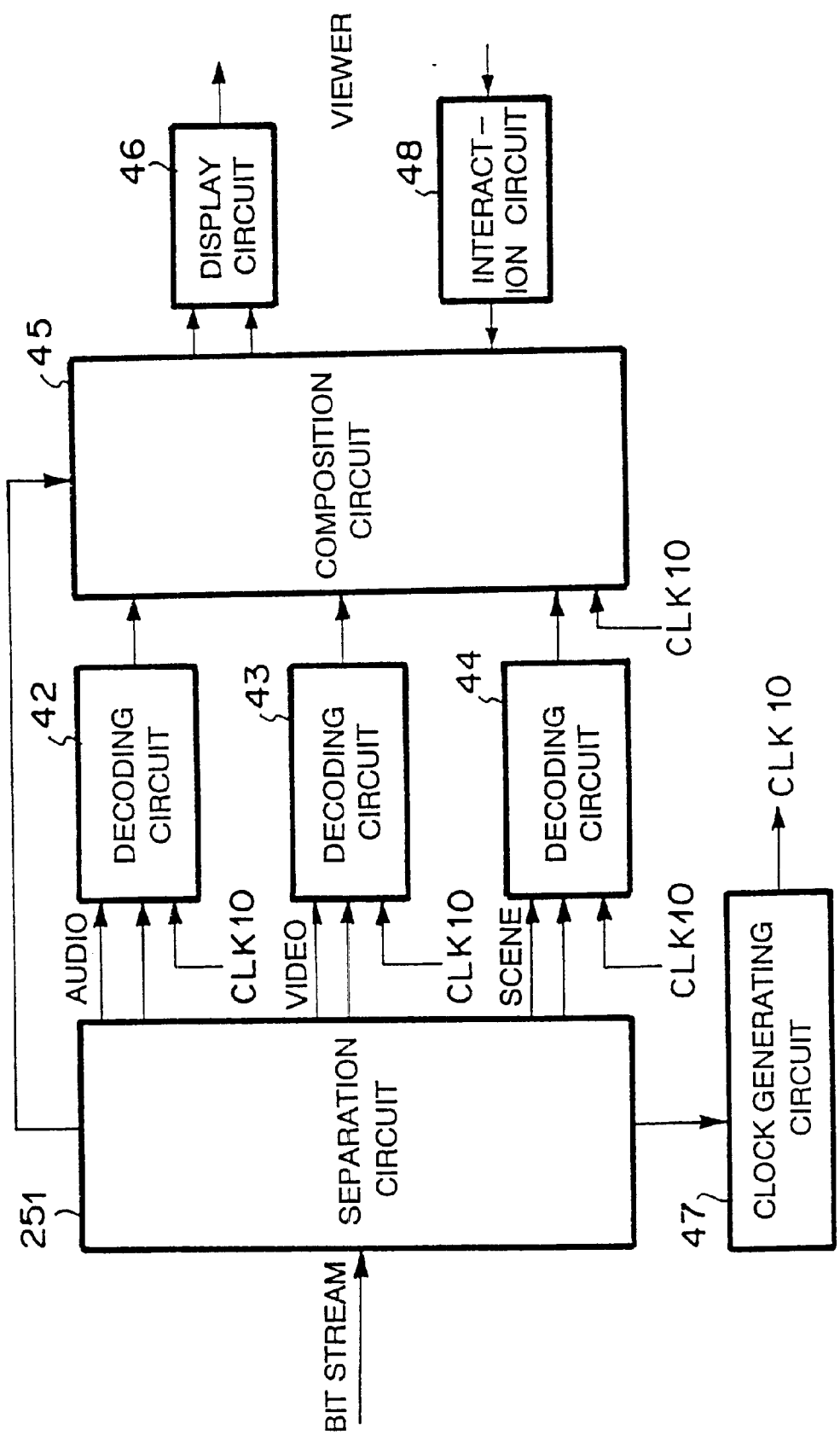
FIG. 52 is a block diagram showing the fourth embodiment of the decoding apparatus of the present invention.
Figure 53:
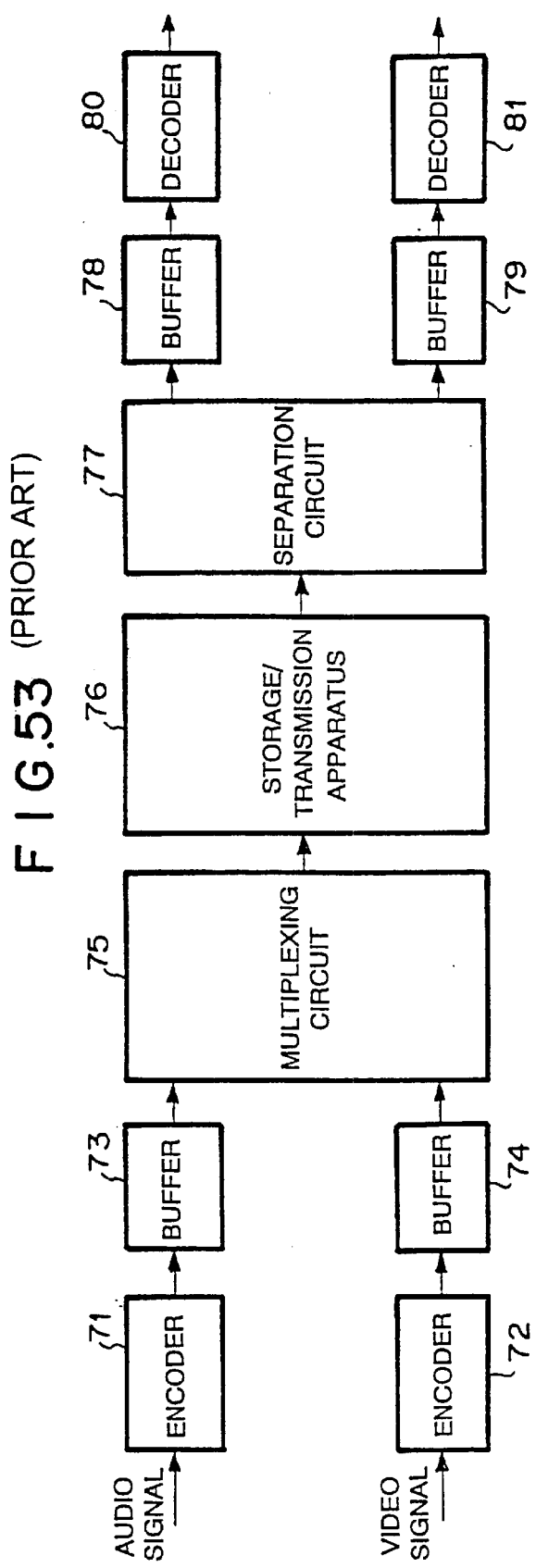
FIG. 53 is a diagram showing a conventional coding/decoding synchronous reproducing system for audio signals and video signals.
Figure 54:
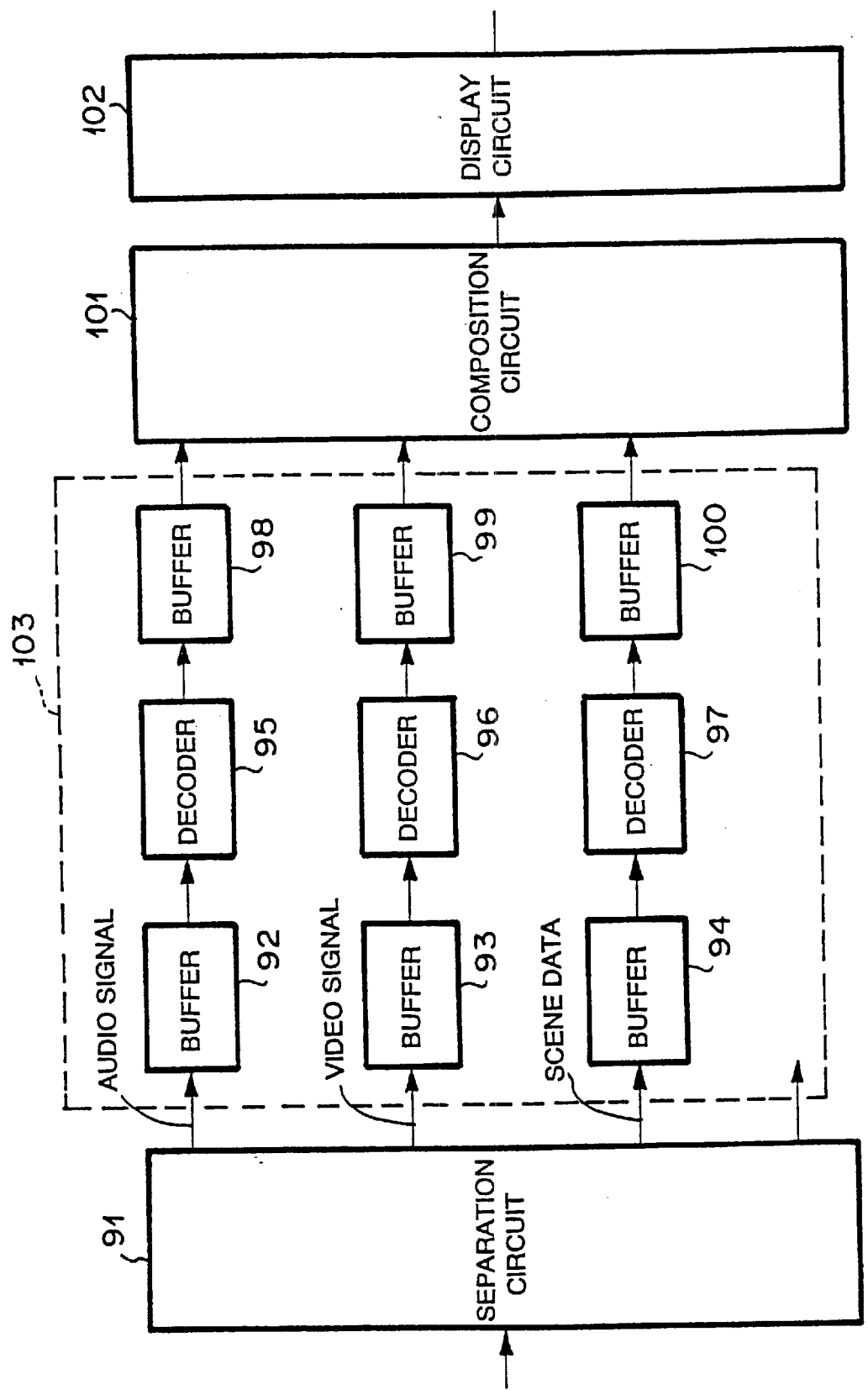
FIG. 54 is a conventional decoding synchronous reproducing system for audio signals, video signals and artificial scene data.
Figure 55:
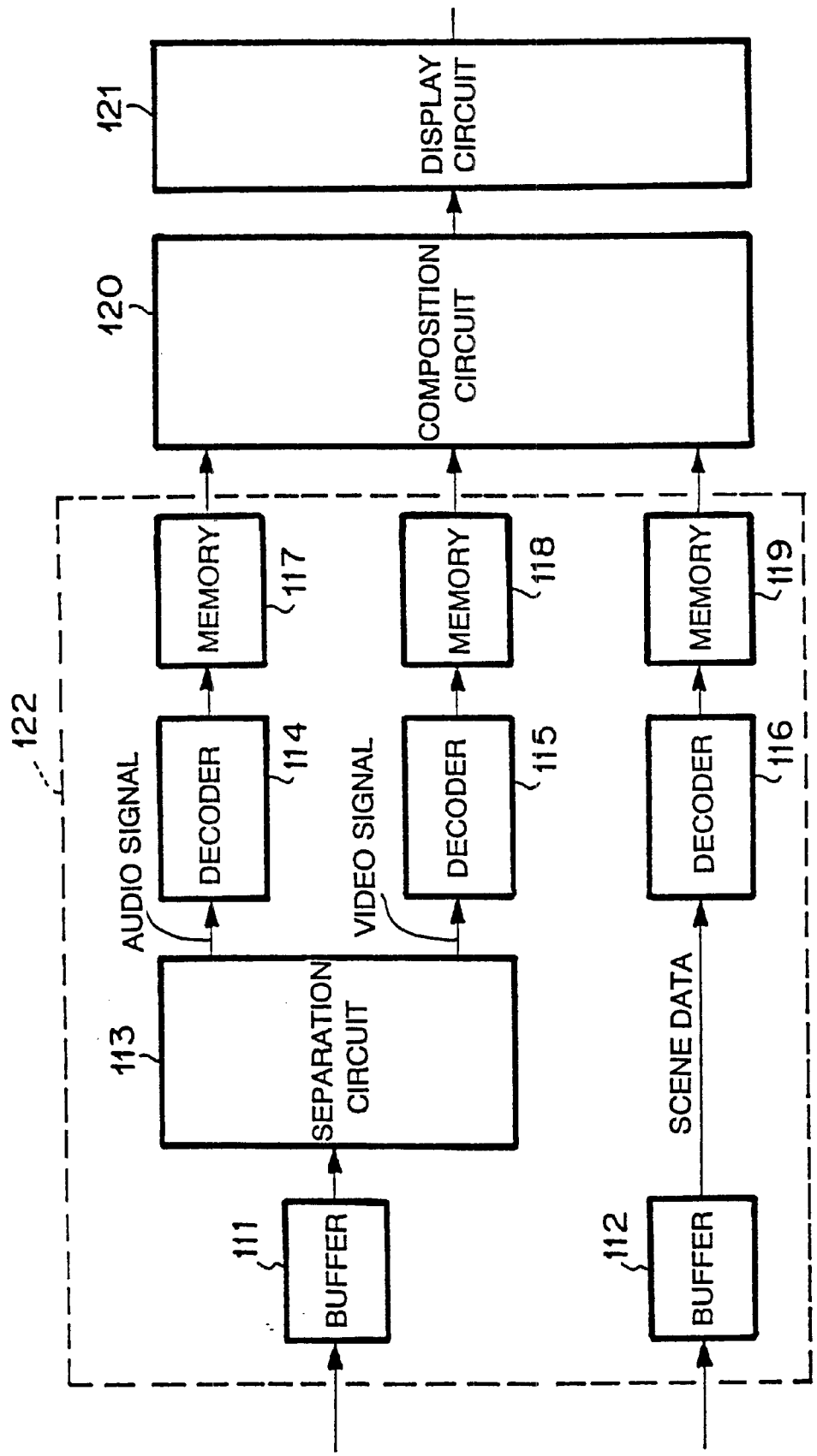
FIG. 55 is a diagram showing a conventional decoding reproducing system for audio signals, video signals and artificial scene data.
Figure 56:
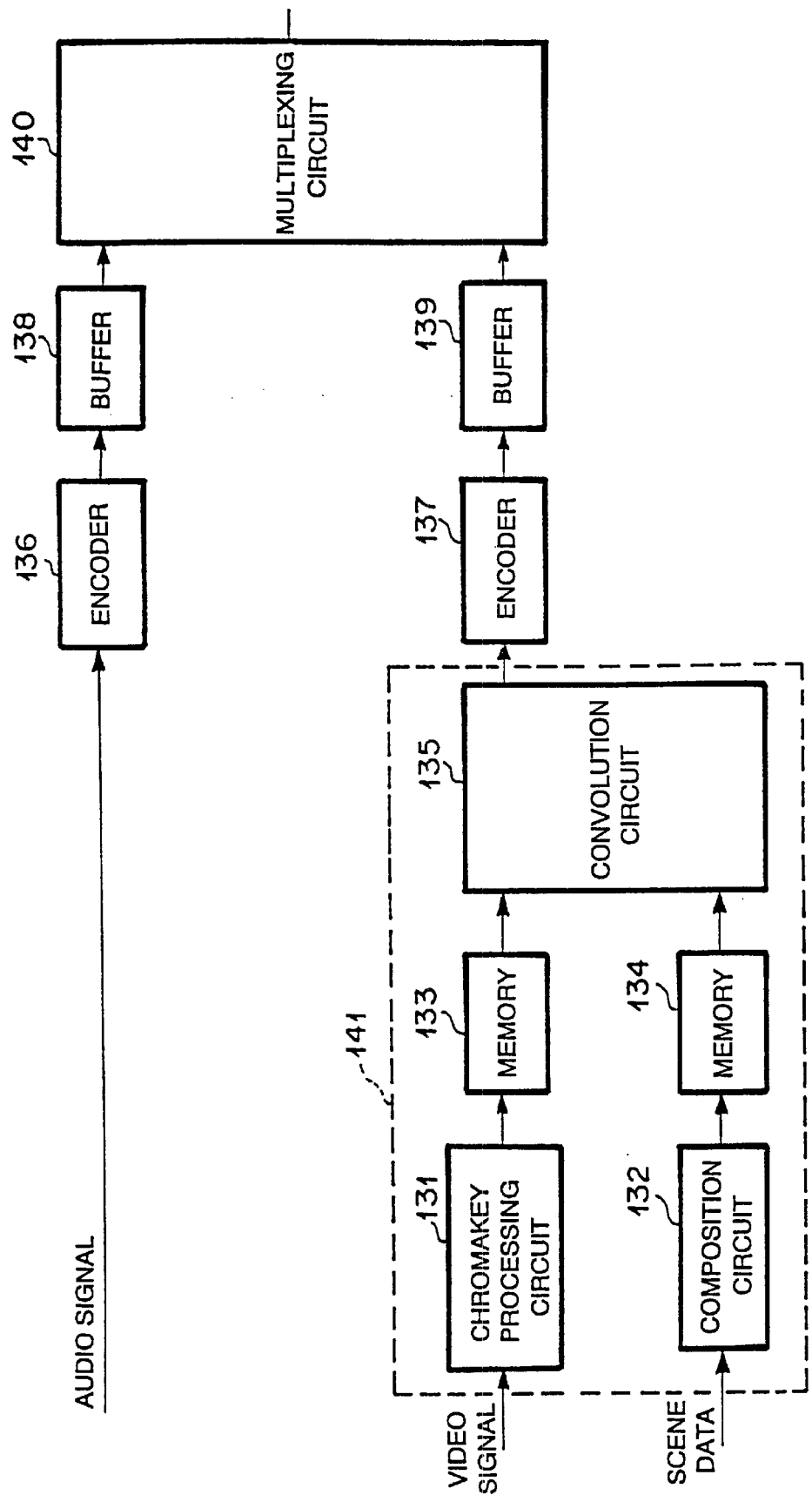
FIG. 56 is a diagram showing a conventional coding/decoding synchronous reproducing system for audio signals, video signals and artificial scene data.

FIG. 52 is a block diagram showing a fourth embodiment of the decoding apparatus according to the present invention. In this embodiment, in the construction of FIG. 18, the separation circuit 41 is replaced by a separation circuit 251. The separation circuit 251 copies and outputs the time stamp representing the decoding timing of a stream which carries the composition timing.

Next, the operation of the circuit of FIG. 52 will be described.

The operation of the circuit of FIG. 52 is basically the same as FIG. 18. However, according to the flag of the bit stream of the presents invention, the separation circuit 251 copies and outputs the time stamp representing the decoding timing of a stream which carries the composition timing. The composition circuit 45 starts the composition operation in accordance with the time stamp. However, actually, it waits until the termination of the processing of the decoding circuit which decodes the stream carrying the composition timing, and starts the composition processing just after the termination of the processing.

Further, the coding apparatus and the decoding apparatus shown in FIGS. 51 and 52 may be linked to each other to fabricate the coding/decoding system shown in FIG. 25.

According to the coding apparatus of the present invention, the time stamp representing the composition timing is added to the bit stream. Therefore, the generation of a desired composition picture at the coding side can be ensured, and the stream data that are transmitted continuously on time axis can be supported. In addition, the coding/decoding synchronous reproduction of audio signals, video signals and artificial scene data can be implemented with supporting the interaction function at the decoding side.

According to the second embodiment of the coding apparatus of the present invention, when the composition load is high, the coding processing of the video signal is controlled and the time stamp representing the composition is added to the bit stream. Therefore, the generation of a composite picture desired at the coding side can be ensured and the stream data that are transmitted continuously on time axis can be supported. In addition, the coding/decoding synchronous reproduction of audio signals, video signals and artificial scene data can be implemented with supporting the interaction function at the decoding side and without reducing the composition frame rate.

According to the third embodiment of the coding apparatus of the present invention, when the composition load is high, the composition processing is controlled, and the time stamp representing the composition timing is added to the bit stream. Therefore, the generation of a composite picture desired at the coding side can be ensured and the stream data that are transmitted continuously on time axis can be supported. In addition, the coding/decoding synchronous reproduction of audio signals, video signals and artificial scene data can be implemented with supporting the interaction function at the decoding side and without reducing the frame rate of video signal.

According to the fourth embodiment of the coding apparatus of the present invention, the same clocks are supplied to the composition circuit and the coding circuit for artificial scene data, and the time stamp representing the composition timing is added to the compressed data of the artificial scene data to generate a bit stream. Therefore, the generation of a composite picture desired at the coding side can be ensured and the stream data that are transmitted continuously on time axis can be supported. In addition, the coding/decoding synchronous reproduction of audio signals, video signals and artificial scene data when the coding is performed with clocks which are different among the audio signal, the video signal and the artificial scene data can be implemented with supporting the interaction function at the decoding side.

According to the fifth embodiment of the coding apparatus of the present invention, when the composition load is high, the coding processing of the video signal is controlled, the same clocks are supplied to the composition circuit and the coding circuit for the artificial scene data, and the time stamp representing the composition timing is appended to the compressed data of the artificial scene data to generate a bit stream. Therefore, the generation of a composite picture desired at the coding side can be ensured and the stream data that are transmitted continuously on time axis can be supported. In addition, the coding/decoding synchronous reproduction of audio signals, video signals and artificial scene data when the coding is performed with clocks which are different among the audio signal, the video signal and the artificial scene data can be implemented with supporting the interaction function at the decoding side and without reducing the composition frame rate.

According to the sixth embodiment of the coding apparatus of the present invention, when the composition load is high, the composition processing is controlled, the same clocks are supplied to the composition circuit and the coding circuit for the artificial scene data, and the time stamp representing the composition timing is appended to the compressed data of the artificial scene data to generate a bit stream. Therefore, the generation of a composite picture desired at the coding side can be ensured and the stream data which are transmitted continuously on time axis can be supported. In addition, the coding/decoding synchronous reproduction of audio signals, video signals and artificial scene data when the coding is performed with clocks which are different among the audio signal, the video signal and the artificial scene data can be implemented with supporting the interaction function at the decoding side and without reducing the frame rate of video signal.

According to the seventh embodiment of the coding apparatus of the present invention, the same clocks are supplied to the composition circuit and the coding circuit for the video signal, and the time stamp representing the composition timing is appended to the compressed data of the video signal to generate a bit stream. Therefore, the generation of a composite picture desired at the coding side can be ensured and the stream data that are transmitted continuously on time axis can be supported. In addition, the coding/decoding synchronous reproduction of audio signals, video signals and artificial scene data when the coding is performed with clocks which are different among the audio signal, the video signal and the artificial scene data can be implemented with supporting the interaction function at the decoding side.

According to the eighth embodiment of the coding apparatus of the present invention, when the composition load is high, the coding processing of the video signal is controlled, the same clocks are supplied to the composition circuit and the coding circuit for the video signal, and the time stamp representing the composition timing is appended to the compressed data of the video signal to generate a bit stream. Therefore, the generation of a composite picture desired at the coding side can be ensured and the stream data which are transmitted continuously on time axis can be supported. In addition, the coding/decoding synchronous reproduction of audio signals, video signals and artificial scene data when the coding is performed with clocks which are different among the audio signal, the video signal and the artificial scene data can be implemented with supporting the interaction function at the decoding side and without reducing the composition frame rate.

According to the ninth embodiment of the coding apparatus of the present invention, when the composition load is high, the composition processing is controlled, the same clocks are supplied to the composition circuit and the coding circuit for the video signal, and the time stamp representing the composition timing is appended to the compressed data of the video signal to generate a bit stream. Therefore, the generation of a composite picture desired at the coding side can be ensured and the stream data which are transmitted continuously on time axis can be supported. In addition, the coding/decoding synchronous reproduction of audio signals, video signals and artificial scene data when the coding is performed with clocks which are different among the audio signal, the video signal and the artificial scene data can be implemented with supporting the interaction function at the decoding side and without reducing the frame rate of video signal.

According to the decoding apparatus of the present invention, the composition processing is performed by using the time stamp representing the composition timing that is added to the bit stream. Therefore, the generation of a composite picture desired at the coding side can be ensured and the stream data that are transmitted continuously on time axis can be supported. In addition, the coding/decoding synchronous reproduction of audio signals, video signals and artificial scene data can be implemented with supporting the interaction function at the decoding side.

According to the second embodiment of the decoding apparatus of the present invention, the composition circuit and the decoding apparatus for the compressed artificial scene data are driven by using clocks generated with a reference clock value which is appended to the compressed data of the artificial scene data in the bit stream, and the composition processing is performed by using the time stamp representing the composition timing appended to the compressed data of the artificial scene data. Therefore, the generation of a composite picture desired at the coding side can be ensured and the stream data that are transmitted continuously on time axis can be supported. In addition, the coding/decoding synchronous reproduction of audio signals, video signals and artificial scene data when the coding is performed with clocks which are different among the audio signal, the video signal and the artificial scene data can be implemented with supporting the interaction function at the decoding side.

According to the third embodiment of the decoding apparatus of the present invention, the composition circuit and the decoding apparatus for the compressed data of the video signal are driven by using clocks generated with a reference clock value which is appended to the compressed data of the video signal in the bit stream, and the composition processing is performed by using the time stamp representing the composition timing appended to the compressed data of the video signal. Therefore, the generation of a composite picture desired at the coding side can be ensured and the stream data that are transmitted continuously on time axis can be supported. In addition, the coding/decoding synchronous reproduction of audio signals, video signals and artificial scene data when the coding is performed with clocks which are different among the audio signal, the video signal and the artificial scene data can be implemented with supporting the interaction function at the decoding side.

According to the coding/decoding system of the present invention, the coding/decoding system is constituted by proper combination of the coding apparatus of the present invention and the decoding apparatus of the present invention. Therefore, the generation of a composite picture desired at the coding side can be ensured and the stream data that are transmitted continuously on time axis can be supported. In addition, the coding/decoding synchronous reproduction of audio signals, video signals and artificial scene data can be implemented with the operation/working-effect by the combination of the coding apparatus and the decoding apparatus and with supporting the interaction function at the decoding side.

According to the bit stream of the present invention, the time stamp representing the decoding timing and the time stamp representing the composition timing can be made common to each other. Therefore, the generation of a composite picture desired at the coding side can be ensured and the stream data that are transmitted continuously on time axis can be supported. In addition, the coding/decoding synchronous reproduction of audio signals, video signals and artificial scene data when the coding is performed with clocks which are different among the audio signal, the video signal and the artificial scene data can be implemented with supporting the interaction function at the decoding side and reducing overhead information.

According to the tenth embodiment of the coding apparatus of the present invention, the time stamp representing the decoding timing and the time stamp representing the composition timing are made common by using a flag to generate a bit stream. Therefore, the generation of a composite picture desired at the coding side can be ensured and the stream data that are transmitted continuously on time axis can be supported. In addition, the coding/decoding synchronous reproduction of audio signals, video signals and artificial scene data when the coding is performed with clocks which are different among the audio signal, the video signal and the artificial scene data can be implemented with supporting the interaction function at the decoding side and reducing overhead information.

According to the fourth embodiment of the decoding apparatus of the present invention, the decoding processing is performed by using the bit stream which is obtained by making common the time stamp representing the decoding timing and the time stamp representing the composition timing with a flag. Therefore, the generation of a.composite picture desired at the coding side can be ensured and the stream data that are transmitted continuously on time axis can be supported. In addition, the coding/decoding synchronous reproduction of audio signals, video signals and artificial scene data when the coding is performed with clocks which are different among the audio signal, the video signal and the artificial scene data can be implemented with supporting the interaction function at the decoding side and reducing overhead information.

According to the another embodiment of the coding/decoding system of the present invention, it uses the coding apparatus and the decoding apparatus using the bit stream which is obtained by making common the time stamp representing the decoding timing and the time stamp representing the composition timing with a flag. Therefore, the generation of a composite picture desired at the coding side can be ensured and the stream data that are transmitted continuously on time axis can be supported. In addition, the coding/decoding synchronous reproduction of audio signals, video signals and artificial scene data when the coding is performed with clocks which are different among the audio signal, the video signal and the artificial scene data can be implemented with supporting the interaction function at the decoding side and reducing overhead information.

What is claimed is:

1. A coding apparatus comprising:
   audio signal coding means for coding an audio signal to output compressed audio data, local-decoding the compressed audio data to output local-decoded audio data and outputting time information which represent the decoding timing of the compressed audio data;

video signal coding means for coding a video signal to output compressed video data, local-decoding the compressed video data to output local-decoded video data and outputting time information which represent the decoding timing of the compressed video data;

interface means for accepting information on a composite scene;

scene data coding means for coding scene data supplied from said interface means to output compressed scene data, local-decoding the compressed scene data to output local-decoded scene data and outputting time information which represent the decoding timing of the compressed scene data;

composition means for composing a scene from the local-decoded audio data, the local-decoded video data and the local-decoded scene data to output a composed scene and outputting the time information which represent the composite timing of the composed scene;

means for reproducing/displaying the composed scene supplied from said composition means;

clock supply means for supplying at least one clock to said audio signal coding means, said video signal coding means, said scene data coding means and said composition means; and multiplexing means for creating a bit stream on the basis of the time information and compressed audio data supplied from said audio signal coding means, the time information and compressed video data supplied from said video signal coding means, the time information and compressed scene data supplied from said scene data coding means, the time information supplied from said composition means, and at least one clock value of at least one clock supplied from said clock supply means.

2. The coding apparatus as claimed in claim 1, further comprising means for detecting the delay status of a scene composite processing on said composition means and controlling the operation of said video signal coding means to pause a coding processing of a frame which has been late for the scene composite processing.

3. The coding apparatus as claimed in claim 1, further comprising means for detecting the delay status of each coding processing on said audio signal coding means, said video signal coding means and said scene data coding means, and controlling the operation of said video signal coding means to pause a scene composite processing of audio signal, video signal or scene data on a frame which has been late for a scene composite processing.

4. A coding apparatus comprising:

audio signal coding means for coding an audio signal to output compressed audio data, local-decoding the compressed audio data to output local-decoded audio data and outputting time information which represent the decoding timing of the compressed audio data;

video signal coding means for coding a video signal to output compressed video data, local-decoding the compressed video data to output local-decoded video data and outputting time information which represent the decoding timing of the compressed video data;

interface means for accepting information on a composite scene;

scene data coding means for coding scene data supplied from said interface means to output compressed scene data, local-decoding the compressed scene data to output local-decoded scene data and outputting time information which represent the decoding timing of the compressed scene data;

composition means for composing a scene from the local-decoded audio data, the local-decoded video data and the local-decoded scene data to output a composed scene and outputting the time information which represent the composite timing of the composed scene;

means for reproducing/displaying the composed scene supplied from said composition means;

clock supply means for supplying at least one clock to said audio signal coding means, said video signal coding means, said scene data coding means and said composition means; and multiplexing means for creating a bit stream on the basis of the time information and compressed audio data supplied from said audio signal coding means, the time information and compressed video data supplied from said video signal coding means, the time information and compressed scene data supplied from said scene data coding means, the time information supplied from said composition means, and at least one clock value of at least one clock supplied from said clock supply means;

wherein said clock supply means includes first clock supply means for supplying first clock to said audio signal coding means, second clock supply means for supplying second clock to said video signal coding means and third clock supply means for supplying third clock to said scene data coding means and composition means, and said multiplexing means multiplexes clock values of the first to third clocks supplied from said first to third clock supply means, respectively.

5. A coding apparatus comprising:

audio signal coding means for coding an audio signal to output compressed audio data, local-decoding the compressed audio data to output local-decoded audio data and outputting time information which represent the decoding timing of the compressed audio data;

video signal coding means for coding a video signal to output compressed video data, local-decoding the compressed video data to output local-decoded video data and outputting time information which represent the decoding timing of the compressed video data;

interface means for accepting information on a composite scene;

scene data coding means for coding scene data supplied from said interface means to output compressed scene data, local-decoding the compressed scene data to output local-decoded scene data and outputting time information which represent the decoding timing of the compressed scene data;

composition means for composing a scene from the local-decoded audio data, the local-decoded video data and the local-decoded scene data to output a composed scene and outputting the time information which represent the composite timing of the composed scene;

means for reproducing/displaying the composed scene supplied from said composition means;

clock supply means for supplying at least one clock to said audio signal coding means, said video signal coding means, said scene data coding means and said composition means; and multiplexing means for creating a bit stream on the basis of the time information and compressed audio data supplied from said audio signal coding means, the time information and compressed video data supplied from said video signal coding means, the time information and compressed scene data supplied from said scene data coding means, the time information supplied from said composition means, and at least one clock value of at least one clock supplied from said clock supply means;

wherein said clock supply means includes first clock supply means for supplying first clock to said audio signal coding means, second clock supply means for supplying second clock to said video signal coding means and composition means, and third clock supply means for supplying third clock to said scene data coding means, and said multiplexing means multiplexes clock values of the first to third clocks supplied from said first to third clock supply means, respectively.

6. A decoding apparatus comprising:

separating means for separating first compressed data of an audio signal and first time information which represent the decoding timing of the first compressed data, second compressed data of a video signal and second time information which represent the decoding timing of the second compressed data, third compressed data of scene data and third time information which represent the decoding timing of the third compressed data, fourth time information of scene composition and at least one clock value, from a bit stream;

audio signal decoding means for decoding the audio signal on the basis of the first compressed data and the first time information;

video signal decoding means for decoding the video signal on the basis of the second compressed data and the second time information;

scene data decoding means for decoding the scene data on the basis of the third compressed data and the third time information;

composition means for composing a scene from the audio signal supplied from said audio signal decoding means, the video signal supplied from said video signal decoding means and the scene data supplied from said scene data decoding means, on the basis of the fourth time information supplied from said separation means;

means for generating at least one clock according to at least one clock value supplied from said separating means and supplying the clock to said audio signal decoding means, said video signal decoding means, said scene data decoding means and said composition means;

means for reproducing/displaying the composed scene supplied from said composition means.

7. The decoding apparatus as claimed in claim 6, further comprising interface means for accepting an interaction from a viewer to a composite picture, wherein said interface means accepts information on a composite scene according to the interaction and controls the scene composite processing of said composition means and reproducing/displaying.

8. The decoding apparatus as claimed in claim 6, wherein said separation means separates independent clock values from said bit stream, and the independent clock values are input to means for supplying the clock to said decoding means for the audio signal, means for supplying the clock to said decoding means for the video signal, and means for supplying the clock to said decoding means for the scene data and said composition means.

9. The decoding apparatus as claimed in claim 6, wherein said decoding apparatus decodes the bit stream generated by a generating method comprising the steps of:

coding an audio signal to output compressed audio data, local-decoding the compressed audio data to output local-decoded audio data and outputting the first time information which represent the decoding timing of the compressed audio data;

coding a video signal to output compressed video data, local-decoding the compressed video data to output local-decoded video data and outputting the second time information which represent the decoding timing of the compressed video data;

accepting information on a composite scene to generate scene data, coding the scene data to output compressed scene data, local-decoding the compressed scene data to output local-decoded scene data and outputting the third time information which represent the decoding timing of the compressed scene data;

composing a scene from the local-decoded audio data, the local-decoded video data and the local-decoded scene data to output a composed scene and outputting the fourth time information which represent the composite timing of the composed scene;

reproducing/displaying the composed scene; and multiplexing the first time information and compressed audio data, the second time information and compressed video data, the third time information and compressed scene data, and the fourth time information to create a bit stream, wherein a flag representing whether at least one time information of the first to third timing information doubles as time information about reproducing/displaying of the composed scene is added to said one time information.

10. A decoding apparatus comprising:

separating means for separating first compressed data of an audio signal and first time information which represent the decoding timing of the first compressed data, second compressed data of a video signal and second time information which represent the decoding timing of the second compressed data, third compressed data of scene data and third time information which represent the decoding timing of the third compressed data, fourth time information of scene composition and at least one clock value, from a bit stream;

audio signal decoding means for decoding the audio signal on the basis of the first compressed data and the first time information;

video signal decoding means for decoding the video signal on the basis of the second compressed data and the second time information;

scene data decoding means for decoding the scene data on the basis of the third compressed data and the third time information;

composition means for composing a scene from the audio signal supplied from said audio signal decoding means, the video signal supplied from said video signal decoding means and the scene data supplied from said scene data decoding means, on the basis of the fourth time information supplied from said separation means;

means for generating at least one clock according to at least one clock value supplied from said separating means and supplying the clock to said audio signal decoding means, said video signal decoding means, said scene data decoding means and said composition means;

means for reproducing/displaying the composed scene supplied from said composition means;

wherein said separation means separates independent clock values from said bit stream, and the independent clock values are input to means for supplying the clock to said decoding means for the audio signal, means for supplying the clock to said decoding means for the video signal and said composition means, and means for supplying the clock to said decoding means for the scene data.

11. A coding/decoding system comprising a coding apparatus and a decoding apparatus wherein said coding apparatus comprises:

audio signal coding means for coding an audio signal to output compressed audio data, local-decoding the compressed audio data to output local-decoded audio data and outputting time information which represent the decoding timing of the compressed audio data;

video signal coding means for coding a video signal to output compressed video data, local-decoding the compressed video data to output local-decoded video data and outputting time information which represent the decoding timing of the compressed video data;

interface means for accepting information on a composite scene;

scene data coding means for coding scene data supplied from said interface means to output compressed scene data, local-decoding the compressed scene data to output local-decoded scene data and outputting time information which represent the decoding timing of the compressed scene data;

composition means for composing a scene from the local-decoded audio data, the local-decoded video data and the local-decoded scene data to output a composed scene and outputting the time information which represent the composite timing of the composed scene;

means for reproducing/displaying the composed scene supplied from said composition means;

clock supply means for supplying at least one clock to said audio signal coding means, said video signal coding means, said scene data coding means and said composition means; and multiplexing means for creating a bit stream on the basis of the time information and compressed audio data supplied from said audio signal coding means, the time information and compressed video data supplied from said video signal coding means, the time information and compressed scene data supplied from said scene data coding means, the time information supplied from said composition means, and at least one clock value of at least one clock supplied from said clock supply means;

and wherein said decoding apparatus comprises:

separating means for separating first compressed data of an audio signal and first time information which represent the decoding timing of the first compressed data, second compressed data of a video signal and second time information which represent the decoding timing of the second compressed data, third compressed data of scene data and third time information which represent the decoding timing of the third compressed data, fourth time information of scene composition and at least one clock value, from a bit stream;

audio signal decoding means for decoding the audio signal on the basis of the first compressed data and the first time information;

video signal decoding means for decoding the video signal on the basis of the second compressed data and the second time information;

scene data decoding means for decoding the scene data on the basis of the third compressed data and the third time information;

composition means for composing a scene from the audio signal supplied from said audio signal decoding means, the video signal supplied from said video signal decoding means and the scene data supplied from said scene data decoding means, on the basis of the fourth time information supplied from said separation means;

means for generating at least one clock according to at least one clock value supplied from said separating means and supplying the clock to said audio signal decoding means, said video signal decoding means, said scene data decoding means and said composition means; and means for reproducing/displaying the composed scene supplied from said composition means.

12. A coding/decoding system comprising a coding apparatus and a decoding apparatus wherein said coding apparatus comprises:

audio signal coding means for coding an audio signal to output compressed audio data and local-decoding the compressed audio data to output local-decoded audio data;

video signal coding means for coding a video signal to output compressed video data and local-decoding the compressed video data to output local-decoded video data;

interface means for accepting information on a composite scene;

scene data coding means for coding scene data supplied from said interface means to output compressed scene data and local-decoding the compressed scene data to output local-decoded scene data;

composition means for composing a scene from the local-decoded audio data, the local-decoded video data and the local-decoded scene data to output a composed scene and outputting time information which represent the composite timing of the composed scene;

means for reproducing/displaying the composed scene supplied from said composition means;

clock supply means for supplying at least one clock to said audio signal coding means, said video signal coding means, said scene data coding means and said composition means; and multiplexing means for creating a bit stream on the basis of the compressed audio data, the compressed video data, the compressed scene data, the time information and at least one clock value of at least one clock supplied from said clock supply means;

wherein said clock supply means includes first clock supply means for supplying first clock to said audio signal coding means, second clock supply means for supplying second clock to said video signal coding means and third clock supply means for supplying third clock to said scene data coding means and composition means, and said multiplexing means multiplexes clock values of the first to third clocks supplied from said first to third clock supply means, respectively;

and wherein said decoding apparatus comprises:

separating means for separating compressed data of an audio signal, compressed data of a video signal, compressed data of scene data and time information of scene composition from a bit stream;
audio signal decoding means for decoding the audio signal on the basis of the compressed data of the audio signal;
video signal decoding means for decoding the video signal on the basis of the compressed data of the video signal;
scene data decoding means for decoding the scene data on the basis of the compressed data of the scene data;
composition means for composing a scene from the audio signal supplied from said audio signal decoding means, the video signal supplied from said video signal decoding means and the scene data supplied from said scene data decoding means, on the basis of the time information for the scene composition supplied from said separation means; and
means for reproducing/displaying the composed scene supplied from said composition means;
wherein said separation means separates independent clock values from said bit stream, and the independent clock values are input to means for supplying the clock to said decoding means for the audio signal, means for supplying the clock to said decoding means for the video signal, and means for supplying the clock to said decoding means for the scene data and said composition means.

13. A coding/decoding system comprising a coding apparatus and a decoding apparatus wherein said coding apparatus comprises:
audio signal coding means for coding an audio signal to output compressed audio data and local-decoding the compressed audio data to output local-decoded audio data;
video signal coding means for coding a video signal to output compressed video data and local-decoding the compressed video data to output local-decoded video data;
interface means for accepting information on a composite scene;
scene data coding means for coding scene data supplied from said interface means to output compressed scene data and local-decoding the compressed scene data to output local-decoded scene data;
composition means for composing a scene from the local-decoded audio data, the local-decoded video data and the local-decoded scene data to output a composed scene and outputting time information which represent the composite timing of the composed scene;
means for reproducing/displaying the composed scene supplied from said composition means;
clock supply means for supplying at least one clock to said audio signal coding means, said video signal coding means, said scene data coding means and said composition means; and
multiplexing means for creating a bit stream on the basis of the compressed audio data, the compressed video data, the compressed scene data, the time information and at least one clock value of at least one clock supplied from said clock supply means;
wherein said clock supply means includes first clock supply means for supplying first clock to said audio signal coding means, second clock supply means for supplying second clock to said video signal coding means and composition means, and third clock supply means for supplying third clock to said scene data coding means, and said multiplexing means multiplexes clock values of the first to third clocks supplied from said first to third clock supply means, respectively;
and wherein said decoding apparatus comprises:
separating means for separating compressed data of an audio signal, compressed data of a video signal, compressed data of scene data and time information of scene composition from a bit stream;
audio signal decoding means for decoding the audio signal on the basis of the compressed data of the audio signal;
video signal decoding means for decoding the video signal on the basis of the compressed data of the video signal;
scene data decoding means for decoding the scene data on the basis of the compressed data of the scene data;
composition means for composing a scene from the audio signal supplied from said audio signal decoding means, the video signal supplied from said video signal decoding means and the scene data supplied from said scene data decoding means, on the basis of the time information for the scene composition supplied from said separation means; and
means for reproducing/displaying the composed scene supplied from said composition means;
wherein said separation means separates independent clock values from said bit stream, and the independent clock values are input to means for supplying the clock to said decoding means for the audio signal, means for supplying the clock to said decoding means for the video signal and said composition means, and means for supplying the clock to said decoding means for the scene data.

14. A coding method of a composite scene having a picture and an audio, which comprises the steps of:
coding an audio signal to output compressed audio data, local-decoding the compressed audio data to output local-decoded audio data and outputting the first time information which represent the decoding timing of the compressed audio data;
coding a video signal to output compressed video data, local-decoding the compressed video data to output local-decoded video data and outputting the second time information which represent the decoding timing of the compressed video data;
accepting information on a composite scene to generate scene data, coding the scene data to output compressed scene data, local-decoding the compressed scene data to output local-decoded scene data and outputting the third time information which represent the decoding timing of the compressed scene data;
composing a scene from the local-decoded audio data, the local-decoded video data and the local-decoded scene data to output a composed scene and outputting the fourth time information which represent the composite timing of the composed scene;
reproducing/displaying the composed scene; and
creating a bit stream on the basis of the first time information and compressed audio data, the second time information and compressed video data, the third time information and compressed scene data, the fourth time information and at least one clock value referred for coding the audio signal, the video signal and the scene data.

15. A decoding method of a bit stream, which comprises the steps of:

separating compressed data of an audio signal and first time information which represent the decoding timing of the compressed audio data, compressed data of a video signal and second time information which represent the decoding timing of the compressed video data, compressed data of scene data and third time information which represent the decoding timing of the compressed scene data, fourth time information of scene composition and at least one clock value, from a bit stream which a composite scene of a picture and an audio is coded and multiplexed;

generating at least one clock according to the separated clock value;

decoding the audio signal on the basis of the compressed data of the audio signal and the first time information with referring to the generated clock;

decoding the video signal on the basis of the compressed data of the video signal and the second time information with referring to the generated clock;

decoding the scene data on the basis of the compressed data of scene data and the third time information with referring to the generated clock;

composing a scene from the decoded audio signal, the decoded video signal and the decoded scene data with referring to the generated clock, on the basis of the fourth time information; and reproducing/displaying the composed scene.

16. A generating method of a bit stream, which comprises the steps of:

coding an audio signal to output compressed audio data, local-decoding the compressed audio data to output local-decoded audio data and outputting the first time information which represent the decoding timing of the compressed audio data;

coding a video signal to output compressed video data, local-decoding the compressed video data to output local-decoded video data and outputting the second time information which represent the decoding timing of the compressed video data;

accepting information on a composite scene to generate scene data, coding the scene data to output compressed scene data, local-decoding the compressed scene data to output local-decoded scene data and outputting the third time information which represent the decoding timing of the compressed scene data;

composing a scene from the local-decoded audio data, the local-decoded video data and the local-decoded scene data to output a composed scene and outputting the fourth time information which represent the composite timing of the composed scene;

reproducing/displaying the composed scene; and multiplexing the first time information and compressed audio data, the second time information and compressed video data, the third time information and compressed scene data, and the fourth time information to create a bit stream, wherein a flag representing whether at least one time information of the first to third timing information doubles as time information about reproducing/displaying of the composed scene is added to said one time information.

17. A coding apparatus comprising:

audio signal coding means for coding an audio signal to output compressed audio data, local-decoding the compressed audio data to output local-decoded audio data and outputting time information which represent the decoding timing of the compressed audio data;

video signal coding means for coding a video signal to output compressed video data, local-decoding the compressed video data to output local-decoded video data and outputting time information which represent the decoding timing of the compressed video data;

interface means for accepting information on a composite scene;

scene data coding means for coding scene data supplied from said interface means to output compressed scene data, local-decoding the compressed scene data to output local-decoded scene data and outputting time information which represent the decoding timing of the compressed scene data;

composition means for composing a scene from the local-decoded audio data, the local-decoded video data and the local-decoded scene data to output a composed scene and outputting the time information which represent the composite timing of the composed scene;

means for reproducing/displaying the composed scene supplied from said composition means;

clock supply means for supplying at least one clock to said audio signal coding means, said video signal coding means, said scene data coding means and said composition means; and multiplexing means for creating a bit stream on the basis of the time information and compressed audio data supplied from said audio signal coding means, the time information and compressed video data supplied from said video signal coding means, the time information and compressed scene data supplied from said scene data coding means, the time information supplied from said composition means, and at least one clock value of at least one clock supplied from said clock supply means;

wherein said multiplexing means generate the bit stream that a flag representing whether at least one time information of the first to third timing information doubles as time information about reproducing/displaying of the composite scene is added to said one time information.

18. A coding/decoding system comprising a coding apparatus and a decoding apparatus wherein said coding apparatus comprises:

audio signal coding means for coding an audio signal to output compressed audio data and local-decoding the compressed audio data to output local-decoded audio data;

video signal coding means for coding a video signal to output compressed video data and local-decoding the compressed video data to output local-decoded video data;

interface means for accepting information on a composite scene;

scene data coding means for coding scene data supplied from said interface means to output compressed scene data and local-decoding the compressed scene data to output local-decoded scene data;

composition means for composing a scene from the local-decoded audio data, the local-decoded video data and the local-decoded scene data to output a composed scene and outputting time information which represent the composite timing of the composed scene;

display means for reproducing/displaying the composed scene supplied from said composition means; and multiplexing means for creating a bit stream on the basis of the compressed audio data, the compressed video data, the compressed scene data and the time information;

wherein said multiplexing means generate the bit stream that a flag representing whether at least one time information of the first to third timing information doubles as time information about reproducing/displaying of the composite scene is added to said one time information;

and wherein said decoding apparatus comprises:

separating means for separating first compressed data of an audio signal and first time information which represent the decoding timing of the first compressed data, second compressed data of a video signal and second time information which represent the decoding timing of the second compressed data, third compressed data of scene data and third time information which represent the decoding timing of the third compressed data, and fourth time information of scene composition, from a bit stream;

audio signal decoding means for decoding the audio signal on the basis of the first compressed data and the first time information;

video signal decoding means for decoding the video signal on the basis of the second compressed data and the second time information;

scene data decoding means for decoding the scene data on the basis of the third compressed data and the third time information;

composition means for composing a scene from the audio signal supplied from said audio signal decoding means, the video signal supplied from said video signal decoding means and the scene data supplied from said scene data decoding means, on the basis of the fourth time information supplied from said separation means; and means for reproducing/displaying the composed scene supplied from said composition means;

wherein said decoding apparatus decodes the bit stream generated by a generating method comprising the steps of:

coding an audio signal to output compressed audio data, local-decoding the compressed audio data to output local-decoded audio data and outputting the first time information which represent the decoding timing of the compressed audio data;

coding a video signal to output compressed video data, local-decoding the compressed video data to output local-decoded video data and outputting the second time information which represent the decoding timing of the compressed video data;

accepting information on a composite scene to generate scene data, coding the scene data to output compressed scene data, local-decoding the compressed scene data to output local-decoded scene data and outputting the third time information which represent the decoding timing of the compressed scene data;

composing a scene from the local-decoded audio data, the local-decoded video data and the local-decoded scene data to output a composed scene and outputting the fourth time information which represent the composite timing of the composed scene;

reproducing/displaying the composed scene; and multiplexing the first time information and compressed audio data, the second time information and compressed video data, the third time information and compressed scene data, and the fourth time information to create a bit stream, wherein a flag representing whether at least one time information of the first to third timing information doubles as time information about reproducing/displaying of the composed scene is added to said one time information.

* * * * *

UNITED STATES PATENT AND TRADEMARK OFFICE
CERTIFICATE OF CORRECTION

PATENT NO.     : 6,584,125 B1
DATED          : June 24, 2003
INVENTOR(S)    : Jiro Katto It is certified that error appears in the above-identified patent and that said Letters Patent is hereby corrected as shown below:

<u>Title page, Item [54] and Column 1, lines 1-3,</u>
Please correct the Title to read:
-- SYNCHRONIZED DECODING AND COMPOSITION OF ENCODED AUDIO, VIDEO AND SCENE DATA --

Signed and Sealed this

Fourth Day of November, 2003

JAMES E. ROGAN
*Director of the United States Patent and Trademark Office*